(12) United States Patent
Muron et al.

(10) Patent No.: US 11,776,276 B1
(45) Date of Patent: Oct. 3, 2023

(54) SYSTEM AND METHODS FOR AUTOMATICALLY VALIDATING EVIDENCE OF TRAFFIC VIOLATIONS USING AUTOMATICALLY DETECTED CONTEXT FEATURES

(71) Applicant: Hayden AI Technologies, Inc., Oakland, CA (US)

(72) Inventors: Wiktor Muron, Rogi (PL); Maciej Budys, Gdansk (PL); Andrei Liaukovich, Warsaw (PL); Marcin Grzesiak, Cracow (PL); Michael Gleeson-May, Oakland, CA (US); Shaocheng Wang, Mountain View, CA (US); Vaibhav Ghadiok, Mountain View, CA (US); Morgan Kohler, Mill Valley, CA (US)

(73) Assignee: Hayden AI Technologies, Inc., Oakland, CA (US)

(*) Notice: Subject to any disclaimer, the term of this patent is extended or adjusted under 35 U.S.C. 154(b) by 0 days.

(21) Appl. No.: 18/305,951

(22) Filed: Apr. 24, 2023

Related U.S. Application Data

(60) Provisional application No. 63/383,629, filed on Nov. 14, 2022.

(51) Int. Cl.
*G06V 20/54* (2022.01)
*G06V 20/58* (2022.01)
(Continued)

(52) U.S. Cl.
CPC ............ *G06V 20/54* (2022.01); *G06V 10/764* (2022.01); *G06V 10/82* (2022.01); *G06V 20/58* (2022.01); *G06V 2201/08* (2022.01)

(58) Field of Classification Search
CPC ........ G06V 20/54; G06V 20/58; G06V 10/82; G06V 10/764; G06V 2201/08
See application file for complete search history.

(56) References Cited

U.S. PATENT DOCUMENTS 9,363,483 B2 * 6/2016 Bulan ................... G06V 20/52
9,495,601 B2 * 11/2016 Hansen ................. G06V 20/56
(Continued)

FOREIGN PATENT DOCUMENTS

KR          100812397         3/2008
WO       WO 2020/177767       9/2020

OTHER PUBLICATIONS

Yin, Zhengcong, et al. "A deep learning based illegal parking detection platform." Proceedings of the 3rd ACM SIGSPATIAL International Workshop on AI for Geographic Knowledge Discovery. 2019. (Year: 2019).*
(Continued)

*Primary Examiner* — Utpal D Shah
(74) *Attorney, Agent, or Firm* — Levine Bagade Han LLP

(57) ABSTRACT

Disclosed herein are methods and systems for automatically validating evidence of traffic violations. One instance of a method comprises receiving an evidence package comprising video frames showing a vehicle involved in a potential traffic violation. The video frames can be input into one or more deep learning models to obtain a plurality of classification results. The method can further comprise generating a score based in part on the classification results and evaluating the score against one or more thresholds to determine whether the evidence package is automatically approved, is automatically rejected, or requires further review.

30 Claims, 21 Drawing Sheets

(51) Int. Cl.
  *G06V 10/82* (2022.01)
  *G06V 10/764* (2022.01)

(56) References Cited

U.S. PATENT DOCUMENTS

| | | | | |
|---|---|---|---|---|
| 9,679,203 | B2* | 6/2017 | Bulan | G06V 20/54 |
| 10,296,794 | B2 | 5/2019 | Ratti | |
| 10,755,565 | B2* | 8/2020 | Zhang | G08G 1/0116 |
| 11,003,919 | B1 | 5/2021 | Ghadiok et al. | |
| 11,037,024 | B1* | 6/2021 | Ratti | G06V 10/7747 |
| 11,164,014 | B1 | 11/2021 | Ghadiok et al. | |
| 11,322,017 | B1 | 5/2022 | Ghadiok et al. | |
| 11,361,558 | B2 | 6/2022 | Seo | |
| 11,393,227 | B1* | 7/2022 | Nishimura | G06V 20/58 |
| 2005/0122235 | A1* | 6/2005 | Teffer | G08G 1/08 |
| | | | | 348/148 |
| 2014/0257943 | A1* | 9/2014 | Nerayoff | G06T 7/292 |
| | | | | 382/104 |
| 2014/0270381 | A1* | 9/2014 | Wu | G06V 20/54 |
| | | | | 382/104 |
| 2015/0117704 | A1* | 4/2015 | Bulan | G06T 7/269 |
| | | | | 382/103 |
| 2015/0336578 | A1 | 11/2015 | Lord et al. | |
| 2018/0211117 | A1* | 7/2018 | Ratti | G06V 10/764 |
| 2019/0197889 | A1* | 6/2019 | Kanehara | G08G 1/0112 |
| 2019/0333232 | A1* | 10/2019 | Vallespi-Gonzalez | |
| | | | | G06T 7/292 |
| 2020/0265713 | A1* | 8/2020 | Abeling | G08G 1/04 |
| 2020/0401833 | A1 | 12/2020 | Popov et al. | |
| 2021/0067745 | A1* | 3/2021 | Rosenberg | G06V 10/764 |
| 2021/0142055 | A1 | 5/2021 | Broggi | |
| 2021/0166145 | A1 | 6/2021 | Omari et al. | |
| 2021/0197813 | A1* | 7/2021 | Houston | G05D 1/0223 |
| 2021/0398421 | A1 | 12/2021 | Nishimura et al. | |
| 2022/0044558 | A1* | 2/2022 | Li | G08G 1/017 |
| 2022/0237919 | A1 | 7/2022 | Li et al. | |
| 2023/0091062 | A1* | 3/2023 | Challa | G06F 18/24133 |
| | | | | 382/104 |

OTHER PUBLICATIONS

Ng, Chin-Kit, et al. "Outdoor illegal parking detection system using convolutional neural network on Raspberry Pi." International Journal of Engineering & Technology 7.3.7 (2018): 17-20. (Year: 2018).*

Xie, Xuemei, et al. "Real-time illegal parking detection system based on deep learning." Proceedings of the 2017 international conference on deep learning technologies. 2017. (Year: 2017).*

Liu, Z. et al. "A ConvNet for the 2020s," *2022 IEEE/CVF Conference on Computer Vision and Pattern Recognition (CVPR)*, p. 11966-11976, Jun. 2022, New Orleans, LA, USA.

"Consulting services in Computer Vision and AI," accessed on May 8, 2023, online.

"Safety Vision Announces Smart Automated Bus Lane Enforcement (SABLETM) Solution," *Safety Vision*, Oct. 11, 2022, online.

Clearlane, "Automated Bus Lane Enforcement System", *SafeFleet*, 2021, online.

Clearlane, "The Safe Fleet Automated Bus Lane Enforcement (ABLE)", *SafeFleet*, 2021, online.

Evanko, K. "Siemens Mobility launches first-ever mobile bus lane enforcement solution in New York," *Siemens Mobility*, Dec. 17, 2019, Munich, Germany.

Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.

Huval, B. et al. "An Empirical Evaluation of Deep Learning on Highway Driving," *Stanford University*, pp. 1-7 accessed on Apr. 17, 2015, online.

Liu, X. "Vehicle-Related Scene Understanding Using Deep Learning," *School of Engineering, Computer and Mathematical Sciences, Auckland University of Technology*, 2019, online.

Nehemiah, A. et al. "Deep Learning for Automated Driving with MATLAB," *NVIDIA Technical Blog*, <https://developer.nvidia.com/blog/deep-learning-automated-driving-matlab/> accessed on Jun. 4, 2023, online.

Safe Fleet. "Whitepaper: Vendor Interoperability for ABLE," *Safe Fleet*, pp. 1-6, Apr. 2023, online.

Spencer, B et al. "NYC extends Brooklyn bus lane enforcement," *ITS International*, Feb. 27, 2020, online.

Sullivan, T. "Transit Bus Surveillance Solutions," *New York City Transit/MTA Bus*, Jun. 21, 2019, Charlotte, North Carolina, USA.

Wu, C. et al. "Adjacent Lane Detection and Lateral Vehicle Distance Measurement Using Vision-Based Neuro-Fuzzy Approaches," *Journal of Applied Research and Technology*, vol. 11, pp. 251-258, Apr. 2023.

* cited by examiner

CARRIER VEHICLE 110

MUNICIPAL FLEET VEHICLE

SEMI-AUTONOMOUS VEHICLE

AUTONOMOUS VEHICLE

Example license plates having a normal layout (non-stacked)

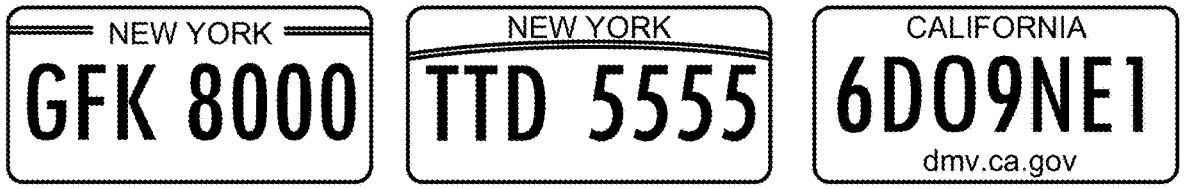

FIG. 10A

Example license plates that can be classified as having characters in a double-stacked arrangement or having at least one character that is of a different size than another character

FIG. 10B

Example license plates that can be classified as having characters in a triple-stacked arrangement or having at least three differently-sized characters

FIG. 10C

Example license plate video frames where entire license plate number is recognizable Example license plate video frames where license plate is cropped Example license plate video frames where license plate number is illegible Example license plate video frame where license plate is missing

SYSTEM AND METHODS FOR AUTOMATICALLY VALIDATING EVIDENCE OF TRAFFIC VIOLATIONS USING AUTOMATICALLY DETECTED CONTEXT FEATURES

CROSS-REFERENCE TO RELATED APPLICATION

This application claims priority to U.S. Provisional Patent Application No. 63/383,629 filed on Nov. 14, 2022, the content of which is incorporated herein by reference in its entirety.

TECHNICAL FIELD

This disclosure relates generally to the field of computer-based traffic violation detection and, more specifically, to systems and methods for automatically validating evidence of traffic violations using automatically detected context features.

BACKGROUND

Non-public vehicles parking in bus lanes or bike lanes is a significant transportation problem for municipalities, counties, and other government entities. While some cities have put in place Clear Lane Initiatives aimed at improving bus speeds, enforcement of bus lane violations is often lacking and the reliability of multiple buses can be affected by just one vehicle illegally parked or temporarily stopped in a bus lane. Such disruptions in bus schedules can frustrate those that depend on public transportation and result in decreased ridership. On the contrary, as buses speed up due to bus lanes remaining unobstructed, reliability improves, leading to increased ridership, less congestion on city streets, and less pollution overall.

Similarly, vehicles parked illegally in bike lanes can force bicyclists to ride on the road, making their rides more dangerous and discouraging the use of bicycles as a safe and reliable mode of transportation. Moreover, vehicles parked along curbs or lanes designated as no parking zones or during times when parking is forbidden can disrupt crucial municipal services such as street sweeping, waste collection, and firefighting operations.

Traditional photo-based traffic enforcement technology and approaches are often unsuited for today's fast-paced environment. For example, photo-based traffic enforcement systems often rely heavily on human reviewers to review and validate evidence packages containing images or videos captured by one or more stationary cameras. This requires large amounts of human effort and makes the process slow, inefficient, and costly. In particular, traffic enforcement systems that rely on human reviewers are often not scalable, require more time to complete the validation procedure, and do not learn from their past mistakes. Moreover, even more advanced photo-based traffic enforcement systems often have difficulty detecting and classifying license plates that have stacked lettering or contain atypical symbols. Furthermore, these photo-based traffic enforcement systems often fail to take into account certain contextual factors or features that may provide clues as to whether a captured event is or is not a potential traffic violation.

Therefore, an improved computer-based traffic violation detection system is needed that can undertake certain evidentiary reviews automatically without relying on human reviewers and can take into account certain automatically detected contextual factors or features that may aid the system in determining whether a traffic violation has indeed occurred. Such a solution should be accurate, scalable, and cost-effective to deploy and operate.

SUMMARY

Disclosed herein are systems and methods for automatically validating evidence of traffic violations. In some embodiments, a method of automatically evaluating evidence of a potential traffic violation comprises receiving, at a server, an evidence package of the potential traffic violation from an edge device. The evidence package can comprise one or more event video frames and one or more license plate video frames of videos captured by the edge device showing a vehicle involved in the potential traffic violation. The evidence package can further comprise one or more first classification results obtained by feeding the one or more event video frames and the license plate video frames into one or more deep learning models running on the edge device. Each of the first classification results can be associated with one of a plurality of context features. The method can also comprise inputting the one or more event video frames and license plate video frames into one or more deep learning models running on the server to obtain one or more second classification results. Each of the second classification results can be associated with one of the plurality of features. The method can further comprise inputting one or more of the first classification results and their associated features, one or more of the second classification results and their associated features, or a combination thereof into a decision tree algorithm to obtain a plurality of contributing scores. Each of the contributing scores can be associated with one of the plurality of features. The method can further comprise calculating a final score based on the contributing scores and evaluating the final score against one or more predetermined thresholds to determine whether the evidence package is automatically approved, is automatically rejected, or requires further review.

In some embodiments, the method further comprises inputting the one or more license plate video frames into a license plate classifier running on the server. In these embodiments, the second classification results can comprise confidence scores obtained from the license plate classifier concerning license plate-related features of the vehicle.

In some embodiments, the license plate classifier can comprise a convolutional neural network backbone comprising multiple prediction heads connected to the convolutional neural network backbone.

In some embodiments, one of the plurality of features can be a prediction concerning whether license plate characters on the license plate are arranged in a stacked arrangement. In these embodiments, one of the second classification results can be a confidence score associated with the prediction concerning whether the license plate characters on the license plate are arranged in the stacked arrangement.

In some embodiments, one of the plurality of features can be a prediction confidence related to a license plate recognized by a license plate recognition (LPR) deep learning model running on the edge device. In these embodiments, one of the first classification results can be a confidence score associated with the prediction confidence.

In some embodiments, one of the plurality of features can be a prediction concerning whether a bus is detected in at least one of the event video frames. In these embodiments, one of the first classification results can be a confidence score or boolean value associated with the prediction concerning the detection of the bus.

In some embodiments, one of the deep learning models can be a lane segmentation deep learning model running on the edge device. The lane segmentation deep learning model can be configured to detect one or more lanes of a roadway from at least one of the event video frames.

In some embodiments, one of the plurality of features can be a determination concerning a geometric area representing one of the lanes detected by the lane segmentation deep learning model. In these embodiments, one of the first classification results can be a detected lane area percentage.

In some embodiments, one of the plurality of features can be a prediction concerning whether a bus lane is detected in at least one of the event video frames. One of the first classification results can be a confidence score or boolean value associated with the prediction concerning whether the bus lane is detected.

In some embodiments, one of the plurality of features can be a prediction concerning a weather condition detected in at least one of the event video frames. One of the first classification results can be a confidence score associated with the prediction concerning the weather condition.

In some embodiments, one of the plurality of features can be a prediction concerning whether an intersection is detected in at least one of the event video frames. In these embodiments, one of the first classification results can be a confidence score or boolean value associated with the prediction concerning the detection of the intersection.

In some embodiments, the final score can be calculated by incrementing or decrementing an initial score using the plurality of contributing scores. Each of the contributing scores can be associated with one of the features. Each of the contributing scores can be determined by the decision tree algorithm based on all of the first classification results and all of the second classification results provided as inputs to the decision tree algorithm.

In some embodiments, the decision tree algorithm can be a gradient boosted decision tree algorithm.

In some embodiments, the event video frames can be captured by an event camera of the edge device coupled to a carrier vehicle while the carrier vehicle is in motion. The license plate video frames can be captured by a license plate recognition (LPR) camera of the edge device coupled to the carrier vehicle while the carrier vehicle is in motion.

In some embodiments, the one or more predetermined thresholds can comprise a first threshold and a second threshold. The first threshold can be higher than the second threshold. The method can further comprise: automatically approving the evidence package in response to the final score being higher than the first threshold, marking or tagging the evidence package for further review in response to the final score being between the first threshold and the second threshold, and automatically rejecting the evidence package in response to the final score being below the second threshold.

In some embodiments, a system for automatically evaluating evidence of a potential traffic violation is disclosed. The system can comprise an edge device comprising one or more cameras configured to capture videos of a vehicle involved in the potential traffic violation. The edge device can comprise one or more processors coupled to a memory. The one or more processors can be programmed to generate an evidence package concerning the potential traffic violation. The evidence package can comprise one or more event video frames and license plate video frames from the videos captured by the edge device and one or more first classification results. The first classification results can be obtained by feeding the one or more event video frames and the license plate video frames into one or more deep learning models running on the edge device. Each of the first classification results can be associated with one of a plurality of features. The edge device can be communicatively coupled to a server. The server can comprise one or more server processors programmed to receive the evidence package from the edge device and input the one or more license plate video frames into one or more deep learning models running on the server to obtain one or more second classification results. Each of the second classification results can be associated with one of the plurality of features. The one or more server processors can be programmed to input one or more of the first classification results and their associated features, one or more of the second classification results and their associated features, or a combination thereof into a decision tree algorithm to obtain a plurality of contributing scores. Each of the contributing scores can be associated with one of the plurality of features. The one or more server processors can be programmed to calculate a final score based on the contributing scores and evaluate the final score against one or more predetermined thresholds to determine whether the evidence package is automatically approved, is automatically rejected, or requires further review.

In some embodiments, the one or more server processors can be programmed to input the one or more license plate video frames into a license plate classifier running on the server. The second classification results can comprise confidence scores obtained from the license plate classifier concerning license plate-related features of the vehicle.

In some embodiments, the license plate classifier can comprise a convolutional neural network backbone comprising multiple prediction heads connected to the convolutional neural network backbone.

In some embodiments, one of the plurality of features can be a prediction concerning whether license plate characters on the license plate are arranged in a stacked arrangement. In these embodiments, one of the second classification results can be a confidence score associated with the prediction concerning whether the license plate characters on the license plate are arranged in the stacked arrangement.

In some embodiments, one of the plurality of features can be a prediction confidence related to a license plate recognized by a license plate recognition (LPR) deep learning model running on the edge device. In these embodiments, one of the first classification results can be a confidence score associated with the prediction confidence.

In some embodiments, one of the plurality of features can be a prediction concerning whether a bus is detected in at least one of the event video frames. In these embodiments, one of the first classification results can be a confidence score or boolean value associated with the prediction concerning the detection of the bus.

In some embodiments, one of the deep learning models can be a lane segmentation deep learning model running on the edge device. The lane segmentation deep learning model can be configured to detect one or more lanes of a roadway from at least one of the event video frames.

In some embodiments, one of the plurality of features can be a determination concerning a geometric area representing one of the lanes detected by the lane segmentation deep learning model. In these embodiments, one of the first classification results can be a detected lane area percentage.

In some embodiments, one of the plurality of features can be a prediction concerning whether a bus lane is detected in at least one of the event video frames. One of the first classification results can be a confidence score or boolean value associated with the prediction concerning whether the bus lane is detected.

In some embodiments, one of the plurality of features can be a prediction concerning a weather condition detected in at least one of the event video frames. In these embodiments, one of the first classification results can be a confidence score or boolean value associated with the prediction concerning the weather condition.

In some embodiments, one of the plurality of features can be a prediction concerning whether an intersection is detected in at least one of the event video frames. In these embodiments, one of the first classification results can be a confidence score or boolean value associated with the prediction concerning the detection of the intersection.

In some embodiments, the one or more server processors can be further programmed to calculate the final score by incrementing or decrementing an initial score using the plurality of contributing scores. Each of the contributing scores can be associated with one of the features. Each of the contributing scores can be determined by the decision tree algorithm based on all of the first classification results and all of the second classification results provided as inputs to the decision tree algorithm.

In some embodiments, the decision tree algorithm can be a gradient boosted decision tree algorithm.

In some embodiments, the event video frames can be captured by an event camera of the edge device coupled to a carrier vehicle while the carrier vehicle is in motion. The license plate video frames can be captured by a license plate recognition (LPR) camera of the edge device coupled to the carrier vehicle while the carrier vehicle is in motion.

In some embodiments, the one or more predetermined thresholds can comprise a first threshold and a second threshold. The first threshold can be higher than the second threshold. The one or more server processors can be further programmed to automatically approve the evidence package in response to the final score being higher than the first threshold, mark or tag the evidence package for further review in response to the final score being between the first threshold and the second threshold, and automatically reject the evidence package in response to the final score being below the second threshold.

BRIEF DESCRIPTION OF THE DRAWINGS

FIG. 10A illustrates several examples of license plates having a normal layout without any characters in a stacked arrangement and with all characters being of the same size.

FIG. 10B illustrates several examples of license plates having one character stacked on top of another or one character that is of a different size than another character.

FIG. 10C illustrates several examples of license plates having at least one character stacked on top of two stacked characters.

DETAILED DESCRIPTION

Figure 1A:
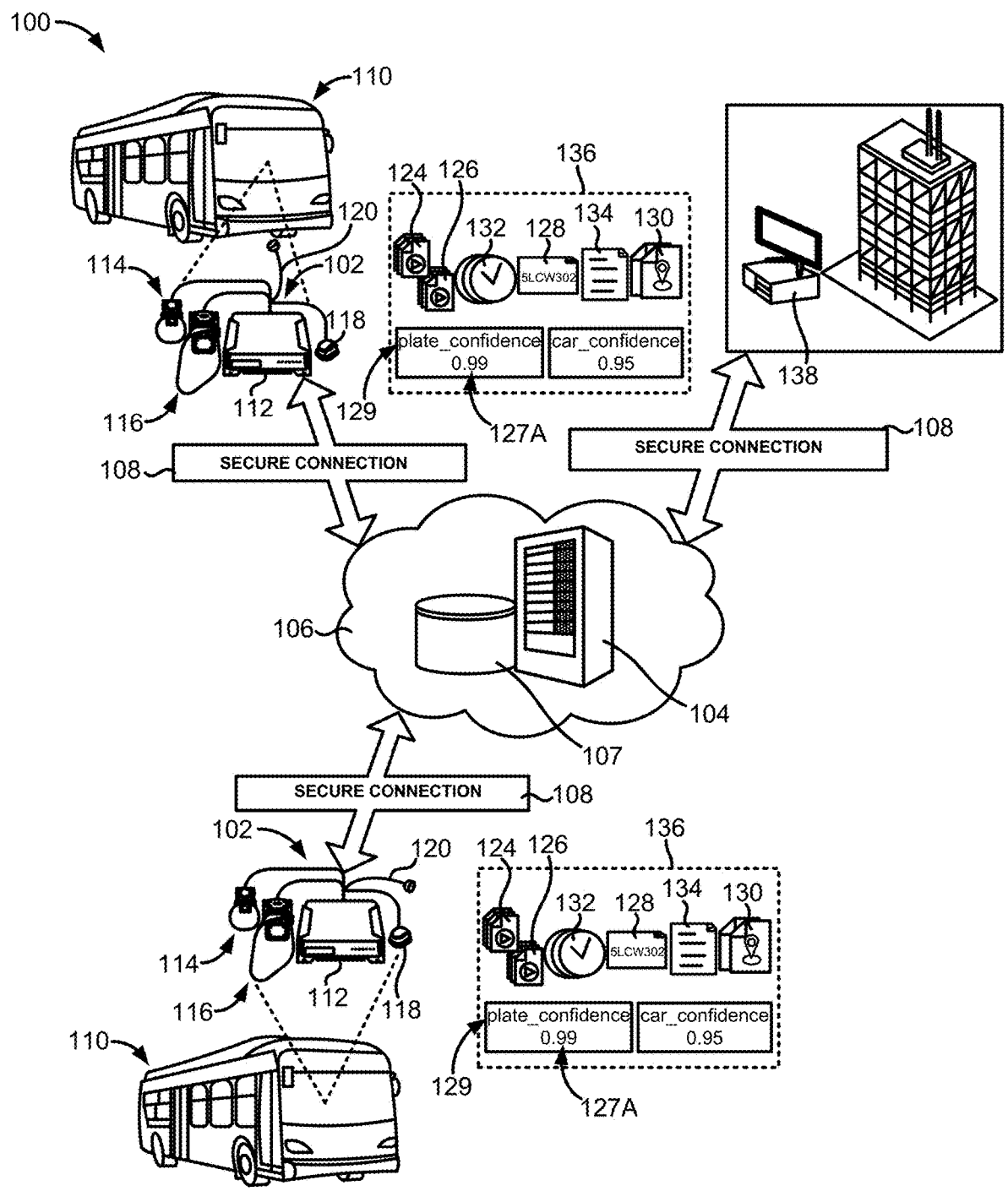
FIG. 1A illustrates one embodiment of a system for automatically validating evidence of traffic violations.

FIG. 1A illustrates one embodiment of a system 100 for automatically validating evidence of traffic violations. The system 100 can comprise a plurality of edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database. In further embodiments, the database 107 can be a column-oriented or key-value database. In certain embodiments, the database 107 can be stored in a server memory or storage unit of the server 104. In other embodiments, the database 107 can be distributed among multiple storage nodes. In some embodiments, the database 107 can be an events database.

As will be discussed in more detail in the following sections, each of the edge devices 102 can be carried by or installed in a carrier vehicle 110 (see FIG. 1C for examples of different types of carrier vehicles 110).

For example, the edge device 102, or components thereof, can be secured or otherwise coupled to an interior of the carrier vehicle 110 immediately behind the windshield of the carrier vehicle 110. As a more specific example, the event camera 114 and the LPR camera 116 of the edge device 102 can be coupled to at least one of a ceiling and headliner of the carrier vehicle 110 with the event camera 114 and the LPR camera 116 facing the windshield of the carrier vehicle 110.

In other embodiments, the edge device 102, or components thereof, can be secured or otherwise coupled to at least one of a windshield, window, dashboard, and deck of the carrier vehicle 110. Also, for example, the edge device 102 can be secured or otherwise coupled to at least one of a handlebar and handrail of a micro-mobility vehicle serving as the carrier vehicle 110. Alternatively, the edge device 102 can be secured or otherwise coupled to a mount or body of an unmanned aerial vehicle (UAV) or drone serving as the carrier vehicle 110.

As shown in FIG. 1A, each of the edge devices 102 can comprise a control unit 112, an event camera 114, a license plate recognition (LPR) camera 116, a communication and positioning unit 118, and a vehicle bus connector 120.

The event camera 114 can capture videos of vehicles 122 (also referred to as a potentially offending vehicle, see, e.g., FIGS. 1B, 5A, 5B, and 5C) parked or in motion near the carrier vehicle 110. The videos captured by the event camera 114 can be referred to as event videos. Each of the event videos can be made up of a plurality of event video frames 124. The event video frames 124 can be processed and analyzed by the control unit 112 in real-time or near real-time to determine whether any of the vehicles 122 have committed a potential traffic violation.

For example, one or more processors of the control unit 112 can be programmed to apply a plurality of functions from a computer vision library 306 (see, e.g., FIG. 3) to the videos captured by the event camera 114 to read the event video frames 124. The one or more processors of the control unit 112 can then pass at least some of the event video frames 124 to a plurality of deep learning models (see, e.g., FIG. 3) running on the control unit 112 of the edge device 102. The deep learning models can automatically identify objects from the event video frames 124 and classify such objects (e.g., a car, a truck, a bus, etc.). In some embodiments, the deep learning models can also automatically identify a set of vehicle attributes 134 of a vehicle involved in a potential traffic violation. The set of vehicle attributes 134 can include a color of the potentially offending vehicle 122, a make and model of the potentially offending vehicle 122, and a vehicle type of the potentially offending vehicle 122 (for example, if the potentially offending vehicle 122 is a personal vehicle or a municipal vehicle such as a fire truck, ambulance, parking enforcement vehicle, police car, etc.).

The potentially offending vehicle 122 can be detected along with other vehicles in the event video frame(s) 124. The potentially offending vehicle 122 can be detected by the edge device 102 of committing a traffic violation such as a moving violation (e.g., a moving bus lane violation, a moving bike lane violation, etc.), a non-moving violation (e.g., parking or stopping in a lane or part of a roadway where parking or stopping is not permitted), or a combination thereof.

The LPR camera 116 can capture videos of license plates of the vehicles 122 parked or in motion near the carrier vehicle 110. The videos captured by the LPR camera 116 can be referred to as license plate videos. Each of the license plate videos can be made up of a plurality of license plate video frames 126. The license plate video frames 126 can be analyzed by the control unit 112 in real-time or near real-time to extract alphanumeric strings representing license plate numbers 128 of the vehicles 122. The event camera 114 and the LPR camera 116 will be discussed in more detail in later sections.

The communication and positioning unit 118 can comprise at least one of a cellular communication module, a WiFi communication module, a Bluetooth® communication module, and a high-precision automotive-grade positioning unit. The communication and positioning unit 118 can also comprise a multi-band global navigation satellite system (GNSS) receiver configured to concurrently receive signals from a GPS satellite navigation system, a GLONASS satellite navigation system, a Galileo navigation system, and a BeiDou satellite navigation system.

The communication and positioning unit 118 can provide positioning data that can allow the edge device 102 to determine its own location at a centimeter-level accuracy. The communication and positioning unit 118 can also provide positioning data that can be used by the control unit 112 to determine a location 130 of a potentially offending vehicle 122. For example, the control unit 112 can use positioning data concerning its own location to substitute for the location 130 of the potentially offending vehicle 122. The control unit 112 can also use positioning data concerning its own location to estimate or approximate the location 130 of the potentially offending vehicle 122.

The edge device 102 can also comprise a vehicle bus connector 120. The vehicle bus connector 120 can allow the edge device 102 to obtain certain data from the carrier vehicle 110 carrying the edge device 102. For example, the edge device 102 can obtain wheel odometry data from a wheel odometer of the carrier vehicle 110 via the vehicle bus connector 120. Also, for example, the edge device 102 can obtain a current speed of the carrier vehicle 110 via the vehicle bus connector 120. As a more specific example, the vehicle bus connector 120 can be a J1939 connector. The edge device 102 can take into account the wheel odometry data to determine the location 130 of a potentially offending vehicle 122.

The edge device 102 can also record or generate at least a plurality of timestamps 132 marking the time when a potentially offending vehicle 122 was detected at a location 130. For example, the localization and mapping engine 302 of the edge device 102 can mark the time using a global positioning system (GPS) timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

As will be discussed in more detail in later sections, if an edge device 102 detects that a potential traffic violation has occurred, the edge device 102 can transmit data, information, videos, and other files to the server 104 in the form of an evidence package 136. The evidence package 136 can comprise the event video frames 124 and the license plate video frames 126.

In some embodiments, the evidence package 136 can also comprise one or more first classification results 127A obtained by feeding the event video frames 124 and the license plate video frames 126 into one or more deep learning models running on the edge device 102. Each of the first classification results 127A can be associated with a context-related feature 129. The context-related features 129 can be contextual factors that affect the accuracy or validity of a potential traffic violation detected by the edge devices 102 and/or the server 104. A deep learning model running on the edge device 102 can make predictions or classifications concerning the context-related features 129. In some embodiments, such predictions or classifications can be in the form of confidence scores or numerical values. In other embodiments, such predictions or classification can be in the form of a boolean value, a binary number, or a Yes/No answer.

The evidence package 136 can also comprise at least one license plate number 128 recognized by the edge device 102 using the license plate video frames 126 as inputs, a location 130 of the potentially offending vehicle 122 determined by the edge device 102, the speed of the carrier vehicle 110 when the potential traffic violation was detected, any timestamps 132 recorded by the control unit 112, and vehicle attributes 134 of the potentially offending vehicle 122 captured by the event video frames 124.

FIG. 1A also illustrates that the server 104 can transmit certain data and files to a third-party computing device/resource or client device 138. For example, the third-party computing device can be a server or computing resource of a third-party traffic violation processor. As a more specific example, the third-party computing device can be a server or computing resource of a government vehicle registration department. In other examples, the third-party computing device can be a server or computing resource of a subcontractor responsible for processing traffic violations for a municipality or other government entity.

The client device 138 can refer to a portable or non-portable computing device. For example, the client device 138 can refer to a desktop computer or a laptop computer. In other embodiments, the client device 138 can refer to a tablet computer or smartphone.

The server 104 can also generate or render a number of graphical user interfaces (GUIs) 332 (see, e.g., FIG. 3) that can be displayed through a web portal or mobile app run on the client device 138.

The GUIs 332 can also provide data or information concerning times/dates of potential traffic violations and locations of the potential traffic violations. The GUIs 332 can also provide a video player configured to play back video evidence of the potential traffic violation.

In another embodiment, at least one of the GUIs 332 can comprise a live map showing real-time locations of all edge devices 102, potential traffic violations, and violation hotspots. In yet another embodiment, at least one of the GUIs 332 can provide a live event feed of all flagged events or potential traffic violations and the validation status of such potential traffic violations. The GUIs 332 and the web portal or app will be discussed in more detail in later sections.

The server 104 can also determine that a traffic violation has occurred based in part on comparing data and videos received from the edge device 102 and other edge devices 102.

Figure 1B:
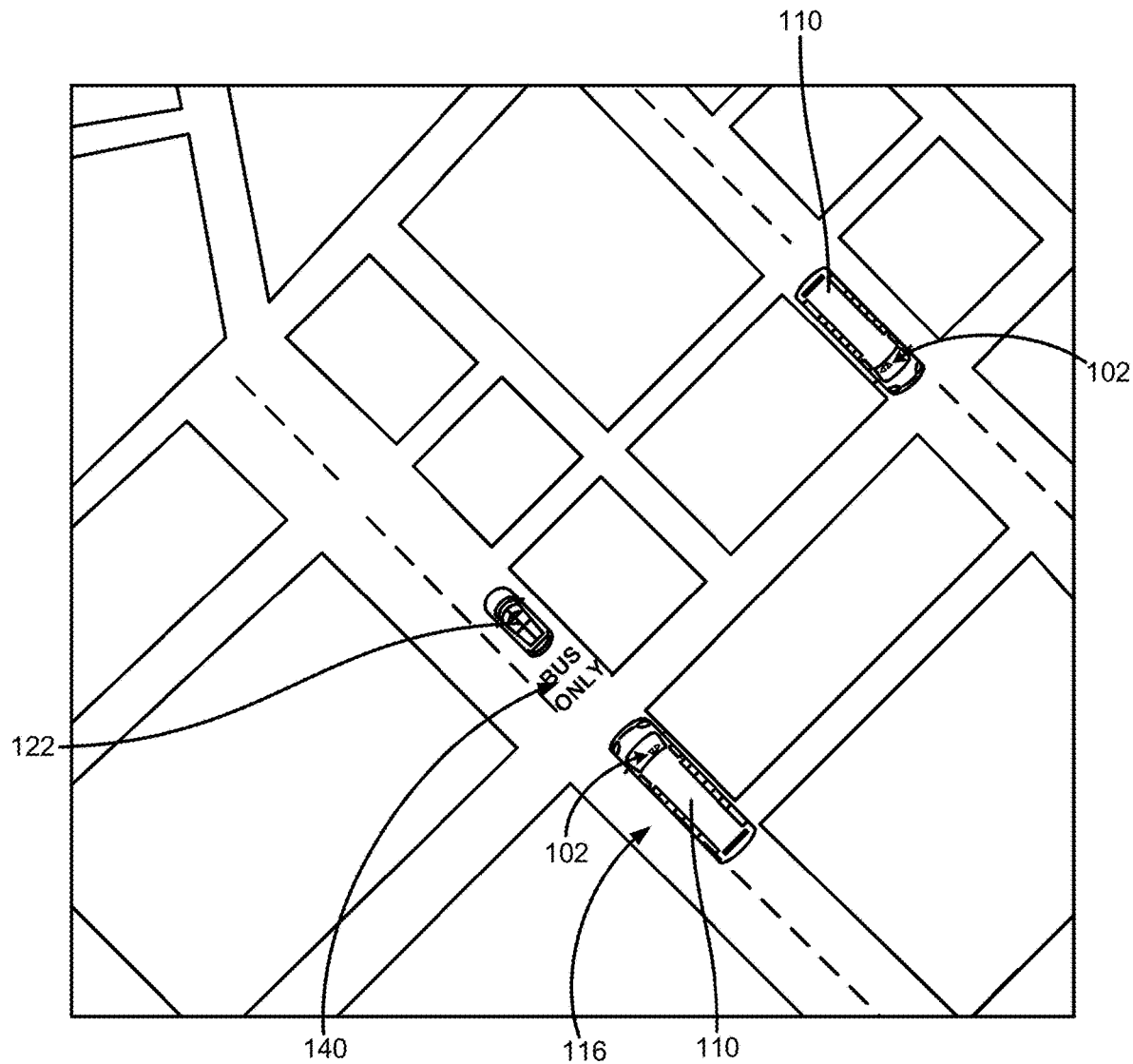
FIG. 1B illustrates one example scenario where the system of FIG. 1A can be utilized.

FIG. 1B illustrates an example scenario where the system 100 of FIG. 1A can be utilized to detect a potential traffic violation. As shown in FIG. 1B, a potentially offending vehicle 122 can be parked or otherwise stopped in a restricted road area 140. The restricted road area 140 can be a bus lane, a bike lane, a no-parking or no-stopping zone (e.g., a no-parking zone in front of a red curb or fire hydrant), a pedestrian crosswalk, or a combination thereof. In other embodiments, the restricted road area 140 can be a restricted parking spot where the potentially offending vehicle 122 does not have the necessary credentials or authorizations to park in the parking spot. The restricted road area 140 can be marked by certain insignia, text, nearby signage, road or curb coloration, or a combination thereof. In other embodiments, the restricted road area 140 can be designated or indicated in a private or public database (e.g., a municipal GIS database) accessible by the control unit 112 of the edge device 102, the server 104, or a combination thereof.

The potential traffic violation can also include illegal double-parking, parking in a space where the time has expired, or parking too close to a fire hydrant.

A carrier vehicle 110 (see also, FIG. 1C) having an edge device 102 (see also FIG. 1A) mounted or installed within the carrier vehicle 110 can drive by (i.e., next to) or behind the potentially offending vehicle 122 parked, stopped, or driving in the restricted road area 140. For example, the carrier vehicle 110 can be driving in a lane or other roadway blocked by the potentially offending vehicle 122. Alternatively, the carrier vehicle 110 can be driving in an adjacent roadway such as a lane next to the restricted road area 140. The carrier vehicle 110 can encounter the potentially offending vehicle 122 while traversing its daily route (e.g., bus route, garbage collection route, etc.).

The edge device 102 can capture videos of the potentially offending vehicle 122 and at least part of the restricted road area 140 using the event camera 114 and the LPR camera 116. In one embodiment, the videos can be in the MPEG-4 Part 12 or MP4 file format. In some embodiments, the videos can refer to multiple videos captured by the event camera 114, the LPR camera 116, or a combination thereof. In other embodiments, the videos can refer to one compiled video comprising multiple videos captured by the event camera 114, the LPR camera 116, or a combination thereof.

The control unit 112 of the edge device 102 can then determine a location 130 of the potentially offending vehicle 122 using, in part, a positioning data obtained from the communication and positioning unit 118. The control unit 112 can also determine the location 130 of the potentially offending vehicle 122 using, in part, inertial measurement data obtained from an IMU and wheel odometry data obtained from a wheel odometer of the carrier vehicle 110 via the vehicle bus connector 120.

One or more processors of the control unit 112 can also be programmed to automatically identify objects from the videos by applying a plurality of functions from a computer vision library to the videos to, among other things, read video frames from the videos and pass at least some of the video frames (e.g., the event video frames 124 and the license plate video frames 126) to a plurality of deep learning models (see, e.g., one or more convolutional neural networks) running on the control unit 112. For example, the potentially offending vehicle 122 and the restricted road area 140 can be identified as part of this detection step.

In some embodiments, the one or more processors of the control unit 112 can also pass at least some of the video frames (e.g., the event video frames 124 and the license plate video frames 126) to one or more deep learning models running on the control unit 112 to identify a set of vehicle attributes 134 of the potentially offending vehicle 122. The set of vehicle attributes 134 can include a color of the potentially offending vehicle 122, a make and model of the potentially offending vehicle 122 and a vehicle type of the potentially offending vehicle 122 (e.g., whether the potentially offending vehicle 122 is a personal vehicle or a public service vehicle such as a fire truck, ambulance, parking enforcement vehicle, police car, etc.).

As a more specific example, the control unit 112 can pass the license plate video frames 126 captured by the LPR camera 116 to a license plate recognition engine (e.g., a license plate recognition deep learning model) running on the control unit 112 to recognize an alphanumeric string representing a license plate number 128 of the potentially offending vehicle 122.

The control unit 112 of the edge device 102 can also wirelessly transmit an evidence package 136 comprising at least some of the event video frames 126 and the license plate video frames 126, the location 130 of the potentially offending vehicle 122, one or more timestamps 132, the recognized vehicle attributes 134, and the extracted license plate number 128 of the potentially offending vehicle 122 to the server 104. The evidence package 136 can also comprise one or more first classification results 127A obtained by feeding the event video frames 124 and the license plate video frames 126 into one or more deep learning models running on the edge device 102. Each of the first classification results 127A can be associated with a context-related feature 129.

Each edge device 102 can be configured to continuously take videos of its surrounding environment (i.e., an environment outside of the carrier vehicle 110) as the carrier vehicle 110 traverses its usual carrier route. In these embodiments, the one or more processors of the control unit 112 of each edge device 102 can periodically transmit evidence packages 136 comprising video frames from such videos and data/information concerning the potentially offending vehicles 122 captured in the videos to the server 104.

The server 104 can confirm or further validate that a traffic violation has indeed occurred based in part on classification results associated with a plurality of context features 129. Moreover, the server 104 can confirm or further validate that a traffic violation has indeed occurred based in part on comparing data and videos received from multiple edge devices 102 (where each edge device 102 is mounted or otherwise coupled to a different carrier vehicle 110).

Figure 1C:
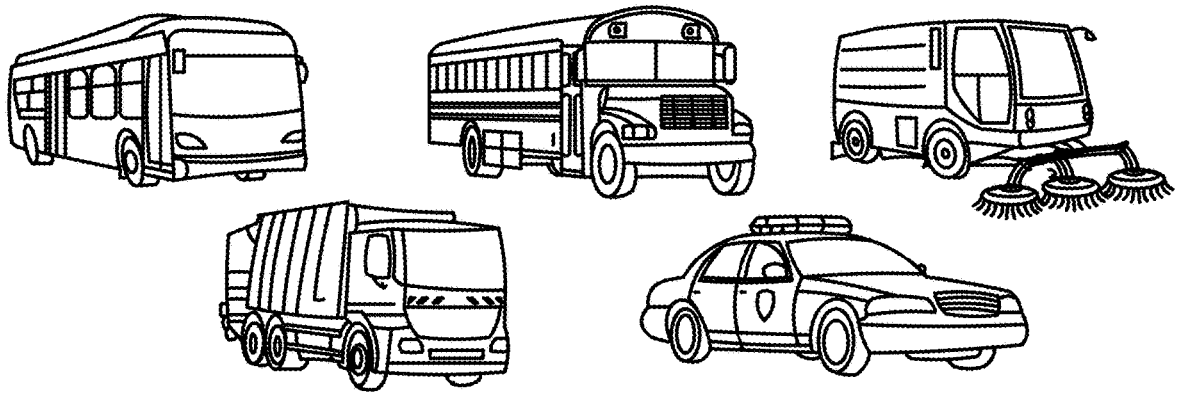
FIG. 1C illustrates different examples of carrier vehicles that can be used to carry the edge device.
Figure 1C:
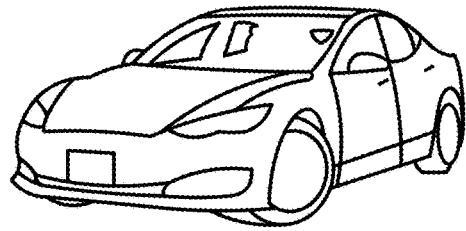
Figure 1C:
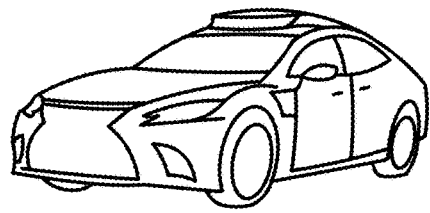

FIG. 1C illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

In alternative embodiments, the edge device 102 can be carried by or otherwise coupled to a micro-mobility vehicle (e.g., an electric scooter). In other embodiments contemplated by this disclosure, the edge device 102 can be carried by or otherwise coupled to an unmanned aerial vehicle (UAV) or drone.

Figure 2A:
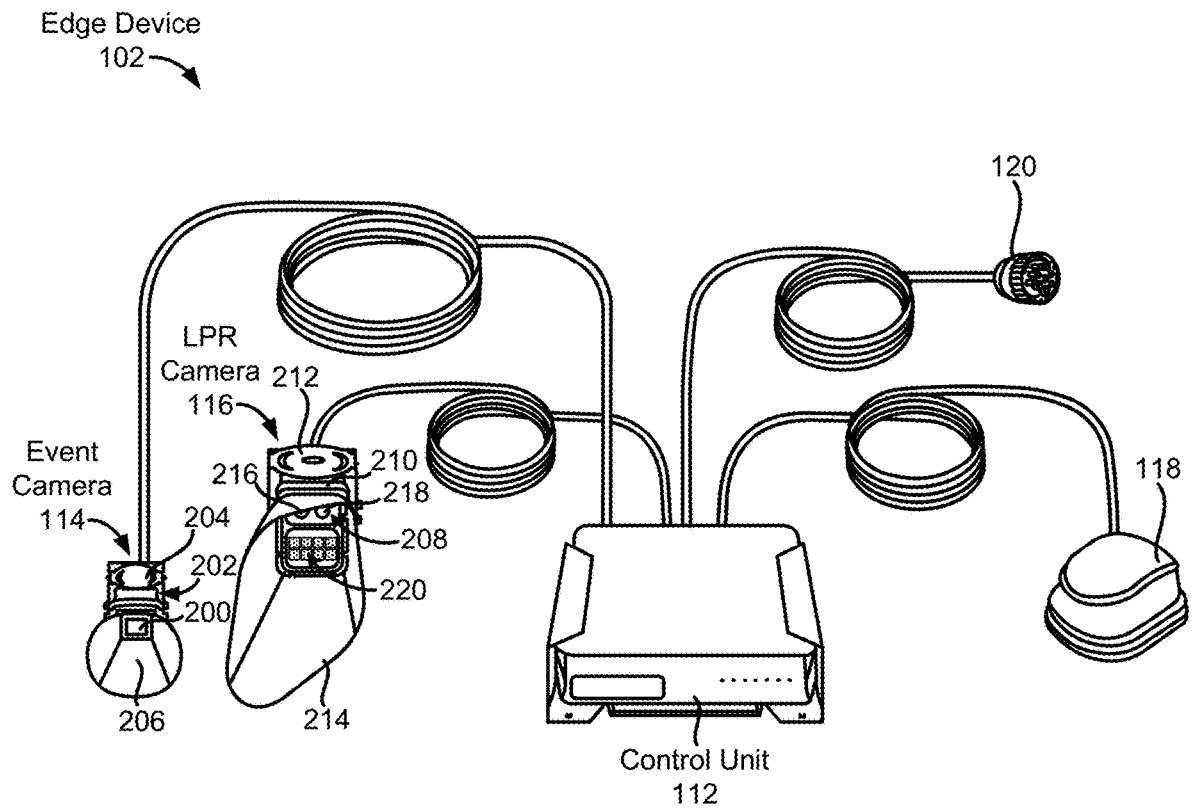
FIG. 2A illustrates one embodiment of an edge device of the system.

FIG. 2A illustrates one embodiment of an edge device 102 of the system 100. The edge device 102 can be any of the edge devices disclosed herein. For purposes of this disclosure, any references to the edge device 102 can also be interpreted as a reference to a specific component, processor, module, chip, or circuitry within the edge device 102. The edge device 102 can be configured for placement behind a windshield of a carrier vehicle 110 (e.g., a fleet vehicle, see FIG. 1C).

As shown in FIG. 2A, the edge device 102 can comprise a control unit 112, an event camera 114 communicatively coupled to the control unit 112, and one or more license plate recognition (LPR) camera cameras 116 communicatively coupled to the control unit 112. The edge device 102 can further comprise a communication and positioning unit 118 and a vehicle bus connector 120. The event camera 114 and the LPR camera 116 can be connected or communicatively coupled to the control unit 112 via high-speed camera interfaces such as a Mobile Industry Processor Interface (MIPI) camera serial interface.

The control unit 112 can comprise a plurality of processors, memory and storage units, and inertial measurement units (IMUs). The event camera 114 and the LPR camera 116 can be coupled to the control unit 112 via high-speed buses, communication cables or wires, and/or other types of wired or wireless interfaces. The components within each of the control unit 112, the event camera 114, or the LPR camera 116 can also be connected to one another via high-speed buses, communication cables or wires, and/or other types of wired or wireless interfaces.

The processors of the control unit 112 can include one or more central processing units (CPUs), graphical processing units (GPUs), Application-Specific Integrated Circuits (ASICs), field-programmable gate arrays (FPGAs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit 112 can be configured to perform operations at 21 teraflops (TFLOPS).

The processors of the control unit 112 can be configured to run multiple deep learning models or neural networks in parallel and process data received from the event camera 114, the LPR camera 116, or a combination thereof. More specifically, the processor module can be a Jetson Xavier NX™ module developed by NVIDIA Corporation. The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the edge device 102.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multimedia controller (eMMC) storage. For example, the memory and storage units can comprise a 512 gigabyte (GB) SSD, an 8 GB 128-bit LPDDR4× memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the edge device 102 can also be interpreted as a reference to a specific component, processor, module, chip, or circuitry within a component of the edge device 102.

The communication and positioning unit 118 can comprise at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 112 to communicate over a WiFi network such as a WiFi network provided by a carrier vehicle 110, a municipality, a business, or a combination thereof. The WiFi communication module can allow the control unit 112 to communicate over one or more WiFi (IEEE 802.11) communication protocols such as the 802.11n, 802.11ac, or 802.11ax protocol.

The Bluetooth® module can allow the control unit 112 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The communication and positioning unit 118 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the communication and positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 118 can be configured to receive signals from all four of the aforementioned satellite navigation systems or three out of the four satellite navigation systems. For example, the communication and positioning unit 118 can comprise a ZED-F9K dead reckoning module provided by u-blox holding AG.

The communication and positioning unit 118 can provide positioning data that can allow the edge device 102 to determine its own location at a centimeter-level accuracy. The communication and positioning unit 118 can also provide positioning data that can be used by the control unit 112 of the edge device 102 to determine the location 130 of the potentially offending vehicle 122 (see FIG. 1B). For example, the control unit 112 can use positioning data concerning its own location to substitute for the location 130 of the potentially offending vehicle 122. The control unit 112 can also use positioning data concerning its own location to estimate or approximate the location 130 of the potentially offending vehicle 122.

FIG. 2A also illustrates that the edge device 102 can comprise a vehicle bus connector 120 coupled to the control unit 112. The vehicle bus connector 120 can allow the control unit 112 to obtain wheel odometry data from a wheel odometer of a carrier vehicle 110 carrying the edge device 102. For example, the vehicle bus connector 120 can be a J1939 connector. The control unit 112 can take into account the wheel odometry data to determine the location of the potentially offending vehicle 122.

The edge device 102 can also comprise a power management integrated circuit (PMIC). The PMIC can be used to manage power from a power source. In some embodiments, the components of the edge device 102 can be powered by a portable power source such as a battery. In other embodiments, one or more components of the edge device 102 can be powered via a physical connection (e.g., a power cord) to a power outlet or direct-current (DC) auxiliary power outlet (e.g., 12V/24V) of a carrier vehicle 110 carrying the edge device 102.

The event camera 114 can comprise an event camera image sensor 200 contained within an event camera housing 202, an event camera mount 204 coupled to the event camera housing 202, and an event camera skirt 206 coupled to and protruding outwardly from a front face or front side of the event camera housing 202.

The event camera housing 202 can be made of a metallic material (e.g., aluminum), a polymeric material, or a combination thereof. The event camera mount 204 can be coupled to the lateral sides of the event camera housing 202. The event camera mount 204 can comprise a mount rack or mount plate positioned vertically above the event camera housing 202. The mount rack or mount plate of the event camera mount 204 can allow the event camera 114 to be mounted or otherwise coupled to a ceiling and/or headliner of the carrier vehicle 110. The event camera mount 204 can allow the event camera housing 202 to be mounted in such a way that a camera lens of the event camera 114 faces the windshield of the carrier vehicle 110 or is positioned substantially parallel with the windshield. This can allow the event camera 114 to take videos of an environment outside of the carrier vehicle 110 including vehicles parked or in motion near the carrier vehicle 110. The event camera mount 204 can also allow an installer to adjust a pitch/tilt and/or swivel/yaw of the event camera housing 202 to account for a tilt or curvature of the windshield.

The event camera skirt 206 can block or reduce light emanating from an interior of the carrier vehicle 110 to prevent such light from interfering with the videos captured by the event camera image sensor 200. For example, when the carrier vehicle 110 is a municipal bus, the interior of the municipal bus is often lit by artificial lights (e.g., fluorescent lights, LED lights, etc.) to ensure passenger safety. The event camera skirt 206 can block or reduce the amount of artificial light that reaches the event camera image sensor 200 to prevent this light from degrading the videos captured by the event camera image sensor 200. The event camera skirt 206 can be designed to have a tapered or narrowed end and a wide flared end. The tapered end of the event camera skirt 206 can be coupled to a front portion or front face/side of the event camera housing 202. The event camera skirt 206 can also comprise a skirt distal edge defining the wide flared end. In some embodiments, the event camera 114 can be mounted or otherwise coupled in such a way that the skirt distal edge of the event camera skirt 206 is separated from the windshield of the carrier vehicle 110 by a separation distance. In some embodiments, the separation distance can be between about 1.0 cm and 10.0 cm.

In some embodiments, the event camera skirt 206 can be made of a dark-colored non-transparent polymeric material. In certain embodiments, the event camera skirt 206 can be made of a non-reflective material. As a more specific example, the event camera skirt 206 can be made of a dark-colored thermoplastic elastomer such as thermoplastic polyurethane (TPU).

The event camera image sensor 200 can be configured to capture video at a frame rate of between 15 frame per second and up to 60 frames per second (FPS). For example, the event camera image sensor 200 can be a high-dynamic range (HDR) image sensor. The event camera image sensor 200 can capture video images at a minimum resolution of 1920×1080 (or 2 megapixels). As a more specific example, the event camera image sensor 200 can comprise one or more CMOS image sensors provided by OMNIVISION Technologies, Inc.

As previously discussed, the event camera 114 can capture videos of an environment outside of the carrier vehicle 110, including any vehicles parked or in motion near the carrier vehicle 110, as the carrier vehicle 110 traverses its usual carrier route. The control unit 112 can be programmed to apply a plurality of functions from a computer vision library to the videos to read event video frames 124 from the videos and pass the event video frames 124 to a plurality of deep learning models (e.g., convolutional neural networks) running on the control unit 112 to automatically identify objects (e.g., cars, trucks, buses, etc.) and roadways (e.g., the restricted road area 140) from the event video frames 124 in order to determine whether a potential traffic violation has occurred.

As shown in FIG. 2A, the edge device 102 can also comprise an LPR camera 116. The LPR camera 116 can comprise at least two LPR image sensors 208 contained within an LPR camera housing 210, an LPR camera mount 212, coupled to the LPR camera housing 210, and an LPR camera skirt 214 coupled to and protruding outwardly from a front face or front side of the LPR camera housing 210.

The LPR camera housing 210 can be made of a metallic material (e.g., aluminum), a polymeric material, or a combination thereof. The LPR camera mount 212 can be coupled to the lateral sides of the LPR camera housing 210. The LPR camera mount 212 can comprise a mount rack or mount plate positioned vertically above the LPR camera housing 210. The mount rack or mount plate of the LPR camera mount 212 can allow the LPR camera 116 to be mounted or otherwise coupled to a ceiling and/or headliner of the carrier vehicle 110. The LPR camera mount 212 can also allow an installer to adjust a pitch/tilt and/or swivel/yaw of the LPR camera housing 210 to account for a tilt or curvature of the windshield.

The LPR camera mount 212 can allow the LPR camera housing 210 to be mounted in such a way that the LPR camera 116 faces the windshield of the carrier vehicle 110 at an angle. This can allow the LPR camera 116 to capture videos of license plates of vehicles directly in front of or on one side (e.g., a right side or left side) of the carrier vehicle 110.

The LPR camera 116 can comprise a daytime image sensor 216 and a nighttime image sensor 218. The daytime image sensor 216 can be configured to capture images or videos in the daytime or when sunlight is present. Moreover, the daytime image sensor 216 can be an image sensor configured to capture images or videos in the visible spectrum.

The nighttime image sensor 218 can be an infrared (IR) or near-infrared (NIR) image sensor configured to capture images or videos in low-light conditions or at nighttime.

In certain embodiments, the daytime image sensor 216 can comprise a CMOS image sensor manufactured or distributed by OmniVision Technologies, Inc. For example, the daytime image sensor 216 can be the OmniVision OV2311 CMOS image sensor configured to capture videos between 15 FPS and 60 FPS.

The nighttime image sensor 218 can comprise an IR or NIR image sensor manufactured or distributed by OmniVision Technologies, Inc.

In other embodiments not shown in the figures, the LPR camera 116 can comprise one image sensor with both daytime and nighttime capture capabilities. For example, the LPR camera 116 can comprise one RGB-IR image sensor.

The LPR camera can also comprise a plurality of IR or NIR light-emitting diodes (LEDs) 220 configured to emit IR or NIR light to illuminate an event scene in low-light or nighttime conditions. In some embodiments, the IR/NIR LEDs 220 can be arranged as an IR/NIR light array (see FIG. 2A).

The IR LEDs 220 can emit light in the infrared or near-infrared (NIR) range (e.g., about 800 nm to about 1400 nm) and act as an IR or NIR spotlight to illuminate a nighttime environment or low-light environment immediately outside of the carrier vehicle 110. In some embodiments, the IR LEDs 220 can be arranged as a circle or in a pattern surrounding or partially surrounding the nighttime image sensor 218. In other embodiments, the IR LEDs 220 can be arranged in a rectangular pattern, an oval pattern, and/or a triangular pattern around the nighttime image sensor 218.

In additional embodiments, the LPR camera 116 can comprise a nighttime image sensor 218 (e.g., an IR or NIR image sensor) positioned in between two IR LEDs 220. In these embodiments, one IR LED 220 can be positioned on one lateral side of the nighttime image sensor 218 and the other IR LED 220 can be positioned on the other lateral side of the nighttime image sensor 218.

In certain embodiments, the LPR camera 116 can comprise between 3 and 12 IR LEDs 220. In other embodiments, the LPR camera 116 can comprise between 12 and 20 IR LEDs.

In some embodiments, the IR LEDs 220 can be covered by an IR bandpass filter. The IR bandpass filter can allow only radiation in the IR range or NIR range (between about 780 nm to about 1500 nm) to pass while blocking light in the visible spectrum (between about 380 nm to about 700 nm). In some embodiments, the IR bandpass filter can be an optical-grade polymer-based filter or a piece of high-quality polished glass. For example, the IR bandpass filter can be made of an acrylic material (optical-grade acrylic) such as an infrared transmitting acrylic sheet. As a more specific example, the IR bandpass filter can be a piece of poly (methyl methacrylate) (PMMA) (e.g., Plexiglass™) that covers the IR LEDs 220.

In some embodiments, the LPR camera skirt 214 can be made of a dark-colored non-transparent polymeric material. In certain embodiments, the LPR camera skirt 214 can be made of a polymeric material. For example, the LPR camera skirt 214 can be made of a non-reflective material. As a more specific example, the LPR camera skirt 214 can be made of a dark-colored thermoplastic elastomer such as thermoplastic polyurethane (TPU).

Although FIG. 2A illustrates an embodiment of the LPR camera 116 with only one LPR camera skirt 214, it is contemplated by this disclosure that the LPR camera 116 can comprise an outer LPR camera skirt and an inner LPR camera skirt. The inner LPR camera skirt can block IR light reflected by the windshield of the carrier vehicle 110 that can interfere with the videos captured by the nighttime image sensor 218.

The LPR camera skirt 214 can comprise a first skirt lateral side, a second skirt lateral side, a skirt upper side, and a skirt lower side. The first skirt lateral side can have a first skirt lateral side length. The second skirt lateral side can have a second skirt lateral side length. In some embodiments, the first skirt lateral side length can be greater than the second skirt lateral side length such that the first skirt lateral side protrudes out further than the second skirt lateral side. In these and other embodiments, any of the first skirt lateral side length or the second skirt lateral side length can vary along a width of the first skirt lateral side or along a width of the second skirt lateral side, respectively. However, in all such embodiments, a maximum length or height of the first skirt lateral side is greater than a maximum length or height of the second skirt lateral side. In further embodiments, a minimum length or height of the first skirt lateral side is greater than a minimum length or height of the second skirt lateral side. The skirt upper side can have a skirt upper side length or a skirt upper side height. The skirt lower side can have a skirt lower side length or a skirt lower side height. In some embodiments, the skirt lower side length or skirt lower side height can be greater than the skirt upper side length or the skirt upper side height such that the skirt lower side protrudes out further than the skirt upper side. The unique design of the LPR camera skirt 214 can allow the LPR camera 116 to be positioned at an angle with respect to a windshield of the carrier vehicle 110 but still allow the LPR camera skirt 214 to block light emanating from an interior of the carrier vehicle 110 or block light from interfering with the image sensors of the LPR camera 116.

The LPR camera 116 can capture videos of license plates of vehicles parked or in motion near the carrier vehicle 110 as the carrier vehicle 110 traverses its usual carrier route. The control unit 112 can be programmed to apply a plurality of functions from a computer vision library to the videos to read license plate video frames 126 from the videos and pass the license plate video frames 126 to a license plate recognition deep learning model running on the control unit 112 to automatically extract license plate numbers from such license plate video frames 126. For example, the control unit 112 can pass the license plate video frames 126 to the license plate recognition deep learning model running on the control unit 112 to extract license plate numbers of all vehicles detected by an object detection deep learning model running on the control unit 112.

If the control unit 112 determines that a potential traffic violation has occurred, the control unit 112 can generate an evidence package 136 comprising at least some of the event video frames 124, the license plate video frames 126, and data/information concerning the potential traffic violation for transmission to the server 104. The control unit 112 can include the automatically recognized license plate numbers 128 of vehicles 122 involved in the potential traffic violation in the evidence package 136.

As will be discussed in more detail with respect to FIG. 3, once the server 104 has received the evidence package 136, the one or more processors of the server 104 can be programmed to pass the event video frames 124 and the license plate video frames 126 to a plurality of deep learning models (e.g., convolutional neural networks) running on the server 104 to obtain more data/information concerning a context surrounding the detection made by the edge device 102. Such data/information can be in the form of context-related features 129 automatically extracted from the event video frames 124 and the license plate video frames 126 by the deep learning models running on the server 104. The server 104 can then use these context-related features 129 to automatically validate or reject the evidence package 136 received from the edge device 102. Moreover, the server 104 can also use these context-related features 129 to determine whether the evidence package 136 should be recommended for further review by a human reviewer or another round of automated review by the server 104 or another computing device.

Figure 2B:
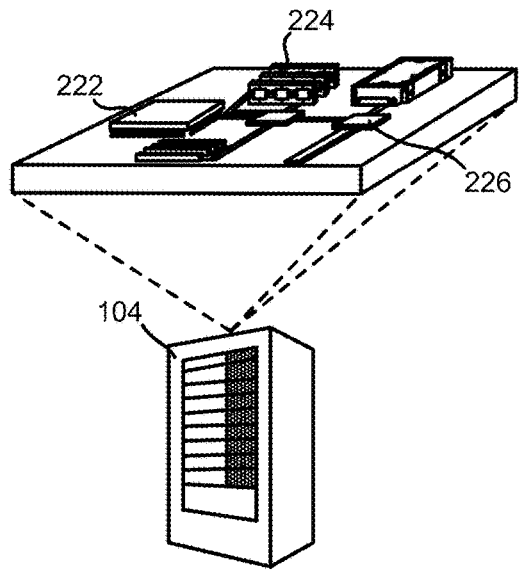
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 222, server memory and storage units 224, and a server communication interface 226. The server processors 222 can be coupled to the server memory and storage units 224 and the server communication interface 226 through high-speed buses or interfaces.

The one or more server processors 222 can comprise one or more CPUs, GPUs, ASICs, FPGAs, or a combination thereof. The one or more server processors 222 can execute software stored in the server memory and storage units 224 to execute the methods or instructions described herein. The one or more server processors 222 can be embedded processors, processor cores, microprocessors, logic circuits, hardware FSMs, DSPs, or a combination thereof. As a more specific example, at least one of the server processors 222 can be a 64-bit processor.

The server memory and storage units 224 can store software, data (including video or image data), tables, logs, databases, or a combination thereof. The server memory and storage units 224 can comprise an internal memory and/or an external memory, such as a memory residing on a storage node or a storage server. The server memory and storage units 224 can be a volatile memory or a non-volatile memory. For example, the server memory and storage units 224 can comprise nonvolatile storage such as NVRAM, Flash memory, solid-state drives, hard disk drives, and volatile storage such as SRAM, DRAM, or SDRAM.

The server communication interface 226 can refer to one or more wired and/or wireless communication interfaces or modules. For example, the server communication interface 226 can be a network interface card. The server communication interface 226 can comprise or refer to at least one of a WiFi communication module, a cellular communication module (e.g., a 4G or 5G cellular communication module), and a Bluetooth®/BLE or other type of short-range communication module. The server 104 can connect to or communicatively couple with each of the edge devices 102 via the server communication interface 226. The server 104 can transmit or receive packets of data using the server communication interface 226.

Figure 2C:
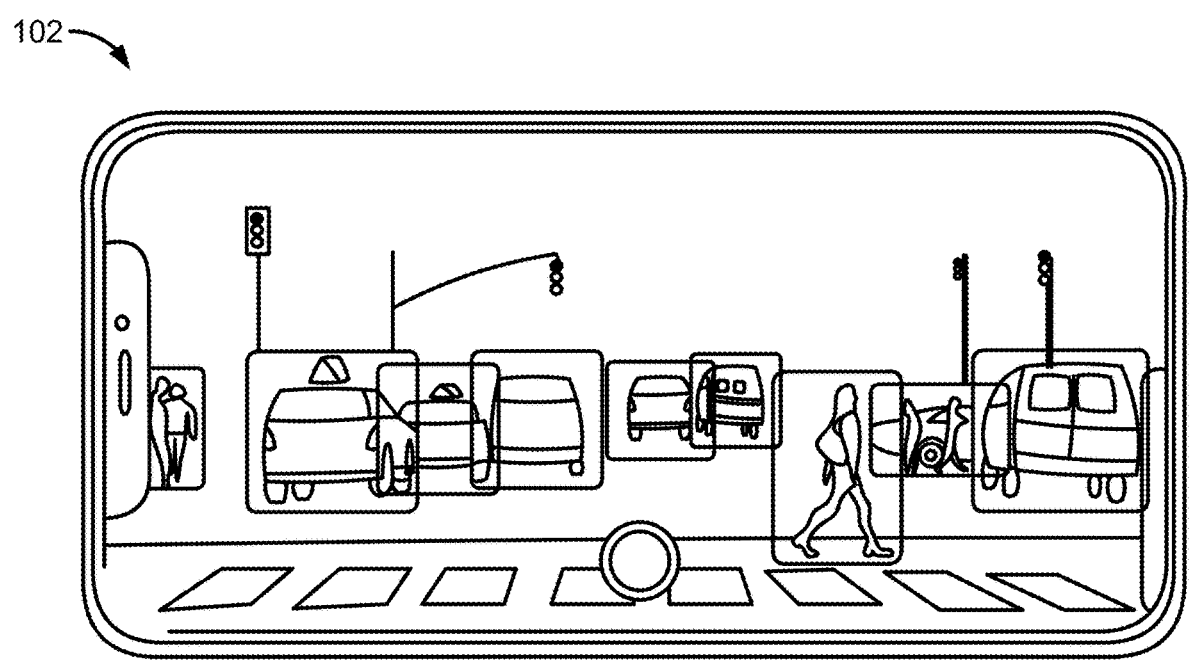
FIG. 2C illustrates another embodiment of the edge device as a personal communication device.

FIG. 2C illustrates an alternative embodiment of the edge device 102 where the edge device 102 is a personal communication device such as a smartphone or tablet computer. In this embodiment, the event camera 114 and the LPR camera 116 of the edge device 102 can be the built-in cameras or image sensors of the smartphone or tablet computer. Moreover, references to the one or more processors, the memory and storage units, the communication and positioning unit 118, and the IMUs of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the ceiling/headliner, windshield, window, console, and/or dashboard of the carrier vehicle 110.

Figure 3:
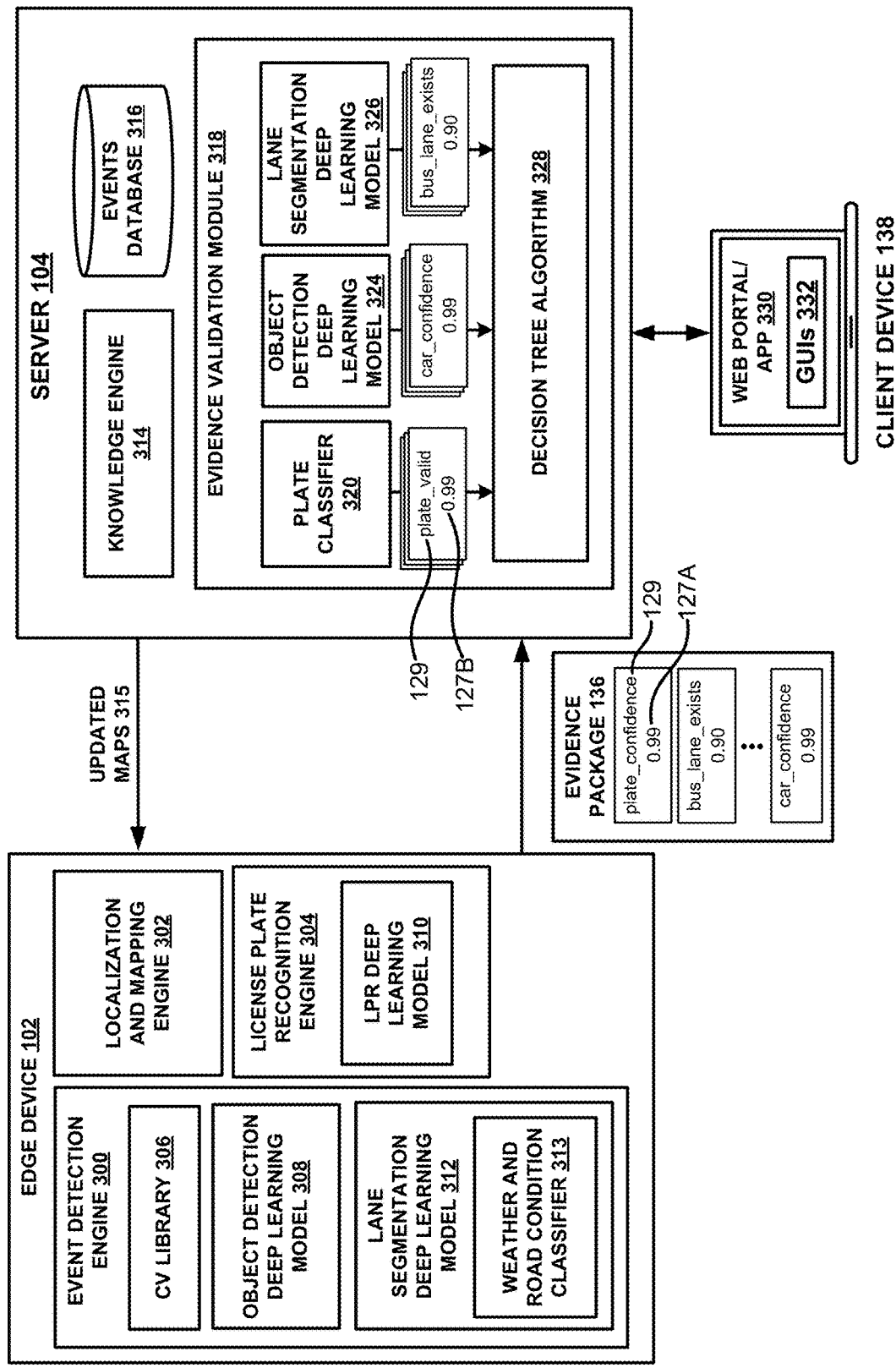
FIG. 3 illustrates various modules and engines of the edge device and server.

FIG. 3 illustrates certain modules and engines of one embodiment of an edge device 102 and the server 104. In some embodiments, the edge device 102 can comprise at least an event detection engine 300, a localization and mapping engine 302, and a license plate recognition engine 304.

Software instructions run on the edge device 102, including any of the engines and modules disclosed herein, can be written in the Java® programming language, C++ programming language, the Python® programming language, the Golang™ programming language, or a combination thereof.

As previously discussed, the edge device 102 can continuously capture videos of an external environment surrounding the edge device 102. For example, the event camera 114 (see FIG. 2A) and the LPR camera 116 (see FIG. 2A) of the edge device 102 can capture everything that is within a field of view of the cameras.

In some embodiments, the event camera 114 can capture videos comprising a plurality of event video frames 124 and the LPR camera 116 can capture videos comprising a plurality of license plate video frames 126.

In alternative embodiments, the event camera 114 can also capture videos of license plates that can be used as license plate video frames 126. Moreover, the LPR camera 116 can capture videos of a traffic violation event that can be used as event video frames 124.

The edge device 102 can retrieve or grab the event video frames 124, the license plate video frames 126, or a combination thereof from a shared camera memory. The shared camera memory can be an onboard memory (e.g., non-volatile memory) of the edge device 102 for storing video frames captured by the event camera 114, the LPR camera 116, or a combination thereof. Since the event camera 114 and the LPR camera 116 are capturing videos at approximately 15 to 60 video frames per second (fps), the video frames are stored in the shared camera memory prior to being analyzed by the event detection engine 300. In some embodiments, the video frames can be grabbed using a video frame grab function such as the GStreamer tool.

The event detection engine 300 can call a plurality of functions from a computer vision library 306 to enhance one or more video frames by resizing, cropping, or rotating the one or more video frames. For example, the event detection engine 300 can crop and resize the one or more video frames to optimize the one or more video frames for analysis by one or more deep learning models or convolutional neural networks running on the edge device 102.

For example, the event detection engine 300 can crop and resize at least one of the video frames to produce a cropped and resized video frame that meets certain size parameters associated with the deep learning models running on the edge device 102. Also, for example, the event detection engine 300 can crop and resize the one or more video frames such that the aspect ratio of the one or more video frames meets parameters associated with the deep learning models running on the edge device 102.

In some embodiments, the computer vision library 306 can be the OpenCV® library maintained and operated by the Open Source Vision Foundation. In other embodiments, the computer vision library 306 can be or comprise functions from the TensorFlow® software library, the SimpleCV® library, or a combination thereof.

The event detection engine 300 can pass or feed at least some of the event video frames 124 to an object detection deep learning model 308 (e.g., an object detection neural network) running on the edge device 102. By passing and feeding video frames to the object detection deep learning model 308, the event detection engine 300 of the edge device 102 can obtain as outputs from the object detection deep learning model 308 predictions and values concerning the objects shown in the video frames. For example, the event detection engine 300 can obtain, as outputs, an object class and a confidence score for each of the objects detected.

In some embodiments, the object detection deep learning model 308 can be configured or trained such that only certain vehicle-related objects are supported by the object detection deep learning model 308. For example, the object detection deep learning model 308 can be configured or trained such that the object classes supported only include cars, trucks, buses, etc. (see, also, FIG. 5A). Also, for example, the object detection deep learning model 308 can be configured or trained such that the object classes supported also include bicycles, scooters, and other types of wheeled mobility vehicles. In some embodiments, the object detection deep learning model 308 can be configured or trained such that the object classes supported also comprise non-vehicle classes such as pedestrians, landmarks, street signs, fire hydrants, bus stops, and building façades.

In some embodiments, the object detection deep learning model 308 can be configured to detect more than 100 (e.g., between 100 and 200) objects per video frame. Although the object detection deep learning model 308 can be configured to accommodate numerous object classes, one advantage of limiting the number of object classes is to reduce the computational load on the processors of the edge device 102, shorten the training time of the neural network, and make the neural network more efficient.

The object detection deep learning model 308 can comprise a plurality of convolutional layers and connected layers trained for object detection (and, in particular, vehicle detection). In one embodiment, the object detection deep learning model 308 can be a convolutional neural network trained for object detection. For example, the object detection deep learning model 308 can be a variation of the Single Shot Detection (SSD) model with a MobileNet backbone as the feature extractor.

In other embodiments, the object detection deep learning model 308 can be the You Only Look Once Lite (YOLO Lite) object detection model.

In some embodiments, the object detection deep learning model 308 can also identify or predict certain attributes of the detected objects. For example, the object detection deep learning model 308 can identify or predict a set of attributes of an object identified as a vehicle (also referred to as vehicle attributes 134) such as the color of the vehicle, the make and model of the vehicle, and the vehicle type (e.g., whether the vehicle is a personal vehicle or a public service vehicle). The vehicle attributes 134 can be used by the event detection engine 300 to make an initial determination as to whether the vehicle shown in the video frames is subject to a municipality's traffic violation rules or policies.

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

As shown in FIG. 3, the edge device 102 can also comprise a license plate recognition engine 304. The license plate recognition engine 304 can be configured to recognize license plate numbers 128 of potentially offending vehicles 122 (see, also, FIG. 5B) in the video frames. For example, the license plate recognition engine 304 can pass license plate video frames 126 captured by the dedicated LPR camera 116 of the edge device 102 to a license plate recognition (LPR) deep learning model 310 running on the edge device 102. The LPR deep learning model 310 can be specifically trained to recognize license plate numbers 128 of vehicles (e.g., the potentially offending vehicle 122) from video frames or images. Alternatively, or additionally, the license plate recognition engine 304 can also pass event video frames 124 to the LPR deep learning model 310 to recognize license plate numbers 128 of vehicles (e.g., the potentially offending vehicle 122) from such video frames or images.

The video frames or images can show the license plate number 128 of the potentially offending vehicle 122 from an overtaking angle (i.e., where the video frame or image shows the back license plate of the potentially offending vehicle 122 as the potentially offending vehicle 122 is driving away from a carrier vehicle 110) or an incoming angle (i.e., where the video frame or image shows the front license plate of the potentially offending vehicle 122 as the potentially offending vehicle 122 is driving toward the carrier vehicle 110).

In some embodiments, the LPR deep learning model 310 can be a neural network trained for license plate recognition. In certain embodiments, the LPR deep learning model 310 can be a modified version of the OpenALPR™ license plate recognition model.

By feeding video frames or images into the LPR deep learning model 310, the edge device 102 can obtain as an output from the license plate recognition engine 304 or the LPR deep learning model 310, a prediction in the form of an alphanumeric string representing the license plate number 128.

In some embodiments, the license plate recognition engine 304 or the LPR deep learning model 310 running on the edge device 102 can generate or output a confidence score associated with a prediction confidence representing the confidence or certainty of its own recognition result (i.e., indicative of or represent the confidence or certainty in the license plate recognized by the LPR deep learning model 310 from the license plate video frames 126). The confidence score can be one of the first classification results 127A included as part of the evidence package 136 and the prediction confidence can be one of the context-related features 129.

The plate recognition confidence score (see, e.g., confidence score 512 in FIG. 5B) can be a number between 0 and 1.00. As previously discussed, the plate recognition confidence score can be included as part of an evidence package 136 transmitted to the server 104. The evidence package 136 can comprise the plate recognition confidence score along with the license plate number 128 predicted by the LPR deep learning model 310.

As will be discussed in more detail in relation to FIGS. 9 and 10A-10G, the server 104 can double-check the license plate recognition undertaken by the edge device 102 by feeding or passing at least some of the same license plate video frames 126 to a license plate classifier 320 running on the server 104.

As previously discussed, the edge device 102 can also comprise a localization and mapping engine 302. The localization and mapping engine 302 can calculate or otherwise estimate the location 130 of the potentially offending vehicle 122 based in part on the present location of the edge device 102 obtained from at least one of the communication and positioning unit 118 (see, e.g., FIG. 2A) of the edge device 102, inertial measurement data obtained from the IMUs of the edge device 102, and wheel odometry data obtained from the wheel odometer of the carrier vehicle 110 carrying the edge device 102. For example, the localization and mapping engine 302 can use the present location of the edge device 102 to represent the location 130 of the potentially offending vehicle 122.

In other embodiments, the localization and mapping engine 302 can estimate the location 130 of the potentially offending vehicle 122 by calculating a distance separating the potentially offending vehicle 122 from the edge device 102 and adding such a separation distance to its own present location. As a more specific example, the localization and mapping engine 302 can calculate the distance separating the potentially offending vehicle 122 from the edge device 102 using video frames containing the license plate of the potentially offending vehicle 122 and a computer vision algorithm (e.g., an image depth analysis algorithm) designed for distance calculation. In additional embodiments, the localization and mapping engine 302 can determine the location 130 of the potentially offending vehicle 122 by recognizing an object or landmark (e.g., a bus stop sign) with a known geolocation associated with the object or landmark near the potentially offending vehicle 122.

The edge device 102 can also record or generate at least a plurality of timestamps 132 marking the time when the potentially offending vehicle 122 was detected at the location 130. For example, the localization and mapping engine 302 can mark the time using a global positioning system (GPS) timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

In some embodiments, the event detection engine 300 can also pass the event video frames 124 to a lane segmentation deep learning model 312 running on the edge device 102. By passing and feeding event video frames 124 to the lane segmentation deep learning model 312, the event detection engine 300 can detect one or more lanes of roadway(s) shown in the video frames. For example, the lane segmentation deep learning model 312 can bound the lanes shown in the video frames in polygons 516 (see FIGS. 5C and 7). The lane segmentation deep learning model 312 can also output image coordinates associated with the polygons 516 bounding such lanes.

In some embodiments, the lane segmentation deep learning model 312 running on the edge device 102 can be a neural network or convolutional neural network trained for lane detection and segmentation. For example, the lane segmentation deep learning model 312 can be a multi-headed convolutional neural network comprising a residual neural network (e.g., a ResNet such as a ResNet34) backbone with a standard mask prediction decoder.

In certain embodiments, the lane segmentation deep learning model 312 can be trained using a dataset designed specifically for lane detection and segmentation. In other embodiments, the lane segmentation deep learning model 312 can also be trained using video frames obtained from other deployed edge devices 102. Moreover, the lane segmentation deep learning model 312 can also be trained to detect lane markings. For example, the lane markings can comprise lane lines, text markings, markings indicating a crosswalk, markings indicating turn lanes, dividing line markings, or a combination thereof.

The server 104 can double-check the detection made by the edge device 102 by feeding or passing at least some of the same event video frames 124 to an objective detection deep learning model 324 and a lane segmentation deep learning model 326 running on the server 104.

FIG. 3 also illustrates that a weather and road condition classifier 313 can be run on the edge device 102. In some embodiments, the weather and road condition classifier 313 can be implemented as one of the heads of the lane segmentation deep learning model 312 (see, also FIGS. 6 and 12).

As will be discussed in more detail in relation to FIG. 12, the weather and road condition classifier 313 can comprise a convolutional backbone 1208 and multiple prediction heads or decoders 1206. The weather and road condition classifier 313 can output classification results (e.g., confidence scores or numerical values) associated with certain weather-related or road condition-related features. For example, the In alternative embodiments, the weather and road condition classifier 313 can be run on the server 104 or run on both the edge device 102 and the server 104.

As will be discussed in more detail in relation to FIGS. 4, 5A-5C, and 7, the object detection deep learning model 308 can bound a potentially offending vehicle 122 detected within an event video frame 124 with a vehicle bounding box 500 (see FIGS. 5A-5C). The object detection deep learning model 308 can also output image coordinates associated with the vehicle bounding box 500.

The image coordinates associated with the vehicle bounding box 500 can be compared with the image coordinates associated with the polygons 516 outputted by the lane segmentation deep learning model 312. The image coordinates associated with the vehicle bounding box 500 can be compared with the image coordinates associated with the polygons 516 to determine an amount of overlap between the vehicle bounding box 500 and a polygon 516 considered a lane-of-interest (LOI) polygon 708 (see FIG. 7). The LOI polygon 708 can bound a lane or road area designated as a restricted road area 140 (e.g., a bus lane, a bike lane, a toll lane, a no-stopping zone, etc.). This can be used by the event detection engine 300 to determine if the potentially offending vehicle 122 detected within the event video frame(s) 124 has potentially committed a traffic violation.

If the edge device 102 detects that a traffic violation may have occurred, the edge device 102 can transmit data, videos, and other files to the server 104 in the form of an evidence package 136. As previously discussed, the evidence package 136 can comprise the event video frames 124, the license plate video frames 126, one or more context-related features 129, and one or more first classification results 127A related to such context-related features 129.

The one or more first classification results 127A can be confidence scores or other types of numerical values outputted by the one or more deep learning models running on the edge device 102. The first classification results 127A can also be boolean values, binary numbers, or a "Yes/No" answer.

For example, the evidence package 136 can comprise a confidence score outputted by the LPR deep learning model 310 concerning a license plate automatically recognized by the LPR deep learning model 310. The evidence package 136 can also comprise confidence scores outputted by the object detection deep learning model 308 concerning vehicles and/or buses detected by the object detection deep learning model 308. The evidence package can further comprise confidence scores outputted by the lane segmentation deep learning model 312 concerning lanes detected by the lane segmentation deep learning model 312. Moreover, the evidence package can also comprise confidence scores outputted by the weather and road condition classifier 313 concerning a detected weather condition or road condition.

The evidence package 136 can also comprise at least one license plate number 128 recognized by the edge device 102 using the license plate video frames 126 as inputs, a location 130 of the potentially offending vehicle 122 estimated or otherwise calculated by the edge device 102, the speed of the carrier vehicle 110 when the potential traffic violation was detected, any timestamps 132 recorded by the control unit 112, and vehicle attributes 134 of the potentially offending vehicle 122 captured by the event video frames 124.

The server 104 can comprise at least a knowledge engine 314, an events database 316, and an evidence validation module 318. Although FIG. 3 illustrates the evidence validation module 318 as being on the same server 104 as the knowledge engine 314 and the events database 316, it is contemplated by this disclosure and it should be understood by one of ordinary skill in the art that at least one of the knowledge engine 314 and the events database 316 can be run on another server or another computing device communicatively coupled to the server 104 or otherwise accessible to the server 104.

Software instructions run on the server 104, including any of the engines and modules disclosed herein and depicted in FIG. 3, can be written in the Ruby® programming language (e.g., using the Ruby on Rails® web application framework), Python® programming language, or a combination thereof.

The knowledge engine 314 can be configured to construct a virtual 3D environment representing the real-world environment captured by the cameras of the edge devices 102. The knowledge engine 314 can be configured to construct three-dimensional (3D) semantic annotated maps from videos and data received from the edge devices 102. The knowledge engine 314 can continuously update such maps based on new videos or data received from the edge devices 102. For example, the knowledge engine 314 can use inverse perspective mapping to construct the 3D semantic annotated maps from two-dimensional (2D) video image data obtained from the edge devices 102.

The semantic annotated maps can be built on top of existing standard definition maps and can be built on top of geometric maps constructed from sensor data and salient points obtained from the edge devices 102. For example, the sensor data can comprise positioning data from the communication and positioning units 118 and IMUs of the edge devices 102 and wheel odometry data from the carrier vehicles 110.

The geometric maps can be stored in the knowledge engine 314 along with the semantic annotated maps. The knowledge engine 314 can also obtain data or information from one or more government mapping databases or government GIS maps to construct or further fine-tune the semantic annotated maps. In this manner, the semantic annotated maps can be a fusion of mapping data and semantic labels obtained from multiple sources including, but not limited to, the plurality of edge devices 102, municipal mapping databases, or other government mapping databases, and third-party private mapping databases. The semantic annotated maps can be set apart from traditional standard definition maps or government GIS maps in that the semantic annotated maps are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps and their geolocations and any rules or regulations concerning such objects are also stored as part of the semantic annotated maps. As a more specific example, all bus lanes or bike lanes within a municipality and their hours of operation/occupancy can be stored as part of a semantic annotated map of the municipality.

The semantic annotated maps can be updated periodically or continuously as the server 104 receives new mapping data, positioning data, and/or semantic labels from the various edge devices 102. For example, a bus serving as a carrier vehicle 110 having an edge device 102 installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs from such detection can be transmitted to the knowledge engine 314 and compared against data already included as part of the semantic annotated maps. If such labels and data match or substantially match what is already included as part of the semantic annotated maps, the detection of this roadway or landmark can be corroborated and remain unchanged. If, however, the labels and data do not match what is already included as part of the semantic annotated maps, the roadway or landmark can be updated or replaced in the semantic annotated maps. An update or replacement can be undertaken if a confidence level or confidence score of the new objects detected is higher than the confidence level or confidence score of objects previously detected by the same edge device 102 or another edge device 102. This map updating procedure or maintenance procedure can be repeated as the server 104 receives more data or information from additional edge devices 102.

As shown in FIG. 3, the server 104 can transmit or deploy revised or updated semantic annotated maps 315 to the edge devices 102. For example, the server 104 can transmit or deploy revised or updated semantic annotated maps 315 periodically or when an update has been made to the existing semantic annotated maps. The updated semantic annotated maps 315 can be used by the edge device 102 to more accurately localize or determine the location of restricted road areas 140 to ensure accurate detection. Ensuring that the edge devices 102 have access to updated semantic annotated maps 315 reduces the likelihood of false positive detections.

In some embodiments, the server 104 can store event data or files included as part of the evidence packages 136 in the events database 316. For example, the events database 316 can store event video frames 124 and license plate video frames 126 received as part of the evidence packages 136 received from the edge devices 102.

As will be discussed in more detail in the following sections, the evidence validation module 318 can analyze the contents of the evidence packages 136 and can make a decision concerning whether any of the evidence packages 136 (or one or more contents therein) is automatically approved, is automatically rejected, or requires further review.

The server 104 can store the contents of an evidence package 136 in the events database 316 even when the evidence package 136 has been automatically rejected or has been subject to further review. In certain embodiments, the events database 316 can store the contents of all evidence packages 136 that have been evaluated by the evidence validation module 318.

The evidence validation module 318 can be configured to evaluate or validate evidence packages 136 received from the edge devices 102. In some embodiments, the evidence validation module 318 can undertake an initial review of an evidence package 136 automatically without relying on human reviewers. In these embodiments, the evidence validation module 318 can undertake the initial review of the evidence package 136 by taking into account certain automatically detected context-related features 129 surrounding a detected violation event to determine whether a traffic violation has indeed occurred.

As previously discussed, the server 104 can receive the evidence package 136 from one of the edge devices 102 coupled to a carrier vehicle 110. The evidence package 136 can comprise, among other things, one or more event video frames 124 and license plate video frames 126 captured by the camera(s) of the edge device 102 showing a potentially offending vehicle 122 involved in a potential traffic violation. The evidence package 136 can also comprise one or more first classification results 127A associated with the context-related features 129.

In some embodiments, the evidence validation module 318 can input at least some of the event video frames 124 and at least some of the license plate video frames 126 into one or more deep learning models running on the server 104 to obtain one or more second classification results 127B associated with one or more context-related features 129.

For example, the evidence validation module 318 can input or feed at least some of the license plate video frames 126 into a license plate classifier 320 running on the server 104 to obtain second classification results 127B concerning license plate-related context features.

As will be discussed in more detail in relation to FIG. 9, the license plate classifier 320 can comprise a convolutional neural network backbone 904 comprising multiple prediction heads 902 connected to the convolutional neural network backbone 904. For example, the license plate classifier 320 can comprise at least two prediction heads 902. In some embodiments, the convolutional neural network backbone 904 can be a residual neural network.

In certain embodiments, the evidence validation module 318 can also input or feed at least some of the event video frames 124 into at least one of an object detection deep learning model 324 and a lane segmentation deep learning model 326 running on the server 104 to obtain second classification results 127B concerning objects and/or lanes detected within the video frames.

The object detection deep learning model 324 running on the server 104 can be similar to the object detection deep learning model 308 running on the edge device 102 except the version of the model running on the server 104 can be a much more powerful model that can detect more object classes and with higher precision. The lane segmentation deep learning model 326 running on the server 104 can be similar to the lane segmentation deep learning model 312 running on the edge device 102 except the version of the model running on the server 104 can be a much more powerful model that can detect more lanes with higher precision.

The object detection deep learning model 324 and the lane segmentation deep learning model 326 can receive as inputs event video frames 124 captured by the edge devices 102. The object detection deep learning model 324 and the lane segmentation deep learning model 326 can extract or otherwise obtain the event video frames 124 from the evidence packages 136 received from the edge devices 102.

Figure 15A:
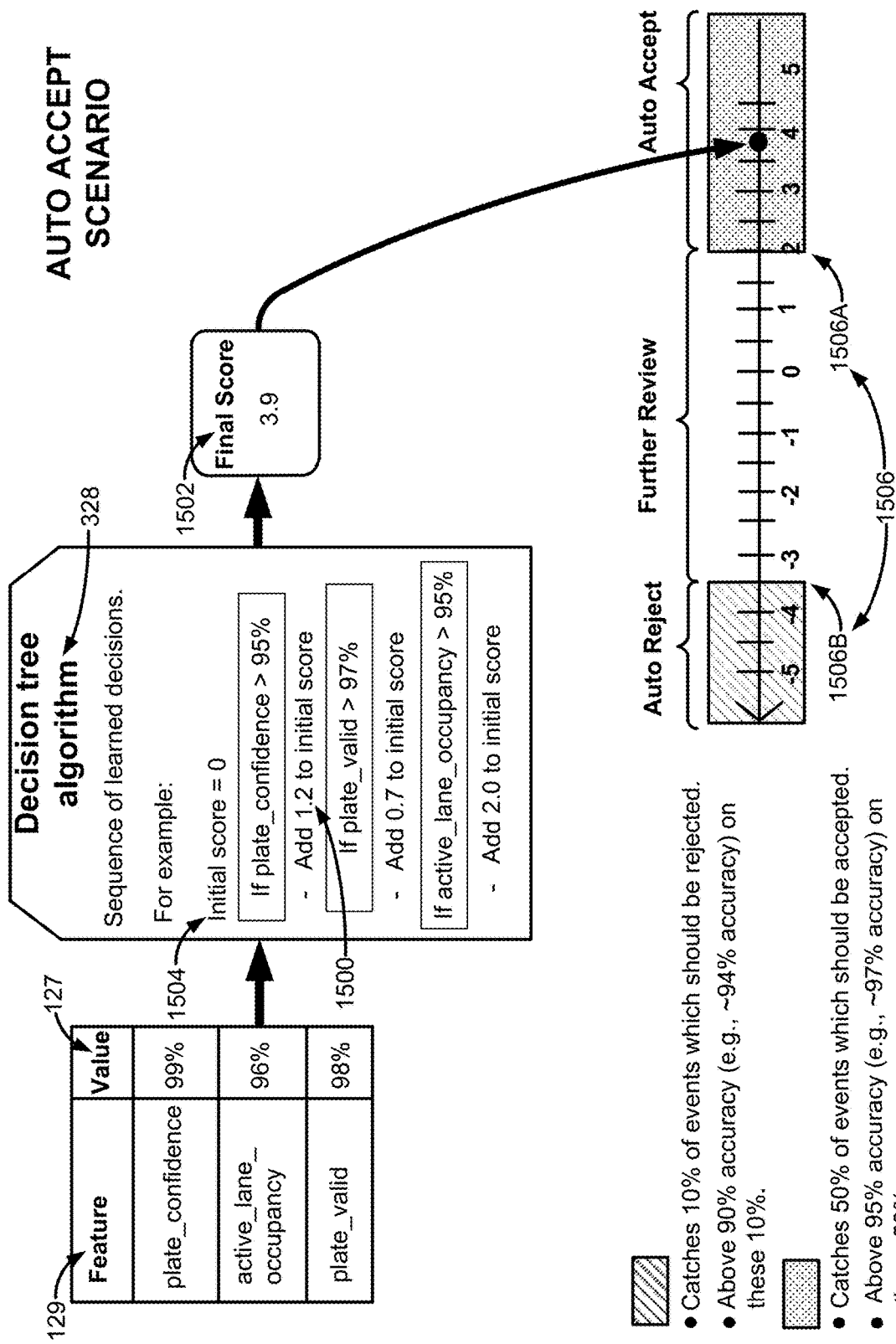
FIG. 15A is a schematic diagram illustrating a scenario where several context features and their accompanying classification results are provided as inputs to a decision tree algorithm to obtain a final score used to evaluate the contents of an evidence package. In this scenario, the evidence package is automatically approved when the final score exceeds a first threshold.
Figure 15B:
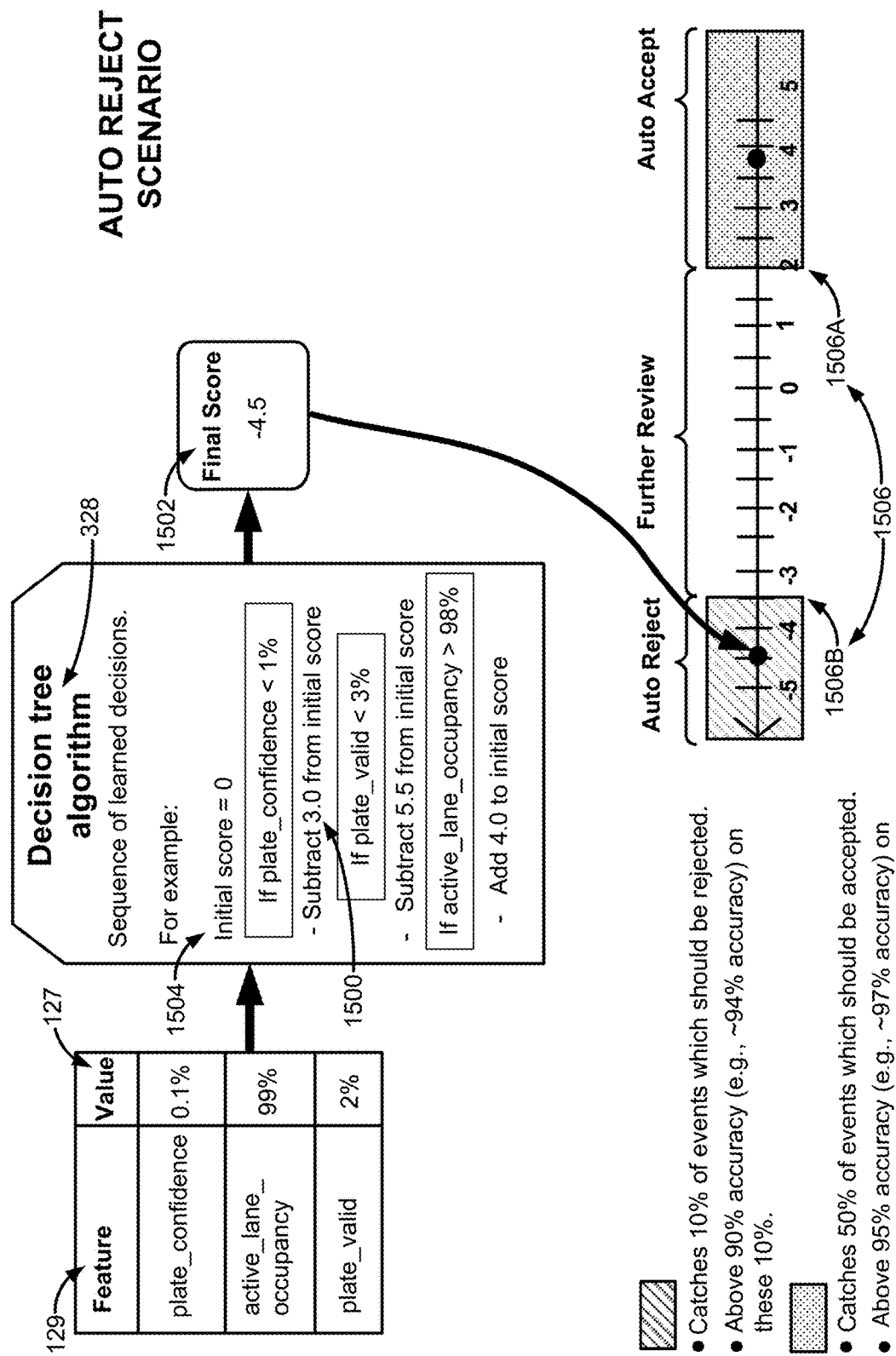
FIG. 15B is another schematic diagram illustrating a scenario where several context features and their accompanying classification results are provided as inputs to a decision tree algorithm to obtain a final score used to evaluate the contents of an evidence package. In this scenario, the evidence package is automatically rejected when the final score fails to meet a second threshold.
Figure 15C:
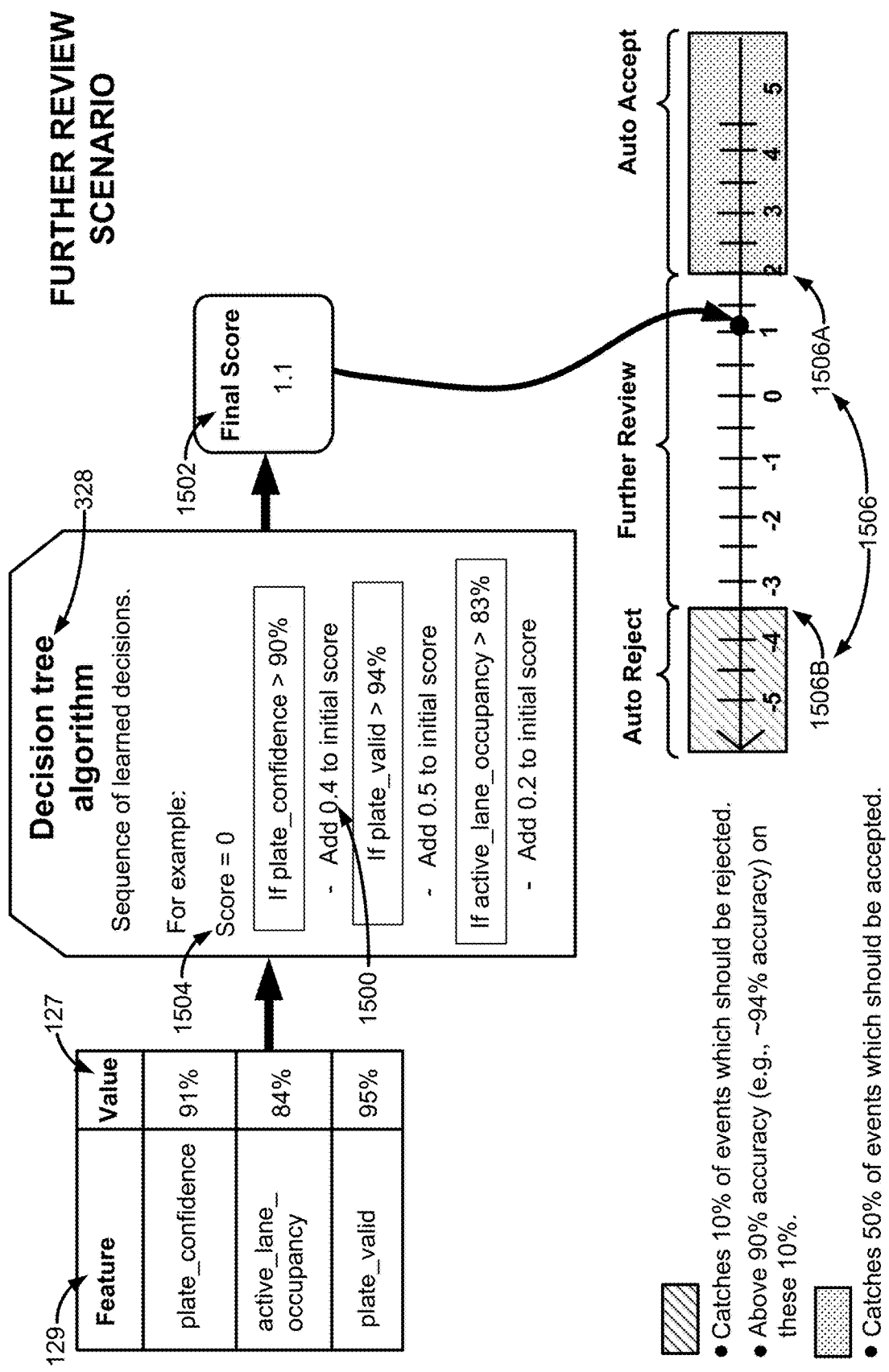
FIG. 15C is another schematic diagram illustrating a scenario where several context features and their accompanying classification results are provided as inputs to a decision tree algorithm to obtain a final score used to evaluate the contents of an evidence package. In this scenario, the evidence package is tagged or otherwise marked for further review when the final score falls between the first threshold and the second threshold.

FIG. 3 also illustrates that the evidence validation module 318 can feed or otherwise input one or more of the first classification results 127A (and their associated context feature 129), one or more of the second classification results 127B (and their associated context features 129), or a combination thereof into a decision tree algorithm 328 to obtain a plurality of contributing scores 1500 (see FIGS. 15A-15C). For example, the evidence validation module 318 can feed or otherwise input only the first classification results 127A (and its associated context feature 129), only the second classification results 127B (and its associated context feature 129), or both the first classification results 127A (and its associated context feature 129) and the second classification results 127B (and its associated context feature 129) into a decision tree algorithm 328 to obtain a plurality of contributing scores 1500 (see FIGS. 15A-15C).

In some embodiments, the decision tree algorithm 328 can be a gradient boosted decision tree algorithm. For example, the decision tree algorithm 328 can be the XGBoost algorithm.

As will be discussed in more detail in relation to FIGS. 15A-15C, each of the contributing scores 1500 can be associated with one of the plurality of features. The evidence validation module 318 can calculate a final score 1502 based on the contributing scores 1500 and evaluate the final score 1502 against one or more predetermined thresholds 1506 to determine whether the evidence package 136 is automatically approved, is automatically rejected, or requires further review (for example, by a human reviewer or a further round of automatic review by the server 104 or another computing device).

As will be discussed in more detail in relation to FIGS. 15A-15C, the one or more predetermined thresholds 1506 can comprise a first threshold 1506A and a second threshold 1506B. The first threshold 1506A can be higher than the second threshold 1506B.

In some embodiments, the evidence validation module 318 can automatically approve the evidence package 136 in response to the final score 1502 being higher than the first threshold 1506A. In these embodiments, the evidence validation module 318 can automatically reject the evidence package 136 in response to the final score 1502 being lower than the second threshold 1506B. Moreover, the evidence validation module 318 can mark or flag the evidence package 136 or otherwise designate the evidence package 136 for further review (e.g., by a human reviewer or another round of machine review) if the final score 1502 is between the first threshold 1506A and the second first threshold 1506A. In these embodiments, the evidence validation module 318 can automatically reject the evidence package 136 in response to the final score 1502 being lower than the second threshold 1506B.

Evidence packages 136 rejected by the evidence validation module 318 can be added to the events database 316 and the contents of such evidence packages 136 can be used to further train the various deep learning models. In some embodiments, the contents of the rejected evidence packages 136 can be discarded or deleted from the server 104.

The server 104 can also render one or more graphical user interfaces (GUIs) 332 that can be accessed or displayed through a web portal or mobile application 330 run on a client device 138. The client device 138 can refer to a portable or non-portable computing device. For example, the client device 138 can refer to a desktop computer or a laptop computer. In other embodiments, the client device 138 can refer to a tablet computer or smartphone.

In some embodiments, one of the GUIs can provide information concerning the context-related features 129 used by the server 104 to validate the evidence packages 136 received by the server 104. The GUIs 332 can also provide data or information concerning times/dates of potential traffic violations and locations of the potential traffic violations.

At least one of the GUIs 332 can provide a video player configured to play back video evidence of the potential traffic violation. For example, at least one of the GUIs 332 can play back videos comprising the event video frames 124, the license plate video frames 126, or a combination thereof.

In another embodiment, at least one of the GUIs 332 can comprise a live map showing real-time locations of all edge devices 102, potential traffic violations, and violation hotspots. In yet another embodiment, at least one of the GUIs 332 can provide a live event feed of all flagged events or potential traffic violations and the validation status of such potential traffic violations.

In some embodiments, the client device 138 can be used by a human reviewer to review the evidence packages 136 that were neither automatically approved nor automatically rejected by the evidence validation module 318. For example, the client device 138 can be used by the human reviewer to review the evidence packages 136 marked or otherwise tagged for further review.

The human reviewer can input their review decision via an interactive feature (e.g., by applying a user input to an "Approve" or "Reject" button or icon) displayed as part of at least one of the GUIs 332 of the web portal or mobile application 330. In some embodiments, the human reviewer can be an administrator of the server 104. In other embodiments, the human reviewer can be an employee or contractor of a third-party violation processing company responsible for reviewing evidence packages 136 that were neither automatically approved nor automatically rejected by the server 104.

In other embodiments, further review of the evidence packages 136 that were neither automatically approved nor automatically rejected can involve submitting the evidence packages 136 to a further round of automated review (e.g., a further round of evidence validation) by the evidence validation module 318 of the server 104 or automated review by another computing device.

Figure 4:
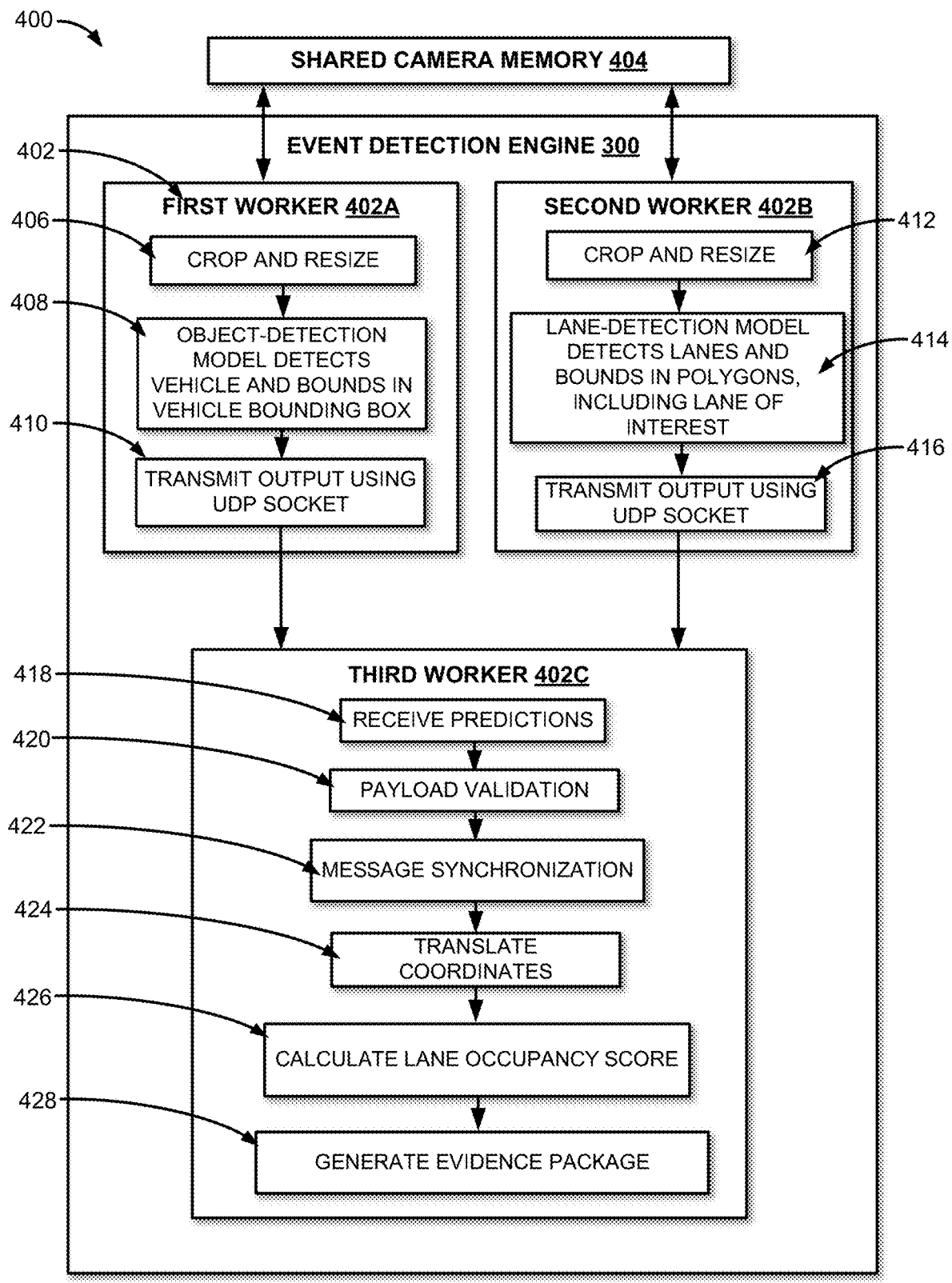
FIG. 4 illustrates one embodiment of a method for detecting a potential traffic violation

FIG. 4 illustrates one embodiment of a method 400 for detecting a potential traffic violation. The method 400 can be undertaken by a plurality of workers 402 of the event detection engine 300 of one of the edge devices 102.

The workers 402 can be software programs or modules dedicated to performing a specific set of tasks or operations. Each worker 402 can be a software program or module dedicated to executing the tasks or operations within a docker container.

As shown in FIG. 4, the output from one worker 402 (e.g., the first worker 402A) can be transmitted to another worker (e.g., the third worker 402C) running on the same edge device 102. For example, the output or results (e.g., the inferences or predictions) provided by one worker can be transmitted to another worker using an inter-process communication protocol such as the user datagram protocol (UDP).

In some embodiments, the event detection engine 300 of each of the edge devices 102 can comprise at least a first worker 402A, a second worker 402B, and a third worker 402C. Although FIG. 4 illustrates the event detection engine 300 comprising three workers 402, it is contemplated by this disclosure that the event detection engine 300 can comprise four or more workers 402 or two workers 402.

As shown in FIG. 4, both the first worker 402A and the second worker 402B can retrieve or grab video frames (e.g., event video frames 124) from a shared camera memory 404. The shared camera memory 404 can be an onboard memory (e.g., non-volatile memory) of the edge device 102 for storing videos captured by the event camera 114. Since the event camera 114 is capturing approximately 15 to 60 video frames per second, the video frames are stored in the shared camera memory 404 prior to being analyzed by the first worker 402A or the second worker 402B. In some embodiments, the video frames can be grabbed using a video frame grab function such as the GStreamer tool.

As will be discussed in more detail in the following sections, the objective of the first worker 402A can be to detect objects of certain object classes (e.g., cars, trucks, buses, etc.) within a video frame and bound each of the objects with a vehicle bounding box 500 (see, e.g., FIGS. 5A and 5C). The objective of the second worker 402B can be to detect one or more lanes within the same video frame and bound the lanes in polygons 516 (see, e.g., FIG. 5C) including bounding a lane-of-interest (LOI) such as a restricted road area 140 in an LOI polygon 708 (see FIG. 7).

The objective of the third worker 402C can be to detect whether a potential traffic violation has occurred by calculating a lane occupancy score 800 (see, e.g., FIGS. 8A and 8B) using outputs (e.g., the vehicle bounding box 500 and the LOI polygon 708) produced and received from the first worker 402A and the second worker 402B.

FIG. 4 illustrates that the first worker 402A can crop and resize an event video frame 124 retrieved from the shared camera memory 404 in operation 406. The first worker 402A can crop and resize the event video frame 124 to optimize the video frame for analysis by one or more deep learning models or convolutional neural networks running on the edge device 102. For example, the first worker 402A can crop and resize the video frame to optimize the video frame for the object detection deep learning model 308 running on the edge device 102.

In one embodiment, the first worker 402A can crop and resize the video frame to meet certain size parameters associated with the object detection deep learning model 308. For example, the first worker 402A can crop and resize the video frame such that the aspect ratio of the video frame meets certain parameters associated with the object detection deep learning model 308.

As a more specific example, the video frames captured by the event camera 114 can have an aspect ratio of 1920×1080. When the event detection engine 300 is configured to determine traffic lane violations, the first worker 402A can be programmed to crop the video frames such that vehicles and roadways with lanes are retained but other objects or landmarks (e.g., sidewalks, pedestrians, building façades) are cropped out.

When the object detection deep learning model 308 is a variation of the Single Shot Detection (SSD) model with a MobileNet backbone as the feature extractor, the first worker 402A can crop and resize the video frames such that the aspect ratio of the video frames meets certain parameters associated with the object detection deep learning model 308.

The method 400 can also comprise detecting a potentially offending vehicle 122 from the video frame and bounding the potentially offending vehicle 122 shown in the video frame with a vehicle bounding box 500 in operation 408. The first worker 402A can be programmed to pass the video frame to the object detection deep learning model 308 to obtain an object class 502, an object detection confidence score 504, and a set of image coordinates 506 for the vehicle bounding box 500 (see, e.g., FIG. 5A).

In some embodiments, the object detection deep learning model 308 can be configured such that only certain vehicle-related objects are supported by the object detection deep learning model 308. For example, the object detection deep learning model 308 can be configured such that the object classes 502 supported only consist of cars, trucks, and buses. In other embodiments, the object detection deep learning model 308 can be configured such that the object classes 502 supported also include bicycles, scooters, and other types of wheeled mobility vehicles. In other embodiments, the object detection deep learning model 308 can be configured such that the object classes 502 supported also comprise non-vehicles classes such as pedestrians, landmarks, street signs, fire hydrants, bus stops, and building façades.

In certain embodiments, the object detection deep learning model 308 can be designed to detect up to 60 objects per video frame. Although the object detection deep learning model 308 can be designed to accommodate numerous object classes 502, one advantage of limiting the number of object classes 502 is to reduce the computational load on the processors of the edge device 102 and make the neural network more efficient.

In some embodiments, the object detection deep learning model 308 can be a convolutional neural network comprising a plurality of convolutional layers and connected layers trained for object detection (and, in particular, vehicle detection). In one embodiment, the object detection deep learning model 308 can be a variation of the Single Shot Detection (SSD) model with a MobileNet backbone as the feature extractor.

In other embodiments, the object detection deep learning model 308 can be the You Only Look Once Lite (YOLO Lite) object detection model. In some embodiments, the first object detection deep learning model 308 can also identify certain attributes of the detected objects. For example, the object detection deep learning model 308 can identify a set of vehicle attributes 134 of an object identified as a car such as the color of the car, the make and model of the car, and the car type (e.g., whether the vehicle is a personal vehicle or a public service vehicle).

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

As previously discussed, the first worker 402A can obtain an object detection confidence score 504 from the object detection deep learning model 308. The object detection confidence score 504 can be between 0 and 1.0. The first worker 402A can be programmed to not apply a vehicle bounding box 500 to a vehicle if the object detection confidence score 504 of the detection is below a preset confidence threshold. For example, the confidence threshold can be set at between 0.65 and 0.90 (e.g., at 0.70). The confidence threshold can be adjusted based on an environmental condition (e.g., a lighting condition), a location, a time-of-day, a day-of-the-week, or a combination thereof.

As previously discussed, the first worker 402A can also obtain a set of image coordinates 506 for the vehicle bounding box 500. The image coordinates 506 can be coordinates of corners of the vehicle bounding box 500. For example, the image coordinates 506 for the vehicle bounding box 500 can be x- and y-coordinates for an upper left corner and a lower right corner of the vehicle bounding box 500. In other embodiments, the image coordinates 506 for the vehicle bounding box 500 can be x- and y-coordinates of all four corners or the upper right corner and the lower left corner of the vehicle bounding box 500.

In some embodiments, the vehicle bounding box 500 can bound the entire two-dimensional (2D) image of the vehicle captured in the video frame. In other embodiments, the vehicle bounding box 500 can bound at least part of the 2D image of the vehicle captured in the video frame such as a majority of the pixels making up the 2D image of the vehicle.

The method 400 can further comprise transmitting the outputs produced by the first worker 402A and/or the object detection deep learning model 308 to a third worker 402C in operation 410. In some embodiments, the outputs produced by the first worker 402A and/or the object detection deep learning model 308 can comprise the image coordinates 506 of the vehicle bounding box 500 and the object class 502 of the object detected (see, e.g., FIG. 5A). The outputs produced by the first worker 402A and/or the object detection deep learning model 308 can be packaged into UDP packets and transmitted using UDP sockets to the third worker 402C.

In other embodiments, the outputs produced by the first worker 402A and/or the object detection deep learning model 308 can be transmitted to the third worker 402C using another network communication protocol such as a remote procedure call (RPC) communication protocol.

FIG. 4 illustrates that the second worker 402B can crop and resize an event video frame 124 retrieved from the shared camera memory 404 in operation 412. In some embodiments, the event video frame 124 retrieved by the second worker 402B can be the same as the event video frame 124 retrieved by the first worker 402A.

In other embodiments, the event video frame 124 retrieved by the second worker 402B can be a different video frame from the video frame retrieved by the first worker 402A. For example, the event video frame 124 can be captured at a different point in time than the video frame retrieved by the first worker 402A (e.g., several seconds or milliseconds before or after). In all such embodiments, one or more vehicles and lanes should be visible in the video frame.

The second worker 402B can crop and resize the event video frame 124 to optimize the video frame for analysis by one or more deep learning models or convolutional neural networks running on the edge device 102. For example, the second worker 402B can crop and resize the event video frame 124 to optimize the video frame for the lane segmentation deep learning model 312.

In one embodiment, the second worker 402B can crop and resize the video frame to meet certain parameters associated with the lane segmentation deep learning model 312. For example, the second worker 402B can crop and resize the event video frame 124 such that the aspect ratio of the video frame meets certain parameters associated with the lane segmentation deep learning model 312.

As a more specific example, the event video frames 124 captured by the event camera 114 can have an aspect ratio of 1920×1080. The second worker 402B can be programmed to crop the event video frames 124 such that vehicles and lanes are retained but other objects or landmarks (e.g., sidewalks, pedestrians, building façades) are cropped out.

The second worker 402B can crop and resize the video frames such that the aspect ratio of the video frames is about 448×256.

When cropping the video frame, the method 400 can further comprise an additional step of determining whether a vanishing point 706 (see, e.g., FIG. 7) is present within the video frame. The vanishing point 706 can be one point or region in the video frame where distal or terminal ends of the lanes shown in the video frame converge into the point or region. Alternatively, the event camera 114 on the edge device 102 can be physically adjusted (for example, as part of an initial calibration routine) until the vanishing point 706 is shown in the video frames captured by the event camera 114. Adjusting the cropping parameters or the event camera 114 until a vanishing point 706 is detected in the video frame can be part of a calibration procedure that is run before deploying the edge devices 102 in the field.

The vanishing point 706 can be used to approximate the sizes of lanes detected by the second worker 402B. For example, the vanishing point 706 can be used to detect when one or more of the lanes within a video frame are obstructed by an object (e.g., a bus, car, truck, or another type of vehicle). The vanishing point 706 will be discussed in more detail in later sections.

The method 400 can also comprise passing the processed video frame (i.e., the cropped, resized, and smoothed video frame) to the lane segmentation deep learning model 312 to detect and bound lanes captured in the video frame in operation 414. The lane segmentation deep learning model 312 can bound the lanes in a plurality of polygons. The lane segmentation deep learning model 312 can be a convolutional neural network trained specifically for lane detection and segmentation.

Figure 6:
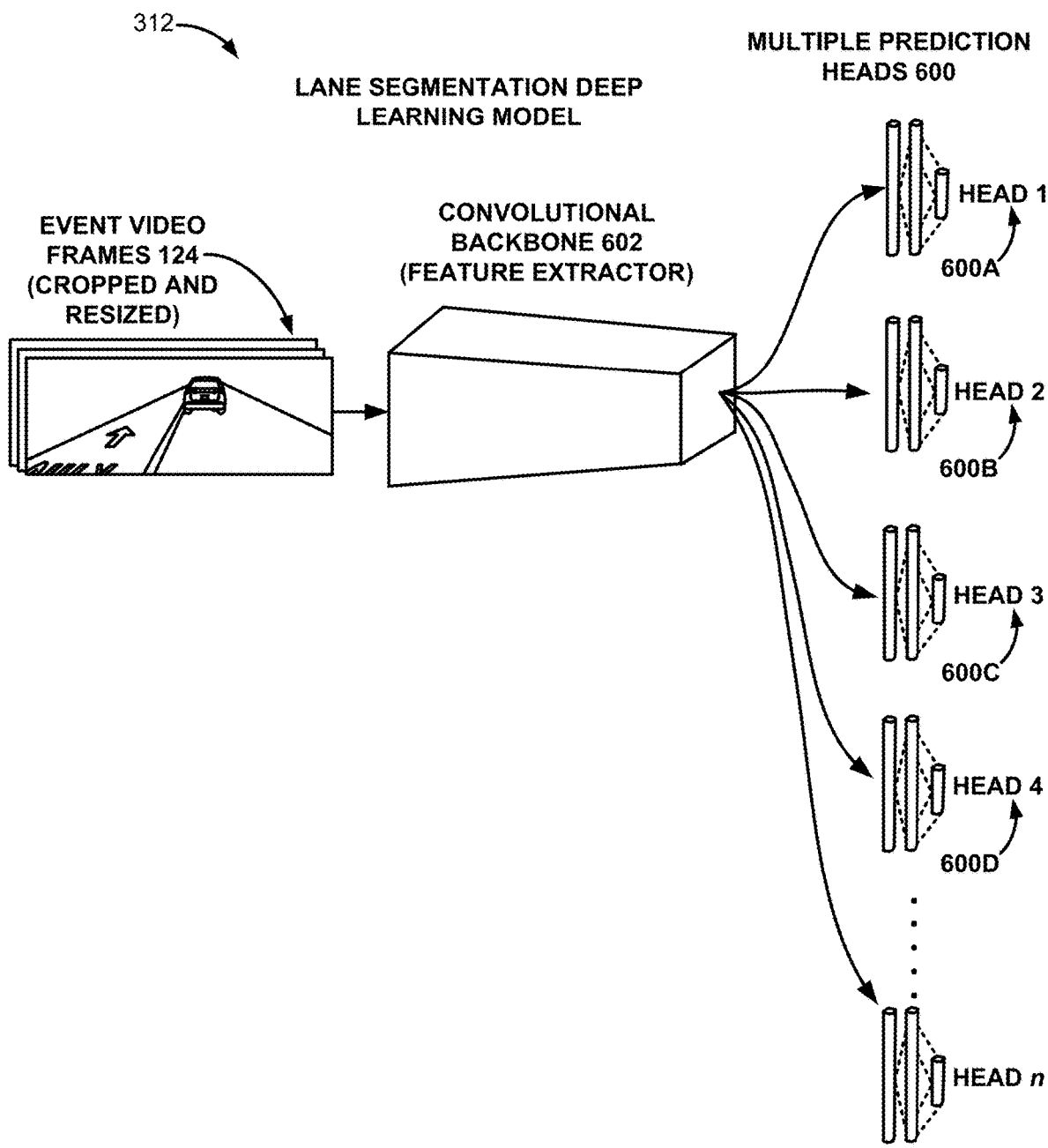
FIG. 6 illustrates a schematic representation of one embodiment of a lane segmentation deep learning model.

In some embodiments, the lane segmentation deep learning model 312 can be a multi-headed convolutional neural network comprising a plurality of prediction heads 600 (see, e.g., FIG. 6). For example, the lane segmentation deep learning model 312 can be a multi-headed convolutional neural network comprising a residual neural network (e.g., a ResNet) backbone with a standard mask prediction decoder.

Each of the heads 600 of the lane segmentation deep learning model 312 can be configured to detect a specific type of lane or lane marking(s). At least one of the lanes detected by the lane segmentation deep learning model 312 can be a restricted road area 140 (e.g., a bus lane, fire lane, bike lane, etc.). The restricted road area 140 can be identified by the lane segmentation deep learning model 312 and a polygon 516 can be used to bound the restricted road area 140. Lane bounding using polygons 516 will be discussed in more detail in later sections.

The method 400 can further comprise transmitting the outputs produced by the second worker 402B and/or the lane segmentation deep learning model 312 to a third worker 402C in operation 416. In some embodiments, the outputs produced by the second worker 402B and/or the lane segmentation deep learning model 312 can be coordinates of the polygons 516 including coordinates of a LOI polygon 708 (see, e.g., FIG. 7). As shown in FIG. 4, the outputs produced by the second worker 402B and/or the lane segmentation deep learning model 312 can be packaged into UDP packets and transmitted using UDP sockets to the third worker 402C.

In other embodiments, the outputs produced by the second worker 402B and/or the lane segmentation deep learning model 312 can be transmitted to the third worker 402C using another network communication protocol such as an RPC communication protocol.

As shown in FIG. 4, the third worker 402C can receive the outputs/results produced by the first worker 402A and the second worker 402B in operation 418. The third worker 402C can receive the outputs/results as UDP packets received over UDP sockets.

The outputs or results received from the first worker 402A can be in the form of predictions or detections made by the object detection deep learning model 312 of the objects captured in the video frame that fit a supported object class 502 (e.g., car, truck, or bus) and the image coordinates 506 of the vehicle bounding boxes 500 bounding such objects. The outputs or results received from the second worker 402B can be in the form of predictions made by the lane segmentation deep learning model 312 of the lanes captured in the video frame and the coordinates of polygons 516 bounding such lanes including the coordinates of at least one LOI polygon 708.

The method 400 can further comprise validating the payloads of UDP packets received from the first worker 402A and the second worker 402B in operation 420. The payloads can be validated or checked using a payload verification procedure such as a payload checksum verification algorithm. This is to ensure the packets received containing the predictions were not corrupted during transmission.

The method 400 can also comprise the third worker 402C synchronizing the payloads or messages received from the first worker 402A and the second worker 402B in operation 422. Synchronizing the payloads or messages can comprise checks or verifications on the predictions or data contained in such payloads or messages such that any comparison or further processing of such predictions or data is only performed if the predictions or data concern objects or lanes in the same video frame (i.e., the predictions or coordinates calculated are not generated from different video frames captured at significantly different points in time).

The method 400 can further comprise translating the coordinates of the vehicle bounding box 500 and the coordinates of the polygons 516 (including the coordinates of the LOI polygon 708) into a uniform coordinate domain in operation 424. Since the same video frame was cropped and resized differently by the first worker 402A (e.g., cropped and resized to an aspect ratio of 500×500 from an original aspect ratio of 1920×1080) and the second worker 402B (e.g., cropped and resized to an aspect ratio of 752×160 from an original aspect ratio of 1920×1080) to suit the needs of their respective convolutional neural networks, the pixel coordinates of pixels used to represent the vehicle bounding box 500 and the polygons 516 must be translated into a shared coordinate domain or back to the coordinate domain of the original video frame (before the video frame was cropped or resized). This is to ensure that any subsequent comparison of the relative positions of boxes and polygons are done in one uniform coordinate domain.

The method 400 can also comprise calculating a lane occupancy score 800 (see, e.g., FIGS. 8A and 8B) based in part on the translated coordinates of the vehicle bounding box 500 and the LOI polygon 708 in operation 426. In some embodiments, the lane occupancy score 800 can be a number between 0 and 1. The lane occupancy score 800 can be calculated using one or more heuristics.

For example, the third worker 402C can calculate the lane occupancy score 800 using a lane occupancy heuristic. The lane occupancy heuristic can comprise the steps of masking or filling in an area within the LOI polygon 708 with certain pixels. The third worker 402C can then determine a pixel intensity value associated with each pixel within at least part of the vehicle bounding box 500. The pixel intensity value can range between 0 and 1 with 1 being a high degree of likelihood that the pixel is located within the LOI polygon 708 and with 0 being a high degree of likelihood that the pixel is not located within the LOI polygon 708. The lane occupancy score 800 can be calculated by taking an average of the pixel intensity values of all pixels within at least part of the vehicle bounding box 500. Calculating the lane occupancy score 800 will be discussed in more detail in later sections.

The method 400 can further comprise detecting that a potential traffic violation has occurred when the lane occupancy score 800 exceeds a predetermined threshold value. The third worker 402C can then generate an evidence package 136 when the lane occupancy score 800 exceeds a predetermined threshold value in operation 428.

In some embodiments, the evidence package 136 can comprise the event video frame 124 (or segments thereof) or other video frames captured by the event camera 114, the positioning data obtained by the communication and positioning unit 118 of the edge device 102, the speed of the carrier vehicle 110 when the potential traffic violation was detected, certain timestamps 132 documenting when the event video frame 124 was captured, a set of vehicle attributes 134 concerning the potentially offending vehicle 122, and an alphanumeric string representing the recognized license plate number 128 of the potentially offending vehicle 122. The evidence package 136 can be prepared by the third worker 402C or another worker on the edge device 102 to be sent to the server 104 or a third-party computing device/resource or client device 138.

Figure 5A:
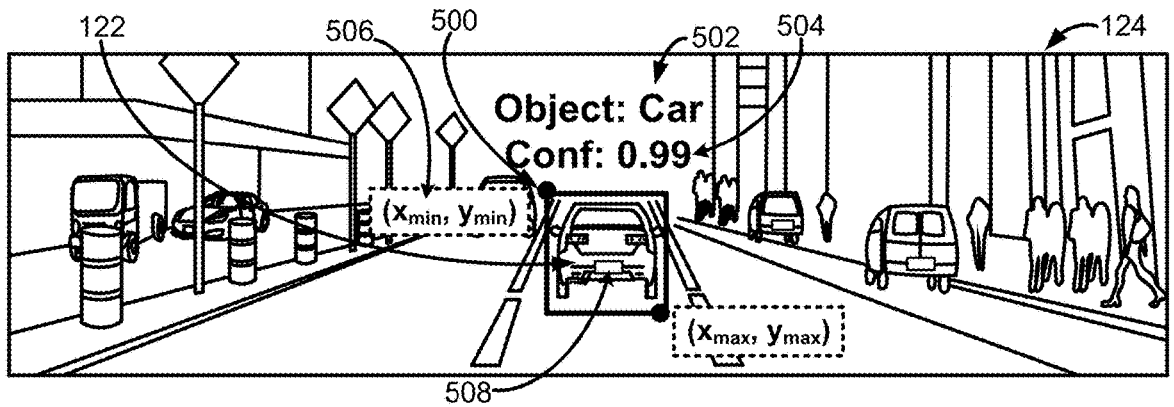
FIG. 5A illustrates an example of an event video frame showing a potentially offending vehicle bounded by a vehicle bounding box.

FIG. 5A illustrates an example of an event video frame 124 showing a potentially offending vehicle 122 bounded by a vehicle bounding box 500. The event video frame 124 can be one of the video frames grabbed or otherwise retrieved by the event detection engine 300 from the videos captured by the event camera 114 of the edge device 102. As previously discussed, the event detection engine 300 can periodically or continuously pass event video frames 124 from the videos captured by the event camera 114 to an object detection deep learning model 308 running on the edge device 102 (see FIG. 3).

As shown in FIG. 5A, the object detection deep learning model 308 can bound the potentially offending vehicle 122 in the vehicle bounding box 500. The event detection engine 300 can obtain as outputs from the object detection deep learning model 308, predictions concerning the objects detected within the video frame including at least an object class 502, an object detection confidence score 504 related to the object detected, and a set of image coordinates 506 for the vehicle bounding box 500.

The object detection confidence score 504 can be between 0 and 1.0. In some embodiments, the control unit 112 of the edge device 102 can abide by the results of the detection only if the object detection confidence score 504 is above a preset confidence threshold. For example, the confidence threshold can be set at between 0.65 and 0.90 (e.g., at 0.70).

The event detection engine 300 can also obtain a set of image coordinates 506 for the vehicle bounding box 500. The image coordinates 506 can be coordinates of corners of the vehicle bounding box 500. For example, the image coordinates 506 can be x- and y-coordinates for an upper left corner and a lower right corner of the vehicle bounding box 500. In other embodiments, the image coordinates 506 can be x- and y-coordinates of all four corners or the upper right corner and the lower left corner of the vehicle bounding box 500.

In some embodiments, the vehicle bounding box 500 can bound the entire two-dimensional (2D) image of the potentially offending vehicle 122 captured in the event video frame 124. In other embodiments, the vehicle bounding box 500 can bound at least part of the 2D image of the potentially offending vehicle 122 captured in the event video frame 124 such as a majority of the pixels making up the 2D image of the potentially offending vehicle 122.

The event detection engine 300 can also obtain as an output from the object detection deep learning model 308 predictions concerning a set of vehicle attributes 134 such as a color, make and model, and vehicle type of the potentially offending vehicle 122 shown in the video frames. The vehicle attributes 134 can be used by the event detection engine 300 to make an initial determination as to whether the vehicle shown in the video frames is subject to the traffic violation policy (e.g., whether the vehicle is allowed to drive in a restricted road area 140).

Figure 5B:
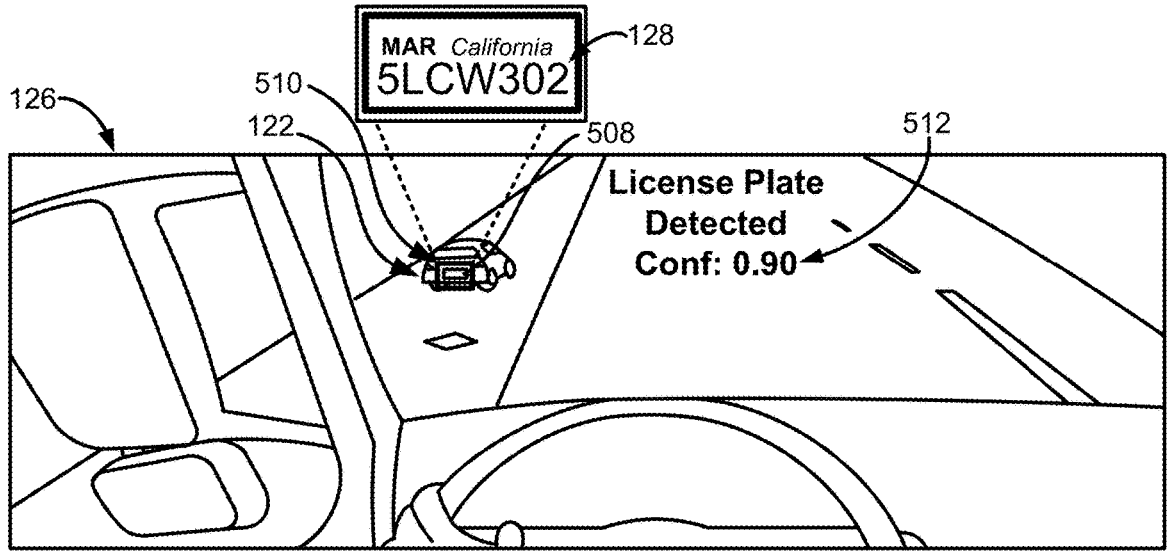
FIG. 5B illustrates an example of a license plate video frame showing a potentially offending vehicle bounded by a vehicle bounding box and a license plate of the potentially offending vehicle bounded by a license plate bounding box.

FIG. 5B illustrates an example of a license plate video frame 126 showing a license plate 508 of the potentially offending vehicle 122 bounded by a license plate bounding box 510. The license plate video frame 126 can be one of the video frames grabbed or otherwise retrieved by the license plate recognition engine 304 from the videos captured by the LPR camera 116 of the edge device 102. As previously discussed, the license plate recognition engine 304 can periodically or continuously pass license plate video frames 126 from the videos captured by the LPR camera 116 to an LPR deep learning model 310 (see FIG. 3) running on the edge device 102.

The LPR deep learning model 310 can be specifically trained to recognize license plate numbers from video frames or images. By feeding the license plate video frame 126 to the LPR deep learning model 310, the control unit 112 of the edge device 102 can obtain as an output from the LPR deep learning model 310, a prediction concerning the license plate number 128 of the potentially offending vehicle 122. The prediction can be in the form of an alphanumeric string representing the license plate number 128. The control unit 112 can also obtain as an output from the LPR deep learning model 310 an LPR confidence score 512 concerning the recognition.

The LPR confidence score 512 can be between 0 and 1.0. In some embodiments, the control unit 112 of the edge device 102 can abide by the results of the recognition only if the LPR confidence score 512 is above a preset confidence threshold. For example, the confidence threshold can be set at between 0.65 and 0.90 (e.g., at 0.70).

Figure 5C:
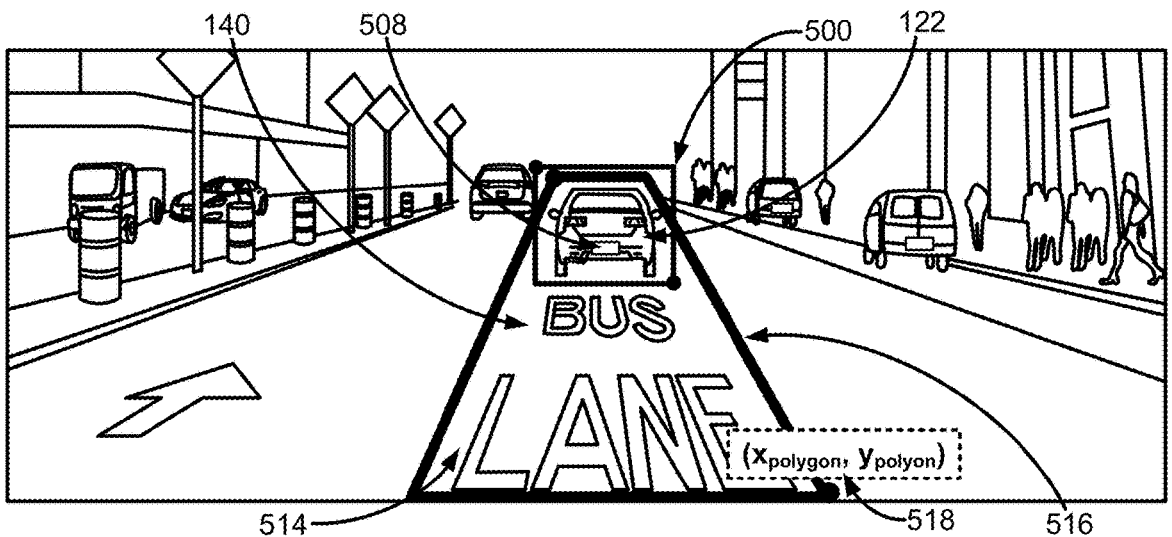
FIG. 5C illustrates another example of an event video frame showing a potentially offending vehicle bounded by a vehicle bounding box and a lane-of-interest bounded by a polygon.

FIG. 5C illustrates another example of an event video frame 124 showing a potentially offending vehicle 122 bounded by a vehicle bounding box 500 and a lane 514 of a roadway bounded by a polygon 516. The event video frame 124 can be one of the video frames grabbed or otherwise retrieved from the videos captured by the event camera 114 of the edge device 102. The event detection engine 300 of the edge device 102 can periodically or continuously pass event video frames 124 to the object detection deep learning model 308 and the lane segmentation deep learning model 312 running on the edge device 102 (see FIG. 3). As discussed above in relation to FIG. 5A, the object detection deep learning model 308 can bound the potentially offending vehicle 122 in the vehicle bounding box 500 and the control unit 112 of the edge device 102 can obtain as outputs from the object detection deep learning model 308, predictions concerning the object class 502, the object detection confidence score 504, and a set of image coordinates 506 for the vehicle bounding box 500.

The event detection engine 300 can also pass or feed event video frames 124 to the lane segmentation deep learning model 312 to detect one or more lanes 514 shown in the event video frames 124. Moreover, the event detection engine 300 can also recognize that one of the lanes 514 detected is a restricted road area 140.

For example, the restricted road area 140 can be a bus lane, a bike lane, a fire lane, toll lane, a high-occupancy vehicle (HOV) lane, or a carpool lane. The restricted road area 140 can be marked by certain insignia, text, nearby signage, road or curb coloration, or a combination thereof. In some embodiments, the lane segmentation deep learning model 312 can recognize one of the lanes 514 as the restricted road area 140 based on the insignia, text, nearby signage, road or curb coloration, or a combination thereof. In other embodiments, the event detection engine 300 can recognize one of the lanes 514 as the restricted road area 140 based on the lane being designated or indicated as restricted in a private or public database (e.g., a municipal GIS database) accessible by the edge device 102, the server 104, or a combination thereof.

As shown in FIG. 5C, the lane segmentation deep learning model 312 can bound the restricted road area 140 in a polygon 516. The lane segmentation deep learning model 312 can also output image coordinates 518 associated with the polygon 516.

In some embodiments, the polygon 516 can be a quadrilateral. More specifically, the polygon 516 can be shaped substantially as a trapezoid.

The event detection engine 300 can determine that the potentially offending vehicle 122 is in motion or parked in the restricted road area 140 based on the amount of overlap between the vehicle bounding box 500 bounding the potentially offending vehicle 122 and the polygon 516 bounding the lane 514 recognized as the restricted road area 140. For example, the image coordinates 506 associated with the vehicle bounding box 500 can be compared with the image coordinates 518 associated with the polygon 516 to determine an amount of overlap between the vehicle bounding box 500 and the polygon 516. As a more specific example, the event detection engine 300 can calculate a lane occupancy score to determine whether the potentially offending vehicle 122 is driving or parked in the restricted road area 140. A higher lane occupancy score can be equated with a higher degree of overlap between the vehicle bounding box 500 and the polygon 516.

Although FIGS. 5A-5C illustrate only one instance of a vehicle bounding box 500 and one instance of a polygon 516, it is contemplated by this disclosure that multiple vehicles can be bounded by vehicle bounding boxes 500 and multiple lanes 514 can be bound by polygons 516 in the same video frame. Moreover, although FIGS. 5A-5C illustrate a visual representation of the vehicle bounding box 500, the license plate bounding box 510, and the polygon 516, it should be understood by one of ordinary skill in the art that the image coordinates of such bounding boxes and polygons and can be used as inputs only by the edge device 102 or the server 104 or stored in the database 107 without the actual vehicle bounding box 500, license plate bounding box 510, or polygon 516 being visualized.

FIG. 6 illustrates a schematic representation of one embodiment of the lane segmentation deep learning model 312. As shown in FIG. 6, the lane segmentation deep learning model 312 can be a multi-headed neural network trained for lane detection and segmentation. For example, the lane segmentation deep learning model 312 can be a multi-headed convolutional neural network.

As shown in FIG. 6, the lane segmentation deep learning model 312 can comprise a plurality of prediction heads 600 operating on top of several shared layers. For example, the prediction heads 600 can comprise a first head 600A, a second head 600B, a third head 600C, and a fourth head 600D. The first head 600A, the second head 600B, the third head 600C, and the fourth head 600D can share a common stack of network layers including at least a convolutional backbone 602 (e.g., a feature extractor).

The convolutional backbone 602 can be configured to receive as inputs event video frames 124 that have been cropped and re-sized by pre-processing operations undertaken by the second worker 402B. The convolutional backbone 602 can then pool certain raw pixel data and sub-sample certain raw pixel regions of the video frames to reduce the size of the data to be handled by the subsequent layers of the network.

The convolutional backbone 602 can extract certain essential or relevant image features from the pooled image data and feed the essential image features extracted to the plurality of prediction heads 600.

The prediction heads 600, including the first head 600A, the second head 600B, the third head 600C, and the fourth head 600D, can then make their own predictions or detections concerning different types of lanes captured by the video frames.

As will be discussed in more detail in relation to FIG. 12, at least one of the heads 600 of the lane segmentation deep learning model 312 can also be trained to detect a current road condition and/or a current weather condition by receiving as inputs the event video frames 124. The current road condition refers to the condition of roadway(s) used by the carrier vehicle 110 and/or the vehicle 122 and the current weather condition refers to the state of the weather (e.g., clear weather, partly cloudy, overcast, raining, snowing, etc.) at the time that the potential traffic violation was detected.

By designing the lane segmentation deep learning model 312 in this manner (i.e., multiple prediction heads 600 sharing the same underlying layers), the second worker 402B can ensure that the predictions made by the various prediction heads 600 are not affected by any differences in the way the image data is processed by the underlying layers.

Although reference is made in this disclosure to four prediction heads 600, it is contemplated by this disclosure that the lane segmentation deep learning model 312 can comprise five or more prediction heads 600 with at least some of the heads 600 detecting different types of lanes. Moreover, it is contemplated by this disclosure that the event detection engine 300 can be configured such that the object detection workflow of the object detection deep learning model 308 is integrated with the lane segmentation deep learning model 312 such that the object detection steps are conducted by an additional head 600 of a singular neural network.

Figure 7:
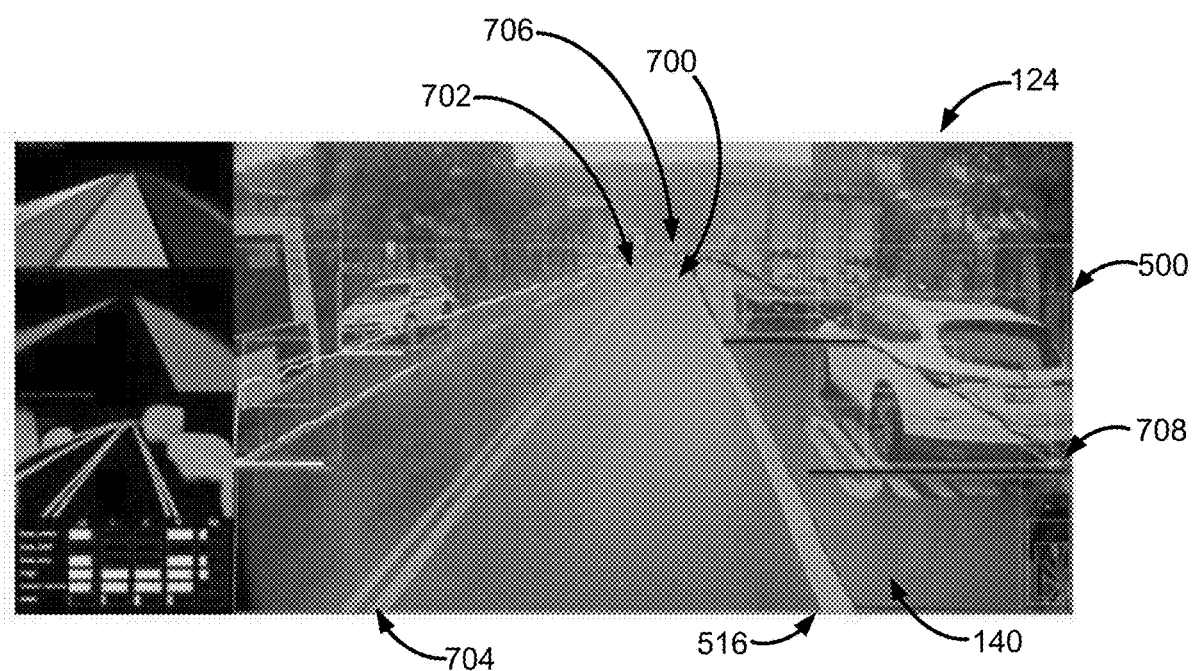
FIG. 7 illustrates example visualizations of several detection outputs of the multi-headed lane segmentation deep learning model.

In some embodiments, the first head 600A of the lane segmentation deep learning model 312 can be trained to detect a lane-of-travel 700 (see, e.g., FIG. 7). The lane-of-travel 700 can also be referred to as an "ego lane."

The lane-of-travel 700 can be the lane currently used by the carrier vehicle 110 carrying the edge device 102 used to capture the event video frames 124 currently being analyzed. The lane-of-travel 700 can be detected using a position of the lane relative to adjacent lanes and the rest of the video frame. The first head 600A can be trained using a dataset designed specifically for lane detection and segmentation. In other embodiments, the first head 600A can also be trained using video frames obtained from deployed edge devices 102.

In these and other embodiments, the second head 600B of the lane segmentation deep learning model 312 can be trained to detect lane markings 704 (see, e.g., FIG. 7). For example, the lane markings 704 can comprise lane lines, text markings, markings indicating a crosswalk, markings indicating turn lanes, dividing line markings, or a combination thereof.

The third head 600C of the lane segmentation deep learning model 312 can be trained to detect the restricted road area 140 (see, e.g., FIG. 7). In some embodiments, the restricted road area 140 can be a bus lane. In other embodiments, the restricted road area 140 can be a bike lane, a fire lane, a toll lane, or a combination thereof. The third head 600C can detect the restricted road area 140 based on a color of the lane, a specific type of lane marking, a lane position, or a combination thereof. The third head 600C can be trained using video frames obtained from deployed edge devices 102. In other embodiments, the third head 600C can also be trained using training data (e.g., video frames) obtained from a dataset.

The fourth head 600D of the lane segmentation deep learning model 312 can be trained to detect one or more adjacent or peripheral lanes 702 (see, e.g., FIG. 7). In some embodiments, the adjacent or peripheral lanes 702 can be lanes immediately adjacent to the lane-of-travel 700 or lanes further adjoining the immediately adjacent lanes. In certain embodiments, the fourth head 600D can detect the adjacent or peripheral lanes 702 based on a position of such lanes relative to the lane-of-travel 700. The fourth head 600D can be trained using video frames obtained from deployed edge devices 102. In other embodiments, the fourth head 600D can also be trained using training data (e.g., video frames) obtained from a dataset.

In some embodiments, the training data (e.g., video frames) used to train the prediction heads 600 (any of the first head 600A, the second head 600B, the third head 600C, or the fourth head 600D) can be annotated using semantic segmentation. For example, the same video frame can be labeled with multiple labels (e.g., annotations indicating a bus lane, a lane-of-travel, adjacent/peripheral lanes, crosswalks, etc.) such that the video frame can be used to train multiple or all of the prediction heads 600.

FIG. 7 illustrates example visualizations of several detection outputs of the multi-headed lane segmentation deep learning model 312 including an example event video frame 124 showing certain vehicle bounding boxes 500 and polygons 516 used to bound the various lanes detected by the lane segmentation deep learning model 312.

For example, the lanes detected by the various heads 600 of the lane segmentation deep learning model 312 can comprise a lane-of-travel 700 and one or more adjacent or peripheral lanes 702 located next to the lane-of-travel 700. The lane-of-travel 700 can be the lane currently used by the carrier vehicle 110 carrying the edge device.

Also, for example, or more heads 600 of the multi-headed lane segmentation deep learning model 312 can detect lane markings 704 that can then be used to detect the lane-of-travel 700 and other lanes 702 adjacent or peripheral to the lane-of-travel 700.

In certain embodiments, the lane-of-travel 700 can first be identified and the restricted road area 140 (e.g., a bus lane) can then be identified relative to the lane-of-travel 700. In some instances, the restricted road area 140 can be adjacent to the lane-of-travel 700. In other instances, the restricted road area 140 can be the same as the lane-of-travel 700 when the carrier vehicle 110 carrying the edge device 102 is actually driving in the restricted road area 140.

The lane markings 704 detected by the one or more prediction heads 600 (see FIG. 6) can also be overlaid on the lanes detected to establish or further cross-check the side and forward boundaries of the lanes detected.

All of the lanes detected can then be bound using polygons 516 to indicate the boundaries of the lanes. The boundaries of such lanes can be determined by combining and reconciling the detection outputs from the various prediction heads 600 including all lanes and lane markings 704 detected.

In some embodiments, the polygons 516 can be quadrilaterals. More specifically, at least some of the polygons 516 can be shaped substantially as trapezoids.

As shown in FIG. 7, a vanishing point 706 in the video frame can be used by at least some of the prediction heads 600 to make their initial raw detections of certain lanes. These raw detection outputs can then be refined as detection outputs from multiple prediction heads 600 are combined and/or reconciled with one another. For example, the boundaries of a detected lane can be adjusted based on the boundaries of other detected lanes adjacent to the detected lane. Moreover, a forward boundary of the detected lane can be determined based on certain lane markings 704 (e.g., a pedestrian crosswalk) detected.

FIG. 7 also illustrates that at least one of the polygons 516 can be a polygon bounding a lane-of-interest (LOI), also referred to as a LOI polygon 708. In some embodiments, the LOI can be the restricted road area 140 such as a bus lane, bike lane, fire lane, or toll lane. In these embodiments, the LOI polygon 708 can bound the bus lane, bike lane, fire lane, or toll lane.

Figure 8A:
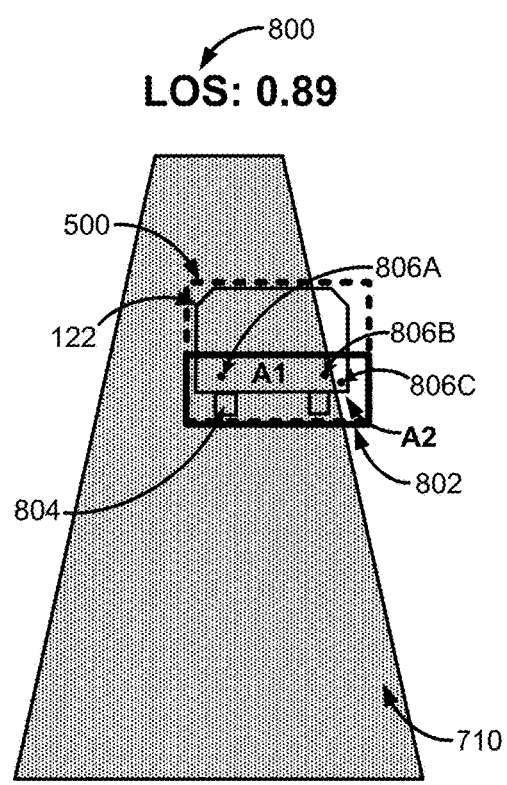
FIGS. 8A and 8B illustrate example scenarios where a lane occupancy score can be calculated.
Figure 8B:
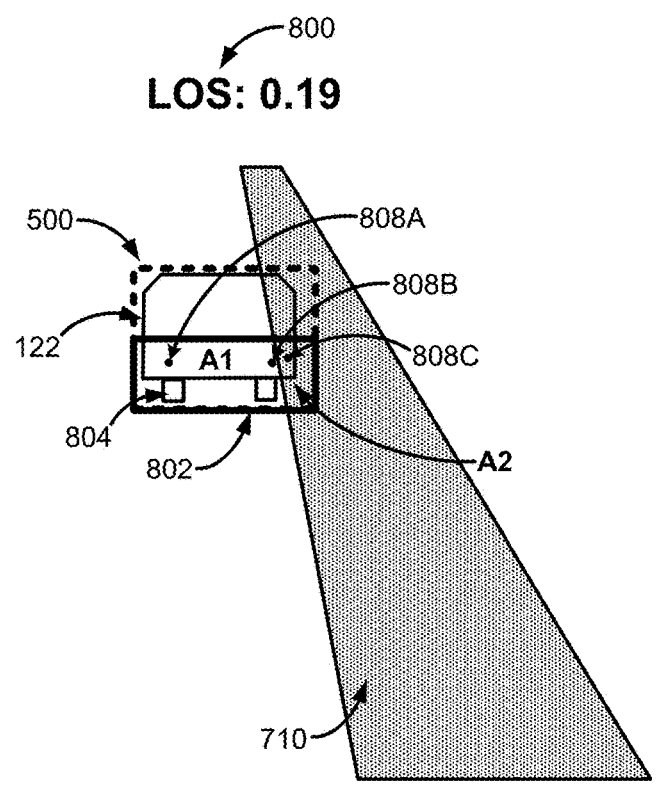

FIGS. 8A and 8B illustrate one embodiment of a method of calculating a lane occupancy score 800. In this embodiment, the lane occupancy score 800 can be calculated based in part on the translated image coordinates 506 of the vehicle bounding box 500 and the translated image coordinates 518 of the LOI polygon 708 (see FIGS. 5A and 5C). As previously discussed, the translated image coordinates 506 of the vehicle bounding box 500 and the LOI polygon 708 can be based on the same uniform coordinate domain (for example, a coordinate domain of the video frame originally captured).

As shown in FIGS. 8A and 8B, an upper portion of the vehicle bounding box 500 can be discarded or left unused such that only a lower portion of the vehicle bounding box 500 (also referred to as a lower bounding box 802) remains. In some embodiments, the lower bounding box 802 can be a truncated version of the vehicle bounding box 500 including only the bottom 5% to 30% (e.g., 15%) of the vehicle bounding box 500. For example, the lower bounding box 802 can be the bottom 15% of the vehicle bounding box 500.

As a more specific example, the lower bounding box 802 can be a rectangular bounding box with a height dimension equal to between 5% to 30% of the height dimension of the vehicle bounding box 500 but with the same width dimension as the vehicle bounding box 500. As another example, the lower bounding box 802 can be a rectangular bounding box with an area equivalent to between 5% to 30% of the total area of the vehicle bounding box 500. In all such examples, the lower bounding box 802 can encompass the tires 804 of the potentially offending vehicle 122 captured in the event video frame 124. Moreover, it should be understood by one of ordinary skill in the art that although the word "box" is used to refer to the vehicle bounding box 500 and the lower bounding box 802, the height and width dimensions of such bounding "boxes" do not need to be equal.

The method of calculating the lane occupancy score 800 can also comprise masking the LOI polygon 708 such that the entire area within the LOI polygon 708 is filled with pixels. For example, the pixels used to fill the area encompassed by the LOI polygon 708 can be pixels of a certain color or intensity. In some embodiments, the color or intensity of the pixels can represent or correspond to a confidence level or confidence score of a detection undertaken by the first worker 402A (from the object detection deep learning model 308), the second worker 402B (from the lane segmentation deep learning model 312), or a combination thereof.

The method can further comprise determining a pixel intensity value associated with each pixel within the lower bounding box 802. The pixel intensity value can be a decimal number between 0 and 1. In some embodiments, the pixel intensity value corresponds to a confidence score or confidence level provided by the lane segmentation deep learning model 312 that the pixel is part of the LOI polygon 708. Pixels within the lower bounding box 802 that are located within a region that overlaps with the LOI polygon 708 can have a pixel intensity value closer to 1. Pixels within the lower bounding box 802 that are located within a region that does not overlap with the LOI polygon 708 can have a pixel intensity value closer to 0. All other pixels including pixels in a border region between overlapping and non-overlapping regions can have a pixel intensity value in between 0 and 1.

For example, as shown in FIG. 8A, a potentially offending vehicle 122 can be parked or in motion in a restricted road area 140 (e.g., a bus lane) that has been bounded by an LOI polygon 708. The LOI polygon 708 has been masked by filling in the area encompassed by the LOI polygon 708 with pixels. A lower bounding box 802 representing a lower portion of the vehicle bounding box 500 has been overlaid on the masked LOI polygon to represent the overlap between the two bounded regions.

FIG. 8A illustrates three pixels within the lower bounding box 802 including a first pixel 806A, a second pixel 806B, and a third pixel 806C. Based on the scenario shown in FIG. 8A, the first pixel 806A is within an overlap region (shown as A1 in FIG. 8A), the second pixel 806B is located on a border of the overlap region, and the third pixel 806C is located in a non-overlapping region (shown as A2 in FIG. 8A). In this case, the first pixel 806A can have a pixel intensity value of about 0.99 (for example, as provided by the second worker 402B), the second pixel 806B can have a pixel intensity value of about 0.65 (as provided by the second worker 402B), and the third pixel 806C can have a pixel intensity value of about 0.09 (also provided by the second worker 402B).

FIG. 8B illustrates an alternative scenario where a potentially offending vehicle 122 is parked or in motion in a lane adjacent to a restricted road area 140 (e.g., a bus lane) that has been bounded by an LOI polygon 708. In this scenario, the potentially offending vehicle 122 is not actually in the restricted road area 140. Three pixels are also shown in FIG. 8B including a first pixel 808A, a second pixel 808B, and a third pixel 808C. The first pixel 808A is within a non-overlapping region (shown as A1 in FIG. 8B), the second pixel 808B is located on a border of the non-overlapping region, and the third pixel 808C is located in an overlap region (shown as A2 in FIG. 8B). In this case, the first pixel 808A can have a pixel intensity value of about 0.09 (for example, as provided by the second worker 402B), the second pixel 808B can have a pixel intensity value of about 0.25 (as provided by the second worker 402B), and the third pixel 808C can have a pixel intensity value of about 0.79 (also provided by the second worker 402B).

With these pixel intensity values determined, a lane occupancy score 800 can be calculated. The lane occupancy score 800 can be calculated by taking an average of the pixel intensity values of all pixels within each of the lower bounding boxes 802. The lane occupancy score 800 can also be considered the mean mask intensity value of the portion of the LOI polygon 708 within the lower bounding box 802.

For example, the lane occupancy score 800 can be calculated using Formula I below:

Formula I:

$$\text{Lane Occupancy Score} = \frac{\sum_{i=1}^{n} \text{Pixel Intensity Value}_i}{n}$$

where n is the number of pixels within the lower portion of the vehicle bounding box (or lower bounding box 802) and where the Pixel Intensity Value$_i$ is a confidence level or confidence score associated with each of the pixels within the LOI polygon 708 relating to a likelihood that the pixel is depicting part of a lane-of-interest such as a restricted road area 140. The pixel intensity values can be provided by the second worker 402B using the lane segmentation deep learning model 312.

The method can further comprise detecting a potential traffic violation when the lane occupancy score 800 exceeds a predetermined threshold value.

Going back to the scenarios shown in FIGS. 8A and 8B, the lane occupancy score 800 of the potentially offending vehicle 122 shown in FIG. 8A can be calculated as approximately 0.89 while the lane occupancy score 800 of the potentially offending vehicle 122 shown in FIG. 8B can be calculated as approximately 0.19. In both cases, the predetermined threshold value for the lane occupancy score 800 can be set at 0.75. With respect to the scenario shown in FIG. 8A, the third worker 402C of the event detection engine 300 can calculate the lane occupancy score 800 and determine that a potential traffic violation has occurred and can begin to generate an evidence package 136 to be sent to the server 104 or a third-party computing device/client device 138. With respect to the scenario shown in FIG. 8B, the third worker 402C can determine that a potential traffic violation has not occurred.

In some embodiments, the lane occupancy score 800 can be included as one of the first classification results 127A transmitted to the server 104. For example, the lane occupancy score 800 can be included as one of the first classification results 127A provided as an input to the decision tree algorithm 328.

Figure 9:
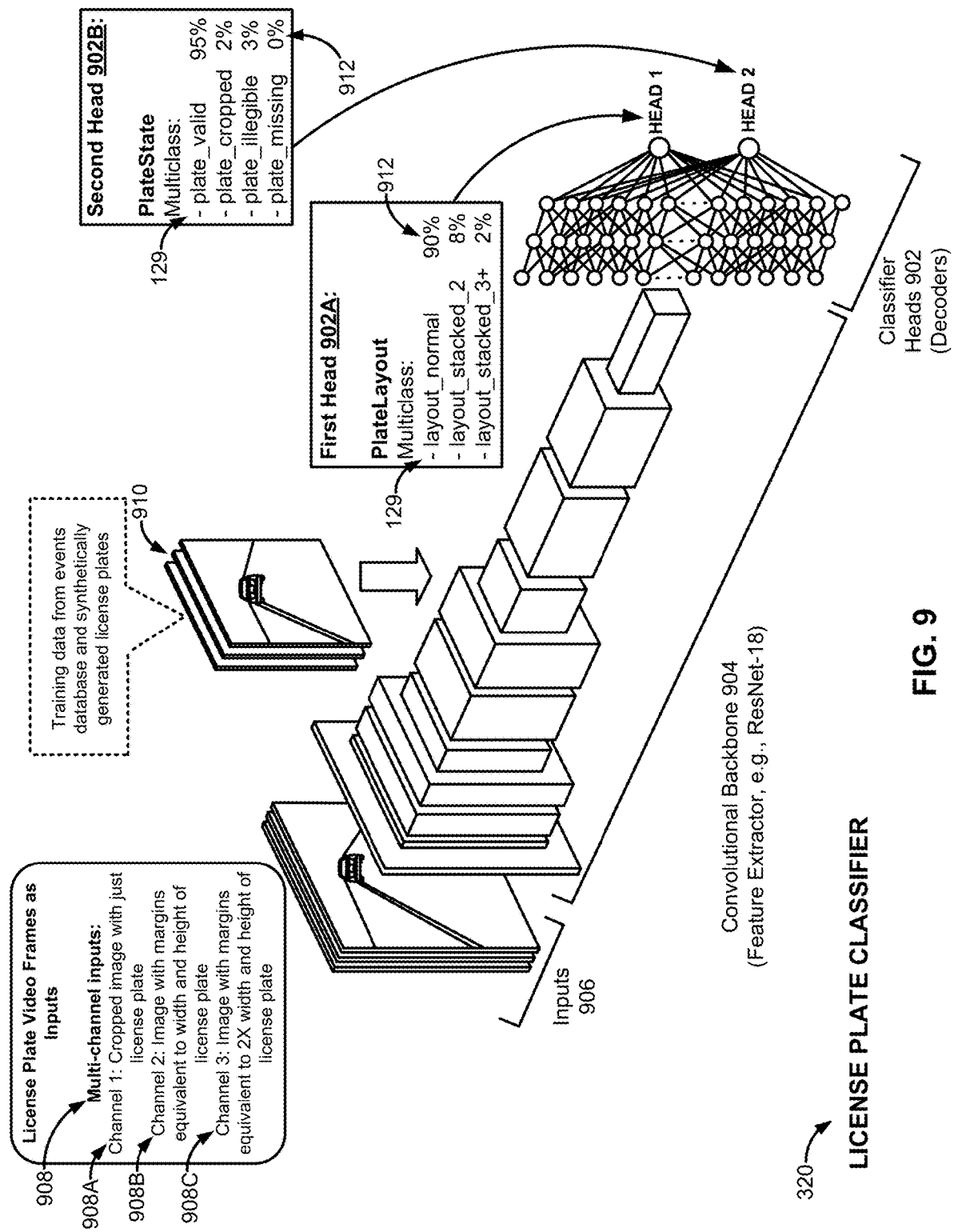
FIG. 9 illustrates one embodiment of a license plate classification deep learning model.

FIG. 9 illustrates one embodiment of a license plate classification deep learning model (referred to herein as a license plate classifier 320) running on the server 104. The license plate classifier 320 can be trained to classify or make predictions concerning a variety of context features 129 related to the license plates 508 (see, e.g., FIGS. 5A-5C) recognized by the LPR deep learning model 310 running on each of the edge devices 102.

One objective of the license plate classifier 320 can be to filter out false-positive LPR results (e.g., signs, structures such as fences, or other objects identified as license plates by the edge device 102 but that are not license plates). Another objective of the license plate classifier 320 can be to identify license plates with license plate numbers that are illegible or distorted in a way that prevents an optical character recognition (OCR) algorithm from reading the entire license plate number. By filtering out false-positive LPR results and license plates with license plate numbers that are illegible or distorted, the license plate classifier 320 can more quickly identify those evidence packages 136 with valid license plates or correctly-identified license plates.

In addition, another objective of the license plate classifier 320 can be to identify license plates with stacked characters that may result in such characters being misread. Also, vehicles with license plates having stacked characters are often exempt from a municipality's traffic violation policies so being able to identify these types of license plates may reduce the number of false-positive violation detections. In some embodiments, evidence packages 136 containing license plates with stacked lettering can be marked for further review by a human reviewer or by additional machine review.

Yet another objective of the license plate classifier 320 can be to identify difficult-to-read license plates to populate a license plate database for use as training data for further training the LPR deep learning model 310 running on the edge devices 102.

The license plate classifier 320 can be or comprise a multi-headed neural network having a shared or single feature extractor or encoder and a plurality of decoders or prediction heads 902.

As shown in FIG. 9, the shared feature extractor or encoder can be or comprise a convolutional backbone 904. In some embodiments, the convolutional backbone 904 can be a residual network. In some embodiments, the residual network serving as the convolutional backbone 904 can be the ResNet-18 convolutional neural network. For example, the residual network can comprise a 72-layer architecture with 18 deep layers. In other embodiments, the residual network can be the ResNet-34, ResNet-50, ResNet-101, ResNet-110, ResNet-152, or ResNet-164 network.

The license plate classifier 320 can receive as inputs 906 license plate video frames 126 captured by the LPR cameras 116 of the edge devices 102. The license plate classifier 320 can extract or otherwise obtain the license plate video frames 126 from the evidence packages 136 received from the edge devices 102.

As shown in FIG. 9, the license plate classifier 320 can be configured to have three input channels 908 including a first input channel 908A, a second input channel 908B, and a third input channel 908C.

In other embodiments, the license plate classifier 320 can be configured to have four input channels 908, five input channels 908, or more than six input channels 908.

In some embodiments, the license plate classifier 320 can receive cropped versions of the same license plate video frame 126 via the input channels 908. The license plate classifier 320 can receive a close-up cropped frame 1100A of the license plate 508 of the potentially offending vehicle 122, a medium cropped frame 1100B of the license plate 508 of the potentially offending vehicle 122, and a large cropped frame 1100C of the license plate 508 of the potentially offending vehicle 122 (see FIGS. 11A-11C).

Figure 11A:
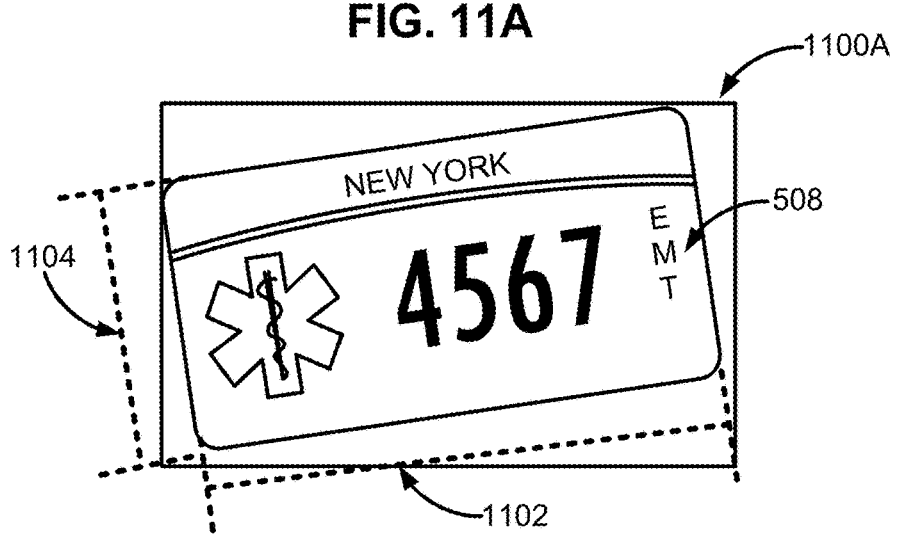
FIG. 11A illustrates an example of a close-up cropped license plate video frame.
Figure 11B:
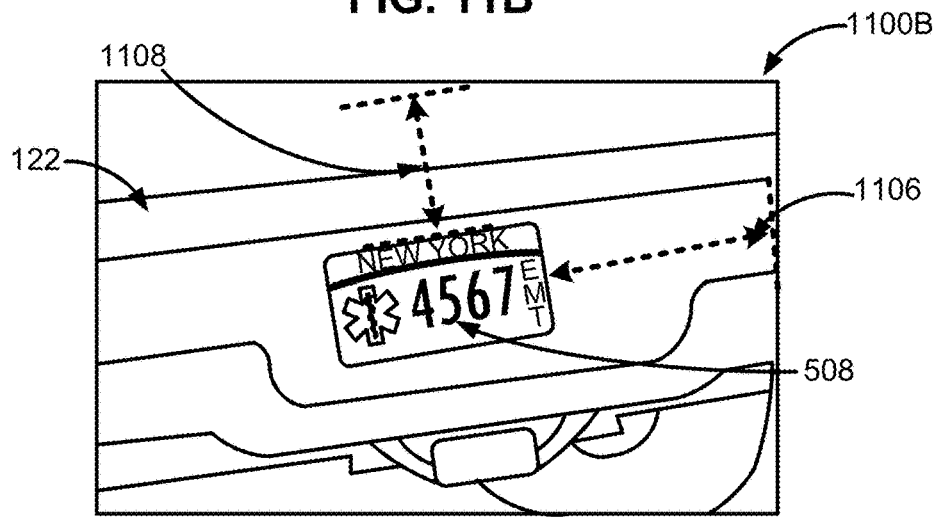
FIG. 11B illustrates an example of a medium cropped license plate video frame.
Figure 11C:
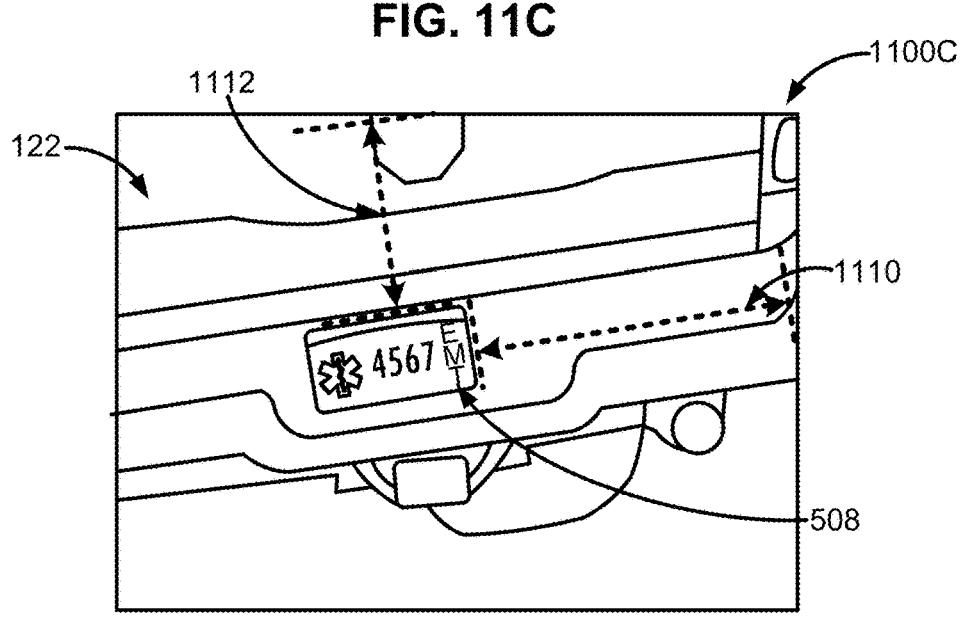
FIG. 11C illustrates an example of a large cropped license plate video frame.

Although FIGS. 11A-11C shows example video frames containing license plates 508, it is contemplated by this disclosure and it should be understood by one of ordinary skill in the art that the license plate classifier 320 can also receive license plate video frames 126 from the edge devices 102 with false-positive results where the LPR deep learning model 310 running on the edge device 102 mistakenly recognizes signage (e.g., signage on vehicles, signage near roadways, etc.) or structures (e.g., fences, benches, building facades, etc.) as a license plate even when no actual license plate is captured in the license plate video frame 126.

As will be discussed in more detail with respect to FIGS. 11A-11C, the close-up cropped frame 1100A can be a cropped video frame showing a close-up of the license plate 508 (or what was recognized as the license plate by the edge device 102). The medium cropped frame 1100B can be a video frame showing the same license plate 508 as the close-up cropped frame 1100A (or what was recognized as the license plate by the edge device 102) but retaining certain margins around the license plate 508 showing parts of the potentially offending vehicle 122. The large cropped frame 1100C can be a video frame showing the same license plate 508 as the close-up cropped frame 1100A and the medium cropped frame 1100B (or what was recognized as the license plate by the edge device 102) but retaining even larger margins around the license plate 508 than the medium cropped frame 1100B and showing a portion of the rear of the potentially offending vehicle 122.

Each of the prediction heads 902 can be configured to undertake a multi-class prediction. As shown in FIG. 9, the license plate classifier 320 can comprise at least two prediction heads 902 including a first prediction head 902A and a second prediction head 902B.

The first prediction head 902A can be a classification head trained to distinguish between normal license plates and stacked license plates or license plates having characters of different sizes. For example, the first prediction head 902A can be trained to distinguish between plates having a normal layout without any stacked or differently-sized lettering (layout_normal) or plates comprising different kinds of stacked lettering or characters of different sizes. For example, the first prediction head 902A (e.g., the PlateLayout head) can classify the input frames into one of the following classes: (1) license plates having a normal layout without any stacked or differently-sized lettering (layout_normal); (2) license plates having one character stacked on top of another or one character that is of a different size than another character (layout_stacked_2); and (3) license plates having at least one character stacked on top of two stacked characters or at least three differently-sized characters (layout_stacked_3+).

The first prediction head 902A can generate or output a set of confidence scores 912 associated with the license plate-related context features 129. The confidence scores 912 can be included as part of a second set of classification results 127B provided as inputs to a decision tree algorithm 328 running on the server 104.

Each of the confidence scores 912 can be between 0 and 1.0 (or 0 and 100%). The confidence scores 912 can be indicative of or represent the confidence of the classification made by the first prediction head 902A.

For example, if the first prediction head 902A receives a license plate video frame 126 with a valid license plate that is not stacked, the first prediction head 902A can make a fairly certain prediction that the license plate shown in the vide frame is a valid license plate by generating or outputting a confidence score 912 of 90% (or above) for the layout_normal class and also generating or outputting low confidence scores 912 of 10% for the other classes (e.g., the layout_stacked_2 class and the layout_stacked_3+class).

The second prediction head 902B can be a classification head trained to distinguish between a license plate video frame 126 containing a recognizable license plate and a non-recognizable license plate where the license plate number 128 in the frame is missing, illegible, or cropped/cut-off. For example, the second prediction head 902B (e.g., the PlateState head) can be trained to classify the input frames according to the following classes: (1) a plate valid class (plate_valid) where a license plate video frame containing a license plate where the license plate number can be correctly recognized or read with a high-degree of certainty; (2) a plate cropped class (plate_cropped) where a license plate video frame containing a cropped license plate such that part of the license plate number is missing; (3) a plate illegible class (plate_illegible) where a license plate video frame containing a license plate where the license plate number is illegible or distorted in a way that prevents a character recognition algorithm such as an optical character recognition (OCR) algorithm from reading its content; and (4) a plate missing class (plate_missing) where the purported license plate captured is not actually a license plate.

The second prediction head 902B can generate or output another set of confidence scores 912 associated with the license plate-related context features 129. The confidence scores 912 can be included as part of a second set of classification results 127B provided as inputs to a decision tree algorithm 328 running on the server 104.

Each of the confidence scores 912 can be between 0 and 1.0 (or 0 and 100%). The confidence scores 912 can be indicative of or represent the confidence of the classification made by the second prediction head 902B.

For example, if the second prediction head 902B receives a license plate video frame 126 with a valid license plate that is neither cropped nor illegible, the second prediction head 902B can make a fairly certain prediction that the license plate shown in the vide frame is a valid license plate by generating or outputting a confidence score 912 of 95% (or above) for the plate_valid class and also generating or outputting low confidence scores 912 for the other classes (e.g., the plate cropped class, the plate illegible class, and the plate missing class).

FIG. 9 also illustrates that the license plate classifier 320 can be trained using training data 910 culled from a variety of sources. The license plate classifier 320 can be continuously trained in order to improve the accuracy and efficacy of the license plate classifier 320. In some embodiments, the training data 910 can comprise license plate video frames retrieved from the events database 316 and synthetically generated license plate images.

The license plate video frames retrieved from the events database 316 can be license plate video frames where the evidence packages 136 containing such video frames were previously validated by the server 104, a client device 138, a human reviewer, or a combination thereof.

The synthetically generated license plate images can be images of actual license plates (where the entire license plate number of each of the license plates was legible and readable) that were artificially cropped and/or artificially made illegible.

In order to ensure good representation of rare classes as well as high variance of selected images, the license plate classifier can also be trained using around 70,000 images of license plates that are clustered into around 1,000 clusters using feature vectors from a previously-trained version of the classifier as image representations. One image from each cluster can then be randomly selected. This procedure can ensure that large clusters of similar images are not overrepresented in the dataset. Next, all images from rare classes can be selected. For every other class, around 200 images can be randomly selected. For all selected images, labels can be assigned by the license plate classifier 320 and then manually reviewed. With improvement of the license plate classifier 320 in subsequent iterations, the scope of manual review can be reduced or skipped altogether.

One technical problem faced by the applicant is how to efficiently and effectively evaluate or assess the accuracy of license plates automatically recognized by an automated license plate recognition model (e.g., the LPR deep learning model 310 running on the edge device 102). This is compounded by the fact that license plates recognized in an urban or municipal environment often comprise plates with special lettering or letter arrangements. One technical solution discovered and developed by the applicant (and disclosed herein) is to input video frames capturing such license plates into a multi-headed deep learning model comprising a shared convolutional backbone (e.g., a convolutional neural network backbone).

Moreover, the applicant discovered that configuring the multi-headed deep learning model to include separate prediction heads trained for classifying license plates having stacked letters or characters works well to separate out license plates that are more likely to be incorrectly recognized. Moreover, license plates with stacked letters or characters are often assigned to vehicles that are normally exempt from a municipality's traffic violation rules or policies (e.g., emergency responder vehicles, law enforcement vehicles, special fleet vehicles, etc.). The applicant discovered that an evidence validation system designed with such a multi-headed license plate classifier can improve the overall accuracy of the system.

FIG. 10A illustrates several examples of license plates having a normal layout without any characters in a stacked arrangement and with all characters being of the same size. As discussed with respect to FIG. 9, the first prediction head 902A of the plate classifier 320 can classify video frames capturing the license plates shown in FIG. 10A as having normal layouts (layout_normal). The layout of the license plate can be considered one of several license plate-related context features 129. As will be discussed in more detail in the following sections, the evidence validation module 318 of the server 104 (see FIG. 3) can feed the license plate-related context features 129 along with their associated confidence scores 912 into a decision tree algorithm 328 running on the server 104 to generate a plurality of contributing scores 1500. A final score 1502 can be calculated based on the plurality of contributing scores 1500. The final score 1502 can then be used to evaluate the evidence package 136 received from the edge device 102 containing such a license plate video frame.

FIG. 10B illustrates several examples of license plates having one character stacked on top of another or one character that is of a different size than another character (layout_stacked_2). As discussed with respect to FIG. 9, the first prediction head 902A of the plate classifier 320 can classify video frames capturing the license plates shown in FIG. 10B as double-stacked license plates or license plates containing at least one character that is of a different size than another character (layout_stacked_2).

FIG. 10C illustrates several examples of license plates having at least one character stacked on top of two stacked characters (a triple-stacked arrangement) or at least three differently-sized characters (layout_stacked_3+). As discussed with respect to FIG. 9, the first prediction head 902A of the plate classifier 320 can classify video frames capturing the license plates shown in FIG. 10C as triple-stacked license plates or license plates having three differently-sized characters (layout_stacked_3+).

As previously discussed, whether the characters of a license plate are arranged in a stacked configuration can be considered one of several plate recognition context features 129 (see FIG. 3 and FIGS. 15A-15C) that can be provided as an input to a decision tree algorithm 328 to obtain a plurality of contributing scores 1500. The server 104 can then calculate a final score 1502 used to evaluate the evidence package 136 based on the contributing scores 1500.

Figure 10D:
FIG. 10D illustrates several examples of license plate video frames where the license plate numbers in such video frames can be automatically recognized with a high-degree of certainty.

FIG. 10D illustrates several examples of license plate video frames where each frame is of a license plate with a license plate number that can be correctly recognized or read with a high-degree of certainty (plate_valid). As discussed with respect to FIG. 9, the second prediction head 902B of the plate classifier 320 can classify each of the license plate video frames as containing a valid or recognizable license plate (plate_valid).

Figure 10E:
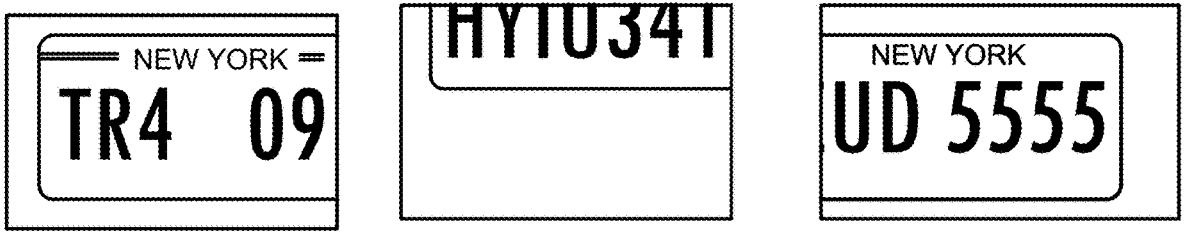
FIG. 10E illustrates several examples of license plate video frames capturing cropped license plates where at least part of a license plate number of each cropped license plate is missing.

FIG. 10E illustrates several examples of license plate video frames where each frame contains a cropped license plate such that part of the license plate number is missing (plate_cropped). As discussed with respect to FIG. 9, the second prediction head 902B of the plate classifier 320 can classify such license plate video frames as containing cropped or incomplete license plates (plate_cropped). As previously discussed, the recognizability of the license plate can be considered one of several plate recognition context features 129 (see FIG. 3 and FIGS. 15A-15C) that can be provided as an input to a decision tree algorithm 328 to obtain a plurality of contributing scores 1500. The server 104 can then calculate a final score 1502 used to evaluate the evidence package 136 based on the contributing scores 1500.

Figure 10F:
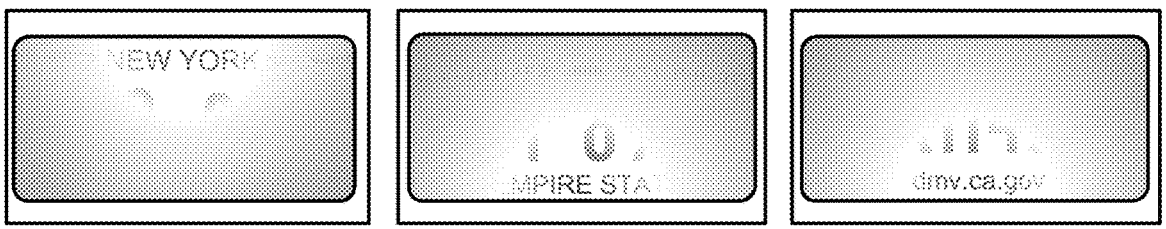
FIG. 10F illustrates several examples of license plate video frames capturing license plates where at least part of a license plate number of each license plate is illegible or distorted.

FIG. 10F illustrates several examples of license plate video frames where each frame contains a license plate where the license plate number is illegible or distorted in a way that prevents a character recognition algorithm from reading its content (plate_illegible). As discussed with respect to FIG. 9, the second prediction head 902B of the plate classifier 320 can classify such license plate video frames as containing illegible or distorted license plate numbers (plate_illegible). As will be discussed in more detail in the following sections, the legibility of the license plate can be considered one of several plate recognition context features 129 (see FIG. 3 and FIGS. 15A-15C) that can be provided as an input to a decision tree algorithm 328 to obtain a plurality of contributing scores 1500. The server 104 can then calculate a final score 1502 used to evaluate the evidence package 136 based on the contributing scores 1500.

Figure 10G:
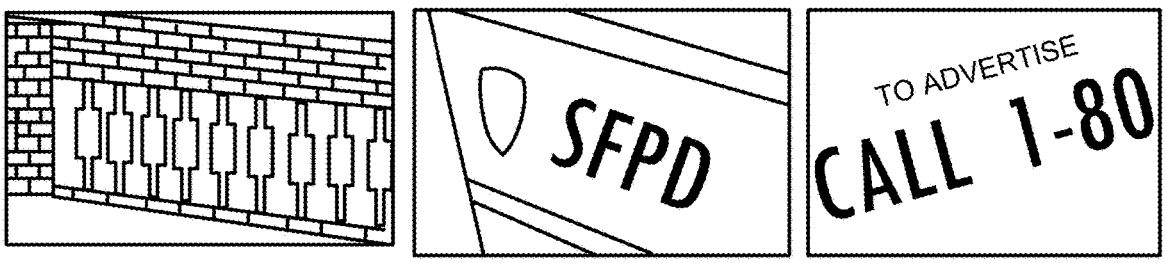
FIG. 10G illustrates several examples of license plate video frames capturing structures or lettering that are not part of a license plate.

FIG. 10G illustrates several examples of video frames where each frame captures a structure, object, or lettering initially recognized as a license plate but where the purported license plate captured is not actually a license plate (plate_missing). In some such cases, the purported license plate can be part of a phone number displayed on an exterior of a vehicle, a logo or insignia displayed on the exterior of a vehicle, or a physical structure that resembles alphanumeric characters. As discussed with respect to FIG. 9, the second prediction head 902B of the plate classifier 320 can classify such license plate video frames as missing actual license plates (plate_missing) by outputting a high confidence score 912 associated with this plate recognition context feature 129. As will be discussed in more detail in the following sections, the lack of an actual license plate can be considered one of several plate recognition context features 129 (see FIG. 3 and FIGS. 15A-15C) that can be provided as an input to a decision tree algorithm 328 to obtain a plurality of contributing scores 1500. The server 104 can then calculate a final score 1502 used to evaluate the evidence package 136 based on the contributing scores 1500.

FIG. 11A illustrates a close-up cropped frame 1100A of the license plate 508 of the potentially offending vehicle 122. As previously discussed with respect to FIG. 9, the close-up cropped frame 1100A can be one of the inputs 906 received by the license plate classifier 320. In some embodiments, the close-up cropped frame 1100A can be received via the first input channel 908A of the license plate classifier 320. As shown in FIG. 11A, the close-up cropped frame 1100A can comprise a close-up of the license plate 508 without much of the potentially offending vehicle 122 shown in the close-up cropped frame 1100B.

The license plate classifier 320 or one of the modules or engines of the server 104 can estimate a size of the license plate 508 including a length dimension 1102 and a height dimension 1104 of the license plate 508. The license plate classifier 320 or one of the modules or engines of the server 104 can estimate the size of the license plate 508 using conventional computer vision tools or algorithms. For example, the license plate classifier 320 or one of the modules or engines of the server 104 can estimate the size of the license plate 508 by calling a function from a computer vision library running on the server 104 such as the OpenCV® library.

One technical problem faced by the applicant is how to optimize the license plate classifier 320 such that the outputs produced by the license plate classifier 320 can be used by the evidence validation module 318 of the server 104 to effectively assess the evidence packages 136 received from the edge devices 102. One technical solution discovered and developed by the applicant (and disclosed herein) is to design the license plate classifier 320 such that it receives as inputs 906, multiple cropped-instances of the same license plate video frame 126 via input channels 908 including at least a first input channel 908A, a second input channel 908B, and a third input channel 908C.

FIG. 11B illustrates a medium cropped frame 1100B of the license plate 508 of the potentially offending vehicle 122. As previously discussed with respect to FIG. 9, the medium cropped frame 1100B can be one of the inputs 906 received by the license plate classifier 320. In some embodiments, the medium cropped frame 1100B can be received via the second input channel 908B of the license plate classifier 320. As shown in FIG. 11B, the medium cropped frame 1100B can be a video frame showing the same license plate 508 as the close-up cropped frame 1100A but retaining certain margins around the license plate 508 showing parts of the vehicle 122.

The margins of the medium cropped frame 1100B can comprise two lateral margins 1106 (one on each lateral side of the license plate 508) and two vertical margins 1108 (one above and one below the license plate 508). In some embodiments, the lateral margins 1106 and the vertical margins 1108 for the medium cropped frame 1100B can be determined based on the estimated size of the license plate 508. For example, the lateral margins 1106 can be calculated based on the length dimension 1102 of the license plate 508. As a more specific example, each of the lateral margins 1106 can be approximately equivalent to (~1×) the length dimension 1102 of the license plate 508 or ~1.5× the length dimension 1102 of the license plate 508. Each of the vertical margins 1108 can be approximately equivalent to (~1×) the height dimension 1104 of the license plate 508 and between 1× and ~1.5× the height dimension 1104 of the license plate 508.

FIG. 11C illustrates a large cropped frame 1100C of the license plate 508 of the potentially offending vehicle 122. As previously discussed with respect to FIG. 9, the large cropped frame 1100C can be one of the inputs 906 received by the license plate classifier 320. In some embodiments, the large cropped frame 1100C can be received via the third input channel 908C of the license plate classifier 320. As shown in FIG. 11C, the large cropped frame 1100C can be a video frame showing the same license plate 508 as the close-up cropped frame 1100A and the medium cropped frame 1100B but retaining even larger margins around the license plate 508 than the medium cropped frame 1100B and showing a portion of the rear of the potentially offending vehicle 122.

The margins of the large cropped frame 1100C can comprise two lateral margins 1110 (one on each lateral side of the license plate 508) and two vertical margins 1112 (one above and one below the license plate 508). In some embodiments, the lateral margins 1110 and the vertical margins 1112 for the large cropped frame 1100C can be determined based on the estimated size of the license plate 508. For example, the lateral margins 1110 can be calculated based on the length dimension 1102 of the license plate 508. As a more specific example, each of the lateral margins 1110 can be approximately equivalent to (~2×) the length dimension 1102 of the license plate 508 or ~2.5× the length dimension 1102 of the license plate 508. Each of the vertical margins 1112 can be approximately equivalent to (~2×) the height dimension 1104 of the license plate 508 and between 2× and ~2.5× the height dimension 1104 of the license plate 508.

Figure 12:
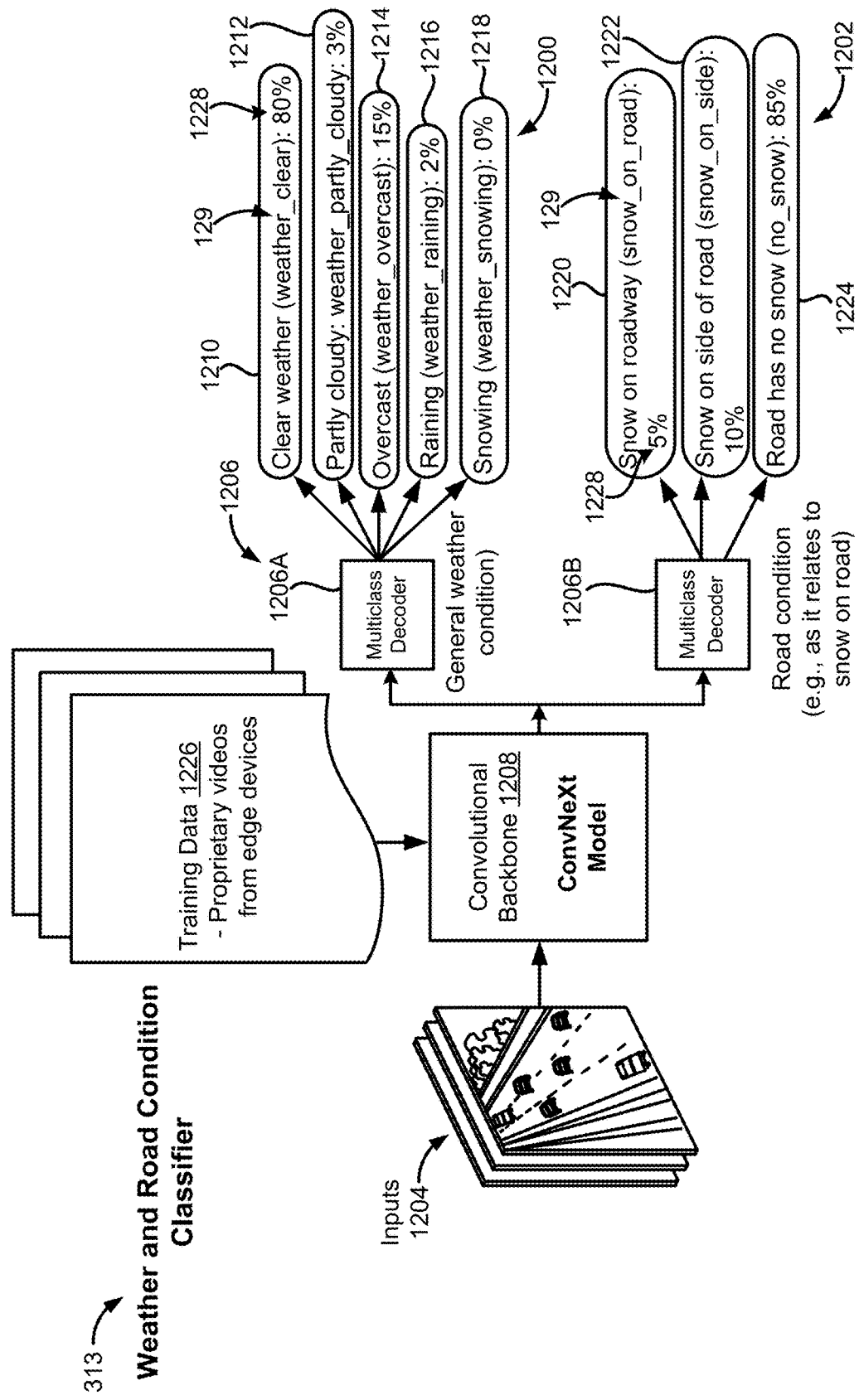
FIG. 12 illustrates one embodiment of a weather and road condition classifier.

FIG. 12 illustrates one embodiment of a weather and road condition classification deep learning model (referred to herein as a weather and road condition classifier 313) running on the edge device 102. Alternatively, the weather and road condition classifier 313 can also be run on the server 104 or on both the edge device 102 and the server 104.

The weather and road condition classifier 313 can be trained to classify or make predictions concerning various context features 129 related to a weather condition 1200 and/or a road condition 1202 at the time that a potential traffic violation event was detected by the edge device 102.

The weather and road condition classifier 313 can receive as inputs 1204 event video frames 124 captured by the event cameras 114 of one of the edge devices 102. The weather and road condition classifier 313 can extract or otherwise obtain the event video frames 124 from the evidence packages 136 received from the edge devices 102.

As shown in FIG. 12, the weather and road condition classifier 313 can be or comprise a multi-headed neural network having a shared or single feature extractor and a plurality of prediction heads or decoders 1206.

In some embodiments, the shared feature extractor can be or comprise a convolutional backbone 1208. The convolutional backbone 1208 can be a modified convolutional neural network such as the ConvNeXt classification model. See Liu, Zhuang, et al. "A convnet for the 2020s." *Proceedings of the IEEE/CVF Conference on Computer Vision and Pattern Recognition* (2022) for a detailed discussion of ConvNeXt classification models, the content of which is incorporated herein by reference.

In other embodiments, the convolutional backbone 1208 can be another type of convolutional neural network or deep learning model trained for weather or road condition detection.

The multiclass prediction heads or decoders 1206 can comprise a first multiclass decoder 1206A and a second multiclass decoder 1206B. Although the version of the weather and road condition classifier 313 shown in FIG. 12 contains two multiclass decoders 1206, it is contemplated by this disclosure that the weather and road condition classifier 313 can comprise three or more multiclass decoders 1206.

Each of the multiclass decoders 1206 can be configured to undertake a multi-class prediction. The first multiclass decoder 1206A can be trained to predict a weather condition at the time that a potential traffic violation event was detected by an edge device 102. The first multiclass decoder 1206A can make this prediction by passing the event video frames 124 capturing the potential traffic violation event through multiple classification layers. For example, the first multiclass decoder 1206A can classify the event video frames 124 into the following weather-related classes: (1) the weather at the time was clear or exhibited signs of clear weather 1210 (weather_clear); (2) the weather at the time was partly cloudy or exhibited signs of partly-cloudy weather 1212 (weather_partly_cloudy); (3) the weather at the time was overcast or exhibited signs of overcast weather 1214 (weather_overcast); (4) the weather at the time was raining or exhibited signs of rainy weather 1216 (weather_raining); and (5) the weather at the time was snowing or exhibited signs of snowy weather 1218 (weather_snowing).

The first multiclass decoder 1206A can generate or output a set of confidence scores 1228 associated with certain context features 129 related to a weather condition 1200. The confidence scores 1228 can be included as part of a first set of classification results 127A transmitted to the server 104 and provided as inputs to a decision tree algorithm 328 running on the server 104.

Each of the confidence scores 1228 can be between 0 and 1.0 (or 0 and 100%). The confidence scores 1228 can be indicative of or represent the confidence of the classification made by the first decoder 1206A.

The second multiclass decoder 1206B can be a classification head trained to predict a road condition at the time that a potential traffic violation event was detected by an edge device 102. Although FIG. 12 illustrates the second multiclass decoder 1206B making predictions related to the presence of snow on the roadways, it is contemplated by this disclosure that the second multiclass decoder 1206B can be trained to also make predictions concerning other road conditions 1202 including roadway flooding or the presence of water on roadways, downed trees and/or downed power lines, potholes, or roadway construction. The second multiclass decoder 1206B can make this prediction by passing the event video frames 124 capturing the potential traffic violation event through multiple classification layers.

For example, the second multiclass decoder 1206B can classify the event video frames 124 into the following road condition classes: (1) there is snow on the road 1220 (snow_on_road); (2) there is snow on the side of the road 1222 (snow_on_side); and (3) there is no snow on the road 1224 (no_snow).

The second multiclass decoder 1206B can generate or output another set of confidence scores 1228 associated with certain context features 129 related to a road condition 1202. The confidence scores 1228 can be included as part of a first set of classification results 127A transmitted to the server 104 and provided as inputs to a decision tree algorithm 328 running on the server 104.

Each of the confidence scores 1228 can be between 0 and 1.0 (or 0 and 100%). The confidence scores 1228 can be indicative of or represent the confidence of the classification made by the second multiclass decoder 1206B.

FIG. 12 also illustrates that the weather and road condition classifier 313 can be trained using training data 1226 culled from a variety of sources. The weather and road condition classifier 313 can be continuously trained in order to improve the accuracy and efficacy of the weather and road condition classifier 313.

In some embodiments, the training data 1226 can comprise event video frames captured by the edge devices 102 or event video frames stored in an events database 316. The event video frames retrieved from the events database 316 can be event video frames where the evidence packages 136 containing such video frames were previously validated by the server 104, a client device 138, a human reviewer, or a combination thereof.

Figure 13A:
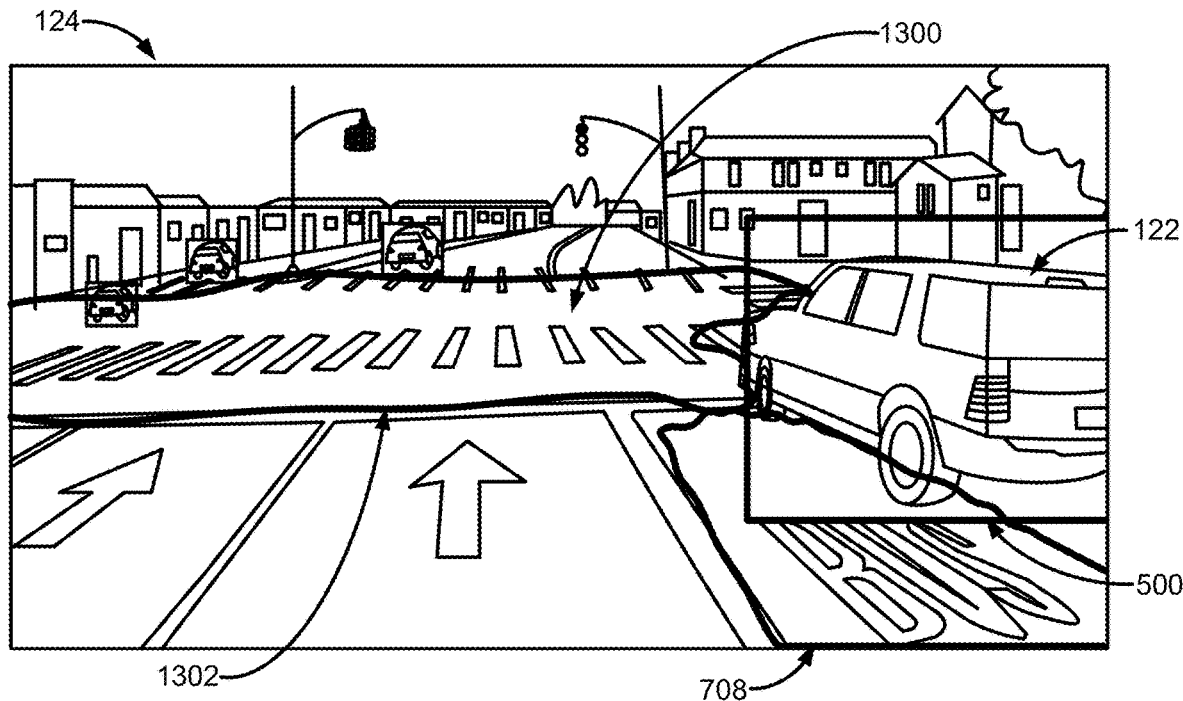
FIG. 13A illustrates an example of an event video frame showing a potentially offending vehicle detected at an intersection.

FIG. 13A is an example event video frame 124 capturing a potentially offending vehicle 122 driving into an intersection from a restricted road area 140 (e.g., a bus lane). The event video frame 124 shown in FIG. 13A can be one of several event video frames 124 included as part of an evidence package 136 received by the server 104 from an edge device 102.

The edge device 102 can initially feed or input the event video frame 124 into a plurality of deep learning models (e.g., the object detection deep learning model 308, the lane segmentation deep learning model 312, the LPR deep learning model 310, etc.) running on the edge device 102.

The deep learning models running on the edge device 102 can automatically detect the potentially offending vehicle 122 and the restricted road area 140. For example, the object detection deep learning model 308 can automatically detect and bound the potentially offending vehicle 122 in a vehicle bounding box 500 and the lane segmentation deep learning model 312 can automatically detect one or more lanes shown in the event video frame 124 and bound the lanes in polygons. For example, the lane segmentation deep learning model 312 can bound the restricted road area 140 in an LOI polygon 708.

The edge device 102 can also feed or input the event video frame 124 into the plurality of deep learning models to obtain one or more first classification results 127A (see, e.g., FIG. 3) associated with a plurality of context-related features 129. The first classification results 127A can comprise confidence scores or other numerical values associated with the context-related features 129.

Some examples of context-related features 129 include whether: (i) a bus lane or another type of restricted road area was detected in the event video frame 124, (ii) whether an intersection was detected in the event video frame 124, and (iii) whether a bus or other type of municipal vehicle was detected in the event video frame 124.

In some embodiments, at least one of the prediction heads 600 of the lane segmentation deep learning model 312 (see, e.g., FIG. 6) can be configured to detect or predict whether a bus lane or another type of restricted road area 140 was detected in the event video frame 124. In certain embodiments, at least one of the other prediction heads 600 of the lane segmentation deep learning model 312 can be configured to detect or predict whether an intersection 1300 is present in the event video frame 124. The lane segmentation deep learning model 312 can also bound the intersection in an intersection-bounding polygon 1302. The lane segmentation deep learning model 312 can also output a boolean value, a boolean value converted into a binary/numerical value (e.g., 1 or 0), or confidences scores associated with its detections or predictions. Moreover, the object detection deep learning model 308 can be configured to detect whether a bus or another type of municipal vehicle was detected in the event video frame 124. The object detection deep learning model 308 can also output confidence scores associated with its detection or predictions.

In some embodiments, the event video frame 124 can also be provided as an input to one or more deep learning models (e.g., the object detection deep learning model 324 and the lane segmentation deep learning model 326) running on the server 104. The deep learning models running on the server 104 can be configured to output additional classification results (e.g., second classification results 127B) associated with the context-related features 129.

The evidence validation module 318 of the server 104 can input the context-related features 129 and any classification results (any first classification results 127A and/or any second classification results 127B) associated with the context-related features 129 into the decision tree algorithm 328 running on the server 104 (see, e.g., FIG. 3). The decision tree algorithm 328 can output a contributing score 1500 (see, e.g., FIGS. 15A-15C) for each of the context-related features 129 inputted into the decision tree algorithm 328. The evidence validation module 318 can then use the contributing scores 1500 to calculate a final score 1502 for evaluating the evidence package 136 received from the edge device 102.

For example, since the event video frame 124 of FIG. 13A clearly shows the presence of an intersection 1300, both the lane segmentation deep learning model 312 running on the edge device 102 and the lane segmentation deep learning model 326 running on the server 104 would output a high confidence score (e.g., above 90%) when it comes to the context-related feature 129 of whether an intersection 1300 was detected in the video frame.

This is important as vehicles are often allowed to temporarily occupy bus lanes or other restricted road areas 140 when approaching an intersection to make a turn (e.g., a right turn). Also, any event video frames 124 showing a vehicle in an intersection cannot be used as evidence against the vehicle to support a lane violation charge. Thus, if any evidence packages 136 containing event video frames 124 show potentially offending vehicles 122 near or in an intersection 1300, such evidence packages 136 may require further review.

With respect to the event video frame 124 of FIG. 13A, since the boolean value associated with whether an intersection 1300 was detected in the video frame is likely "TRUE," the decision tree algorithm 328 can output a negative contributing score 1500 or an exceedingly low contributing score 1500. Since a negative or exceedingly low contributing score 1500 would cause the final score 1502 to fall below the first threshold 1506A (i.e., fall in between the first threshold 1506A and the second threshold 1506B) or fall below the second threshold 1506B, the evidence package 136 may be tagged or flagged for further review by a human reviewer in the former case or the evidence package 136 may be automatically rejected in the latter case.

Figure 13B:
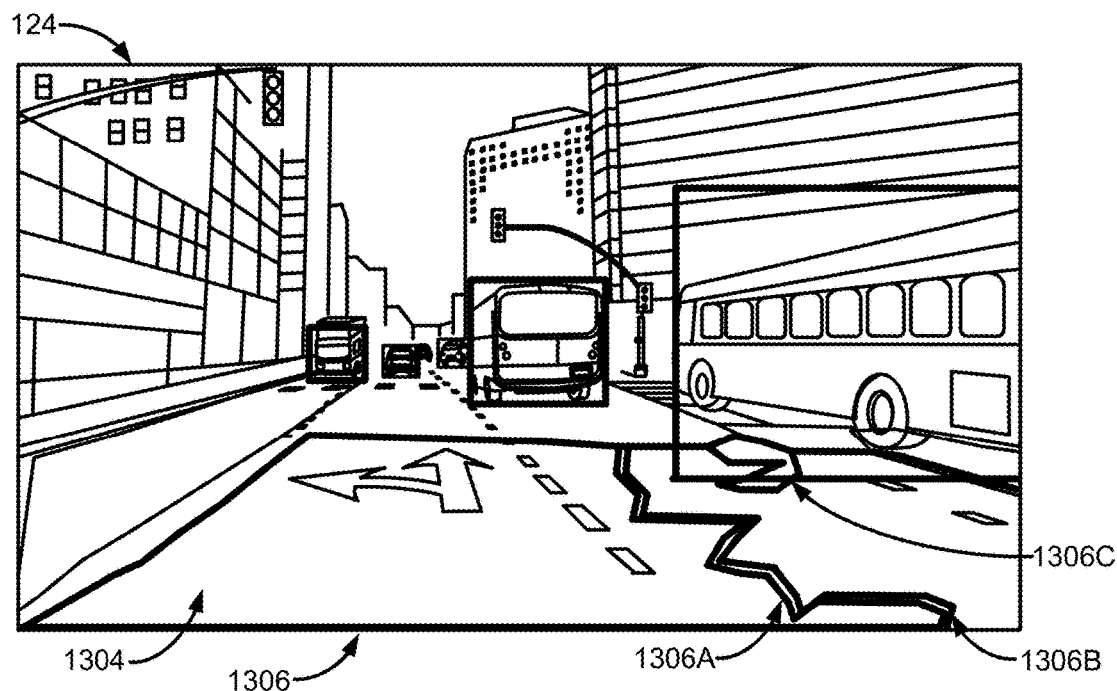
FIG. 13B illustrates another example event video frame showing several lanes bounded by polygons.

FIG. 13B is another example event video frame 124 showing several lanes 1304 bounded by polygons 1306. The event video frame 124 shown in FIG. 13B can be one of several event video frames 124 included as part of an evidence package 136 received by the server 104 from an edge device 102.

The edge device 102 can initially feed or input the event video frame 124 into a lane segmentation deep learning model 312 running on the edge device 102. In some embodiments, the server 104 can also feed or input the event video frame 124 into a lane segmentation deep learning model 326 running on the server 104. The lane segmentation deep learning model (either the lane segmentation deep learning model 312 running on the edge device 102 or the lane segmentation deep learning model 326 running on the server 104) can automatically detect the lanes 1304 shown in the event video frame 124 and bound the lanes in polygons 1306.

The lane segmentation deep learning model (either the lane segmentation deep learning model 312 running on the edge device 102 or the lane segmentation deep learning model 326 running on the server 104) can also make a determination concerning a geometric area representing the lanes 1304 detected by the lane segmentation deep learning model. This determination concerning the geometric area of the detected lane can be considered one of the context-related features 129. Moreover, the lane segmentation deep learning model can also output a classification result in the form of a detected lane area percentage for each of the lanes 1304 detected.

For example, the lane segmentation deep learning model can estimate a geometric area bounded by each of the polygons 1306 (where each of the polygons 1306 represent a detected lane 1304). The lane segmentation deep learning model can then divide each of the geometric areas by a total frame image area to obtain a detected lane area percentage for each of the detected lanes 1304.

In some embodiments, the detected lane area percentages can be normalized by subtracting the mean from each of the lane area percentages and dividing by a standard deviation. This would result in a normalized value with a mean of 0 and a standard deviation of 1 (most values would be around −3 and 3).

As a more specific example, the event video frame 124 of FIG. 13B can comprise a first detected lane bounded by a first polygon 1306A, a second detected lane bounded by a second polygon 1306B, and a third detected lane bounded by a third polygon 1306C. The detected lane area percentage calculated for the first detected lane can be approximately 20%, the detected lane area percentage calculated for the second detected lane can be approximately 15%, and the detected lane area percentage calculated for the third detected lane can be approximately 3%. A higher or larger detected lane area percentage is considered more validatory since a higher or larger detected lane area percentage indicates that the lanes 1304 were segmented or detected correctly by the lane segmentation deep learning model.

In some embodiments, at least one of the detected lanes and its associated detected lane area percentage can be provided as an input to the decision tree algorithm 328 to obtain a contributing score 1500. For example, an active lane or lane identified as a restricted road area 140 (e.g., a bus lane) and its associated detected lane area percentage can be provided as an input to the decision tree algorithm 328 to obtain a contributing score 1500 concerning whether the active lane (e.g., the bus lane) was correctly segmented or detected.

For example, if all of the lanes (or the active lane detected) by the lane segmentation deep learning model were similar in size to the third detected lane (represented by the third polygon 1306C), the decision tree algorithm 328 would output a negative or exceedingly low contributing score 1500 with respect to this context feature 129. Since a negative or exceedingly low contributing score 1500 may cause the final score 1502 to fall below the first threshold 1506A (i.e., fall in between the first threshold 1506A and the second threshold 1506B) or fall below the second threshold 1506B, the evidence package 136 may be tagged or flagged for further review by a human reviewer in the former case or the evidence package 136 may be automatically rejected in the latter case.

However, if all of the lanes (or the active lane detected) by the lane segmentation deep learning model were similar in size to the first detected lane (represented by the first polygon 1306A), the decision tree algorithm 328 would output a positive or high contributing score 1500 with respect to this context feature 129. Since a positive or high contributing score 1500 may cause the final score 1502 to exceed the first threshold 1506A, the evidence package 136 may be automatically approved if all of the lanes (or the active lane detected) by the lane segmentation deep learning model were similar in size to the first detected lane.

Figure 14A:
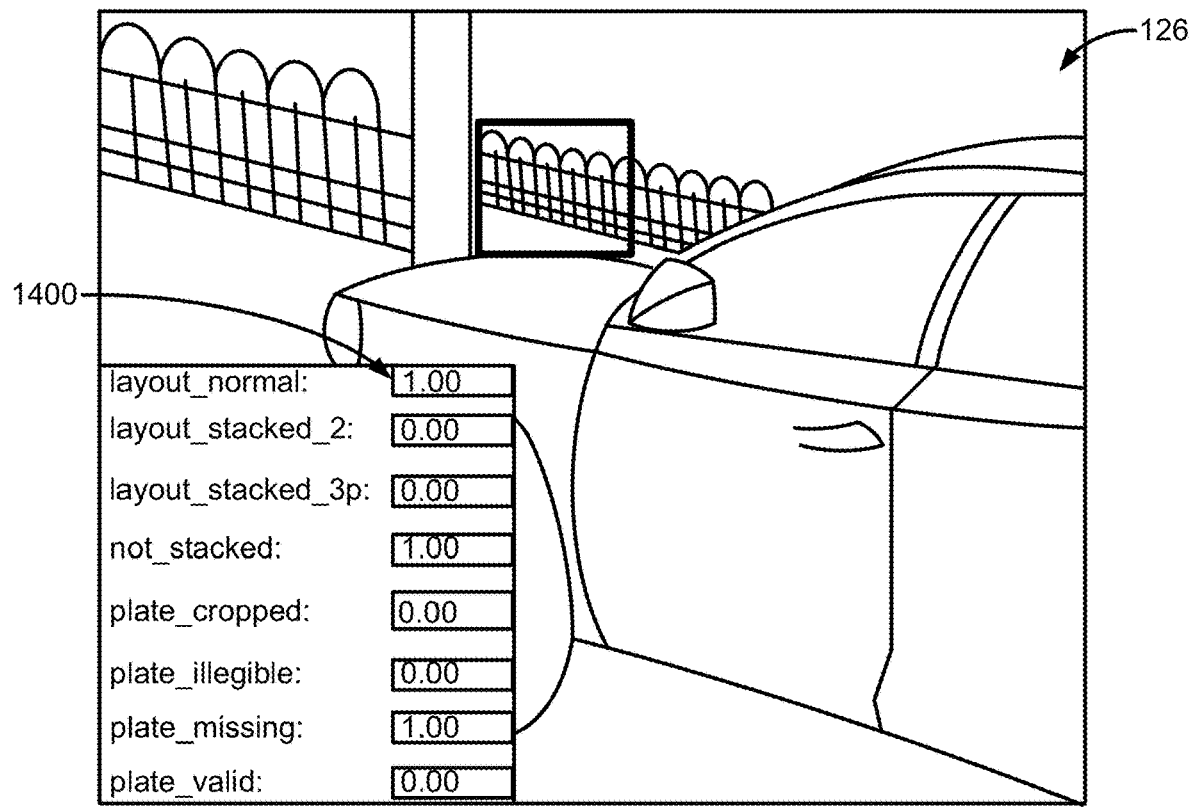
FIG. 14A is a screenshot of a graphical user interface (GUI) showing confidence scores overlaid on a license plate video frame.

FIG. 14A is a screenshot of one embodiment of a graphical user interface (GUI) showing confidence scores 1400 overlaid on a license plate video frame 126. The license plate video frame 126 shown in FIG. 14A can be included as part of an evidence package 136 received from the edge device 102. In this case, the edge device 102 can mistakenly identify a part of a fence as the license plate of a potentially offending vehicle 122.

The confidence scores 1400 shown in FIG. 14A can be outputted by the license plate classifier 320 (see FIG. 9) running on the server 104. The license plate classifier 320 can receive the license plate video frame 126 of FIG. 14A as an input.

In response to the license plate classifier 320 receiving the license plate video frame 126 of FIG. 14A, the license plate classifier 320 produced a confidence score of 0.00 for the plate_valid context feature and also produced a confidence score of 1.00 for the plate_missing context feature. All of the context features 129 and their associated classification results (i.e., the confidence scores 1400) shown in FIG. 14A can be provided as inputs to the decision tree algorithm 328 running on the server 104. In response to receiving these inputs, the decision tree algorithm 328 would likely output exceedingly negative contributing scores 1500. Since the exceedingly negative contributing scores 1500 would likely cause the final score 1502 to fall below the second threshold 1506B, the evidence package 136 containing such a license plate video frame 126 would likely be automatically rejected.

Figure 14B:
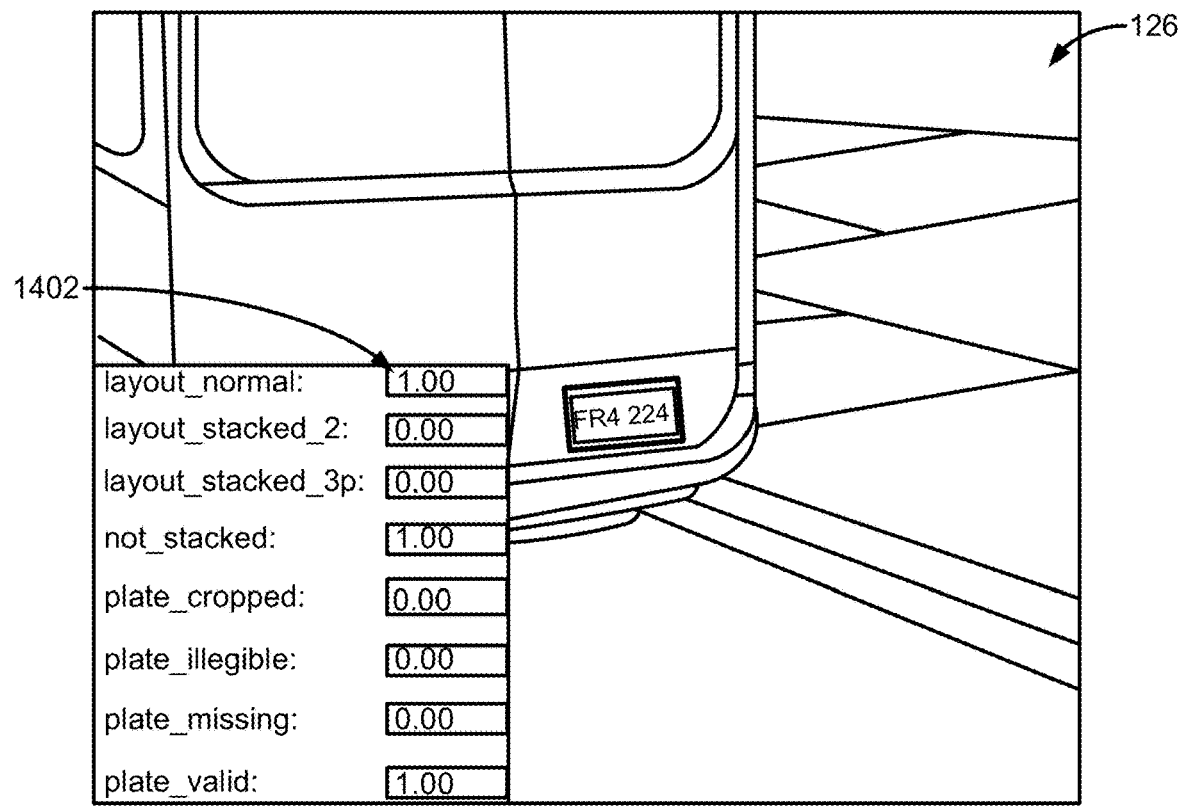
FIG. 14B is a screenshot of a graphical user interface (GUI) showing confidence scores overlaid on another license plate video frame.

FIG. 14B is a screenshot of one embodiment of a graphical user interface (GUI) showing confidence scores overlaid on a license plate video frame 126. The license plate video frame 126 shown in FIG. 14B can be included as part of an evidence package 136 received from the edge device 102.

The confidence scores 1402 shown in FIG. 14B can be outputted by the license plate classifier 320 (see FIG. 9) running on the server 104. The license plate classifier 320 can receive the license plate video frame 126 of FIG. 14B as an input.

In response to the license plate classifier 320 receiving the license plate video frame 126 of FIG. 14B, the license plate classifier 320 produced a confidence score of 1.00 for the plate_valid context feature and also produced a confidence score of 0.00 for the plate_missing context feature. All of the context features 129 and their associated classification results (i.e., the confidence scores 1402) shown in FIG. 14B can be provided as inputs to the decision tree algorithm 328 running on the server 104. In response to receiving these inputs, the decision tree algorithm 328 would likely output exceedingly positive contributing scores 1500. Since the exceedingly positive contributing scores 1500 would likely cause the final score 1502 to exceed the first threshold 1506A, the evidence package 136 containing such a license plate video frame 126 would likely be automatically approved.

FIG. 15A is a schematic diagram illustrating a scenario where several context features 129 and their accompanying classification results 127 (e.g., first classification results 127A, second classification results 127B, or a combination thereof) are provided as inputs to the decision tree algorithm 328 running on the server 104. For example, the evidence validation module 318 of the server 104 can input the context-related features 129 and their accompanying classification results 127 into the decision tree algorithm 328.

As previously discussed, the classification results 127 can comprise confidence scores, other numerical scores or values, and boolean values (or boolean values converted into binary/numerical values).

The decision tree algorithm 328 can output a contributing score 1500 for each of the context-related features 129 inputted into the decision tree algorithm 328. The decision tree algorithm 328 can determine the contributing scores 1500 based on all of the classification results 127 (e.g., all of the first classification results 127A and all of the second classification results 127B) provided as inputs to the decision tree algorithm 328.

In some embodiments, the decision tree algorithm 328 can be a gradient boosted decision tree algorithm comprising a plurality of gradient boosted decision trees. The contributing scores 1500 can be determined through a sequence of learned decisions made by the plurality of gradient boosted decision trees.

In certain embodiments, the decision tree algorithm 328 can be a version of the XGBoost decision tree algorithm.

In other embodiments, the decision tree algorithm 328 can be another type of decision tree algorithm. For example, the decision tree algorithm 328 can be a classification and regression tree (CART) algorithm.

In further embodiments, the decision tree algorithm 328 can be another type of tree-based machine learning algorithm such as a random forest algorithm.

The decision tree algorithm 328 can be trained using context features 129 and classification results 127 obtained from past event video frames 124 and past license plate video frames 126 capturing past traffic violation events or past non-events/false-positive events that have been confirmed by a human reviewer. The past event video frames 124 and the past license plate video frames 126 were provided as inputs to the various deep learning models disclosed herein to obtain the context features 129 and the classification results 127 used as training data.

The evidence validation module 318 can then calculate a final score 1502 based on the contributing scores 1502. For example, the evidence validation module 318 can set an initial score 1504 and calculate the final score 1502 by incrementing or decrementing the initial score 1504 using the plurality of contributing scores 1500.

In some embodiments, the initial score 1504 can be set at 0. In other embodiments, the initial score 1504 can be set at 100 or another number.

The evidence validation module 318 can evaluate the final score 1502 against one or more predetermined thresholds 1506 to determine whether the evidence package 136 is automatically approved, is automatically rejected, or requires further review (for example, by a human reviewer or a further round of automatic review by the server 104 or another computing device).

The one or more predetermined thresholds 1506 can comprise a first threshold 1506A and a second threshold 1506B. The first threshold 1506A can be higher than the second threshold 1506B.

In some embodiments, the evidence validation module 318 can automatically approve the evidence package 136 in response to the final score 1502 being higher than the first threshold 1506A. In these embodiments, the evidence validation module 318 can automatically reject the evidence package 136 in response to the final score 1502 being lower than the second threshold 1506B.

Moreover, the evidence validation module 318 can mark or flag the evidence package 136 or otherwise designate the evidence package 136 for further review (e.g., by a human reviewer or another round of machine review) if the final score 1502 is between the first threshold 1506A and the second first threshold 1506B. In these embodiments, the evidence validation module 318 can automatically reject the evidence package 136 in response to the final score 1502 being lower than the second threshold 1506B.

Evidence packages 136 rejected by the evidence validation module 318 can be added to the events database 316 and the contents of such evidence packages 136 can be used to further train the various deep learning models. In some embodiments, the contents of the rejected evidence packages 136 can be discarded or deleted from the server 104.

In the scenario shown in FIG. 15A, three context features 129 (e.g., plate_confidence, active_lane_occupancy, and plate_valid) and their accompanying classification results 127 are provided as inputs to the decision tree algorithm 328. Although FIG. 15A illustrates only three context features 129, it is contemplated by this disclosure that in a real-world scenario, numerous (e.g., tens or even hundreds of) context features 129 and their accompanying classification results 127 can be provided as inputs to the decision tree algorithm 328. In the scenario shown in FIG. 15A, since the confidence values associated with the three context features 129 are all 96% or above, the contributing scores 1500 outputted by the decision tree algorithm 328 for such context features 129 are all positive numbers that increment the initial score 1504. As shown in FIG. 15A, the final score of 3.9 exceeds the first threshold 1506A value of 2.0. As such, the evidence package 136 comprising the event video frames 124 and license plate video frames 126 that served as inputs for the various deep learning models that produced the context features 129 and classification results 127 shown in FIG. 15A is automatically approved by the server 104.

FIG. 15B is another schematic diagram illustrating a scenario where several context features 129 and their accompanying classification results 127 (e.g., first classification results 127A, second classification results 127B, or a combination thereof) are provided as inputs to the decision tree algorithm 328 running on the server 104. For example, the evidence validation module 318 of the server 104 can input the context-related features 129 and their accompanying classification results 127 into the decision tree algorithm 328.

As previously discussed, the classification results 127 can comprise confidence scores, other numerical scores or values, and boolean values (or boolean values converted into binary/numerical values).

The decision tree algorithm 328 can output a contributing score 1500 for each of the context-related features 129 inputted into the decision tree algorithm 328. The decision tree algorithm 328 can determine the contributing scores 1500 based on all of the classification results 127 (e.g., all of the first classification results 127A and all of the second classification results 127B) provided as inputs to the decision tree algorithm 328.

In some embodiments, the decision tree algorithm 328 can be a gradient boosted decision tree algorithm comprising a plurality of gradient boosted decision trees. The contributing scores 1500 can be determined through a sequence of learned decisions made by the plurality of gradient boosted decision trees.

In certain embodiments, the decision tree algorithm 328 can be a version of the XGBoost decision tree algorithm. In other embodiments, the decision tree algorithm can be another type of decision tree algorithm.

The decision tree algorithm 328 can be trained using context features 129 and classification results 127 obtained from past event video frames 124 and past license plate video frames 126 capturing past traffic violation events or past non-events/false-positive events that have been confirmed by a human reviewer. The past event video frames 124 and the past license plate video frames 126 were provided as inputs to the various deep learning models disclosed herein to obtain the context features 129 and the classification results 127 used as training data.

The evidence validation module 318 can then calculate a final score 1502 based on the contributing scores 1502. For example, the evidence validation module 318 can set an initial score 1504 and calculate the final score 1502 by incrementing or decrementing the initial score 1504 using the plurality of contributing scores 1500.

In some embodiments, the initial score 1504 can be set at 0. In other embodiments, the initial score 1504 can be set at 100 or another number.

The evidence validation module 318 can evaluate the final score 1502 against one or more predetermined thresholds 1506 to determine whether the evidence package 136 is automatically approved, is automatically rejected, or requires further review (for example, by a human reviewer or a further round of automatic review by the server 104 or another computing device).

The one or more predetermined thresholds 1506 can comprise a first threshold 1506A and a second threshold 1506B. The first threshold 1506A can be higher than the second threshold 1506B.

In some embodiments, the evidence validation module 318 can automatically approve the evidence package 136 in response to the final score 1502 being higher than the first threshold 1506A. In these embodiments, the evidence validation module 318 can automatically reject the evidence package 136 in response to the final score 1502 being lower than the second threshold 1506B.

Moreover, the evidence validation module 318 can mark or flag the evidence package 136 or otherwise designate the evidence package 136 for further review (e.g., by a human reviewer or another round of machine review) if the final score 1502 is between the first threshold 1506A and the second first threshold 1506B. In these embodiments, the evidence validation module 318 can automatically reject the evidence package 136 in response to the final score 1502 being lower than the second threshold 1506B.

Evidence packages 136 rejected by the evidence validation module 318 can be added to the events database 316 and the contents of such evidence packages 136 can be used to further train the various deep learning models. In some embodiments, the contents of the rejected evidence packages 136 can be discarded or deleted from the server 104.

In the scenario shown in FIG. 15B, three context features 129 (e.g., plate_confidence, active_lane_occupancy, and plate_valid) and their accompanying classification results 127 are provided as inputs to the decision tree algorithm 328. Although FIG. 15B illustrates only three context features 129, it is contemplated by this disclosure that in a real-world scenario, numerous (e.g., tens or even hundreds of) context features 129 and their accompanying classification results 127 can be provided as inputs to the decision tree algorithm 328.

In the scenario shown in FIG. 15B, since the confidence value associated with the plate_confidence context feature 129 is only 0.1% and the confidence value associated with the plate_valid context feature 129 is only 2%, the contributing scores 1500 outputted by the decision tree algorithm 328 for such context features 129 are all negative numbers that decrement the initial score 1504. As shown in FIG. 15B, the final score of −4.5 fails to even meet the second threshold 1506B value of −3.5. As such, the evidence package 136 comprising the event video frames 124 and license plate video frames 126 that served as inputs for the various deep learning models that produced the context features 129 and classification results 127 shown in FIG. 15B is automatically rejected by the server 104.

FIG. 15C is another schematic diagram illustrating a scenario where several context features 129 and their accompanying classification results 127 (e.g., first classification results 127A, second classification results 127B, or a combination thereof) are provided as inputs to the decision tree algorithm 328 running on the server 104. For example, the evidence validation module 318 of the server 104 can input the context-related features 129 and their accompanying classification results 127 into the decision tree algorithm 328.

As previously discussed, the classification results 127 can comprise confidence scores, other numerical scores or values, and boolean values (or boolean values converted into binary/numerical values).

The decision tree algorithm 328 can output a contributing score 1500 for each of the context-related features 129 inputted into the decision tree algorithm 328. The decision tree algorithm 328 can determine the contributing scores 1500 based on all of the classification results 127 (e.g., all of the first classification results 127A and all of the second classification results 127B) provided as inputs to the decision tree algorithm 328.

In some embodiments, the decision tree algorithm 328 can be a gradient boosted decision tree algorithm comprising a plurality of gradient boosted decision trees. The contributing scores 1500 can be determined through a sequence of learned decisions made by the plurality of gradient boosted decision trees.

In certain embodiments, the decision tree algorithm 328 can be a version of the XGBoost decision tree algorithm. In other embodiments, the decision tree algorithm can be another type of decision tree algorithm.

The decision tree algorithm 328 can be trained using context features 129 and classification results 127 obtained from past event video frames 124 and past license plate video frames 126 capturing past traffic violation events or past non-events/false-positive events that have been confirmed by a human reviewer. The past event video frames 124 and the past license plate video frames 126 were provided as inputs to the various deep learning models disclosed herein to obtain the context features 129 and the classification results 127 used as training data.

The evidence validation module 318 can then calculate a final score 1502 based on the contributing scores 1502. For example, the evidence validation module 318 can set an initial score 1504 and calculate the final score 1502 by incrementing or decrementing the initial score 1504 using the plurality of contributing scores 1500.

In some embodiments, the initial score 1504 can be set at 0. In other embodiments, the initial score 1504 can be set at 100 or another number.

The evidence validation module 318 can evaluate the final score 1502 against one or more predetermined thresholds 1506 to determine whether the evidence package 136 is automatically approved, is automatically rejected, or requires further review (for example, by a human reviewer or a further round of automatic review by the server 104 or another computing device).

The one or more predetermined thresholds 1506 can comprise a first threshold 1506A and a second threshold 1506B. The first threshold 1506A can be higher than the second threshold 1506B.

In some embodiments, the evidence validation module 318 can automatically approve the evidence package 136 in response to the final score 1502 being higher than the first threshold 1506A. In these embodiments, the evidence validation module 318 can automatically reject the evidence package 136 in response to the final score 1502 being lower than the second threshold 1506B.

Moreover, the evidence validation module 318 can mark or flag the evidence package 136 or otherwise designate the evidence package 136 for further review (e.g., by a human reviewer or another round of machine review) if the final score 1502 is between the first threshold 1506A and the second first threshold 1506B. In these embodiments, the evidence validation module 318 can automatically reject the evidence package 136 in response to the final score 1502 being lower than the second threshold 1506B.

Evidence packages 136 rejected by the evidence validation module 318 can be added to the events database 316 and the contents of such evidence packages 136 can be used to further train the various deep learning models. In some embodiments, the contents of the rejected evidence packages 136 can be discarded or deleted from the server 104.

In the scenario shown in FIG. 15C, three context features 129 (e.g., plate_confidence, active_lane_occupancy, and plate_valid) and their accompanying classification results 127 are provided as inputs to the decision tree algorithm 328. Although FIG. 15C illustrates only three context features 129, it is contemplated by this disclosure that in a real-world scenario, numerous (e.g., tens or even hundreds of) context features 129 and their accompanying classification results 127 can be provided as inputs to the decision tree algorithm 328.

In the scenario shown in FIG. 15C, the confidence value associated with the plate_confidence context feature 129 is 91% and the confidence value associated with the active_lane_occupancy context feature 129 is 84%. The contributing scores 1500 outputted by the decision tree algorithm 328 for such context features 129 only slightly increment the initial score 1504. As shown in FIG. 15C, the final score of 1.1 falls between the first threshold 1506A of 2.0 and the second threshold 1506B of −3.5. As such, the evidence package 136 comprising the event video frames 124 and license plate video frames 126 that served as inputs for the various deep learning models that produced the context features 129 and classification results 127 shown in FIG. 15B is tagged or otherwise marked for further review (for example, by a human reviewer or a further round of automatic review by the server 104 or another computing device).

One technical problem faced by the applicant is how to use the context features 129 and classification results 127 automatically extracted from the various deep learning models to evaluate the contents of an evidence package 136. One technical solution discovered and developed by the applicant is to input the extracted context features 129 and classification results 127 into a decision tree algorithm 328 (e.g., a gradient boosted decision tree algorithm) to obtain a plurality of contributing scores in order to calculate a final score for evaluating the evidence package 136. By utilizing the methods and systems disclosed, the applicant was able to reduce the number of evidence packages 136 that required further review by a human reviewer, thereby decreasing the amount of time overall needed to evaluate such evidence packages 136 and decreasing the cost of such review.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method of automatically evaluating evidence of a potential traffic violation, comprising:
   receiving, at a server, an evidence package of the potential traffic violation from an edge device, wherein the evidence package comprises one or more event video frames and one or more license plate video frames of videos captured by the edge device showing a vehicle involved in the potential traffic violation, wherein the evidence package further comprises one or more first classification results obtained by feeding the one or more event video frames and license plate video frames into one or more deep learning models running on the edge device, wherein each of the first classification results is associated with one of a plurality of features;
   inputting the one or more event video frames and license plate video frames into one or more deep learning models running on the server to obtain one or more second classification results, wherein each of the second classification results is associated with one of the plurality of features;
   inputting one or more of the first classification results and their associated features, one or more of the second classification results and their associated features, or a combination thereof into a decision tree algorithm to obtain a plurality of contributing scores, wherein each of the contributing scores is associated with one of the plurality of features;
   calculating a final score based on the contributing scores; and
   evaluating the final score against one or more predetermined thresholds to determine whether the evidence package is automatically approved, is automatically rejected, or requires further review.

2. The method of claim 1, further comprising inputting the one or more license plate video frames into a license plate classifier running on the server, wherein the second classification results comprise confidence scores obtained from the license plate classifier concerning license plate-related features of the vehicle.

3. The method of claim 2, wherein the license plate classifier comprises a convolutional neural network backbone comprising multiple prediction heads connected to the convolutional neural network backbone.

4. The method of claim 2, wherein one of the plurality of features is a prediction concerning whether license plate characters on the license plate are arranged in a stacked arrangement, and wherein one of the second classification results is a confidence score associated with the prediction concerning whether the license plate characters on the license plate are arranged in the stacked arrangement.

5. The method of claim 1, wherein one of the plurality of features is a prediction confidence related to a license plate recognized by a license plate recognition (LPR) deep learning model running on the edge device, and wherein one of the first classification results is a confidence score associated with the prediction confidence.

6. The method of claim 1, wherein one of the plurality of features is a prediction concerning whether a bus is detected in at least one of the event video frames, and wherein one of the first classification results is a confidence score or boolean value associated with the prediction concerning the detection of the bus.

7. The method of claim 1, wherein one of the deep learning models is a lane segmentation deep learning model running on the edge device, and wherein the lane segmentation deep learning model is configured to detect one or more lanes of a roadway from at least one of the event video frames.

8. The method of claim 7, wherein one of the plurality of features is a determination concerning a geometric area representing one of the lanes detected by the lane segmentation deep learning model, and wherein one of the first classification results is a detected lane area percentage.

9. The method of claim 1, wherein one of the plurality of features is a prediction concerning whether a bus lane is detected in at least one of the event video frames, and wherein one of the first classification results is a confidence score or boolean value associated with the prediction concerning whether the bus lane is detected.

10. The method of claim 1, wherein one of the plurality of features is a prediction concerning a weather condition detected in at least one of the event video frames, and wherein one of the first classification results is a confidence score associated with the prediction concerning the weather condition.

11. The method of claim 1, wherein one of the plurality of features is a prediction concerning whether an intersection is detected in at least one of the event video frames, and wherein one of the first classification results is a confidence score or boolean value associated with the prediction concerning the detection of the intersection.

12. The method of claim 1, wherein the event video frames are captured by an event camera of the edge device coupled to a carrier vehicle while the carrier vehicle is in motion, and wherein the license plate video frames are captured by a license plate recognition (LPR) camera of the edge device coupled to the carrier vehicle while the carrier vehicle is in motion.

13. The method of claim 1, wherein the final score is calculated by incrementing or decrementing an initial score using the plurality of contributing scores, wherein each of the contributing scores is associated with one of the features, and wherein each of the contributing scores is determined by the decision tree algorithm based on all of the first classification results and all of the second classification results provided as inputs to the decision tree algorithm.

14. The method of claim 1, wherein the decision tree algorithm is a gradient boosted decision tree algorithm.

15. The method of claim 1, wherein the one or more predetermined thresholds comprise a first threshold and a second threshold, wherein the first threshold is higher than the second threshold, and further comprising:

automatically approving the evidence package in response to the final score being higher than the first threshold;

marking or tagging the evidence package for further review in response to the final score being between the first threshold and the second threshold; and automatically rejecting the evidence package in response to the final score being below the second threshold.

16. A system for automatically evaluating evidence of a potential traffic violation, comprising:

an edge device comprising one or more cameras configured to capture videos of a vehicle involved in the potential traffic violation, wherein the edge device comprises one or more processors coupled to a memory, wherein the one or more processors are programmed to generate an evidence package concerning the potential traffic violation, wherein the evidence package comprises one or more event video frames and license plate video frames from the videos captured by the edge device and one or more first classification results, wherein the first classification results are obtained by feeding the one or more event video frames and license plate video frames into one or more deep learning models running on the edge device, and wherein each of the first classification results is associated with one of a plurality of features; and a server communicatively coupled to the edge device, wherein the server comprises one or more server processors programmed to:

receive the evidence package from the edge device, input the one or more event video frames and license plate video frames into one or more deep learning models running on the server to obtain one or more second classification results, wherein each of the second classification results is associated with one of the plurality of features, input one or more of the first classification results and their associated features, one or more of the second classification results and their associated features, or a combination thereof into a decision tree algorithm to obtain a plurality of contributing scores, wherein each of the contributing scores is associated with one of the plurality of features, calculate a final score based on the contributing scores, and evaluate the final score against one or more predetermined thresholds to determine whether the evidence package is automatically approved, is automatically rejected, or requires further review.

17. The system of claim 16, wherein the one or more server processors are further programmed to input the one or more license plate video frames into a license plate classifier running on the server, wherein the second classification results comprise confidence scores obtained from the license plate classifier concerning license plate-related features of the vehicle.

18. The system of claim 17, wherein the license plate classifier comprises a convolutional neural network backbone comprising multiple prediction heads connected to the convolutional neural network backbone.

19. The system of claim 17, wherein one of the plurality of features is a prediction concerning whether license plate characters on the license plate are arranged in a stacked arrangement, and wherein one of the second classification results is a confidence score associated with the prediction concerning whether the license plate characters on the license plate are arranged in the stacked arrangement.

20. The system of claim 16, wherein one of the plurality of features is a prediction confidence related to a license plate recognized by a license plate recognition (LPR) deep learning model running on the edge device, and wherein one of the first classification results is a confidence score associated with the prediction confidence.

21. The method of claim 16, wherein one of the plurality of features is a prediction concerning whether a bus is detected in at least one of the event video frames, and wherein one of the first classification results is a confidence score or boolean value associated with the prediction concerning the detection of the bus.

22. The system of claim 16, wherein one of the deep learning models is a lane segmentation deep learning model running on the edge device, and wherein the lane segmentation deep learning model is configured to detect one or more lanes of a roadway from at least one of the event video frames.

23. The system of claim 22, wherein one of the plurality of features is a determination concerning a geometric area representing one of the lanes detected by the lane segmentation deep learning model, and wherein one of the first classification results is a detected lane area percentage.

24. The system of claim 16, wherein one of the plurality of features is a prediction concerning whether a bus lane is detected in at least one of the event video frames, and wherein one of the first classification results is a confidence score or boolean value associated with the prediction concerning whether the bus lane is detected.

25. The system of claim 16, wherein one of the plurality of features is a prediction concerning a weather condition detected in at least one of the event video frames, and wherein one of the first classification results is a confidence score associated with the prediction concerning the weather condition.

26. The system of claim 16, wherein one of the plurality of features is a prediction concerning whether an intersection is detected in at least one of the event video frames, and wherein one of the first classification results is a confidence score or boolean value associated with the prediction concerning the detection of the intersection.

27. The system of claim 16, wherein the event video frames are captured by an event camera of the edge device coupled to a carrier vehicle while the carrier vehicle is in motion, and wherein the license plate video frames are captured by a license plate recognition (LPR) camera of the edge device coupled to the carrier vehicle while the carrier vehicle is in motion.

28. The system of claim 16, wherein the one or more server processors are further programmed to calculate the final score by incrementing or decrementing an initial score using the plurality of contributing scores, wherein each of the contributing scores is associated with one of the features, and wherein each of the contributing scores is determined by the decision tree algorithm based on all of the first classification results and all of the second classification results provided as inputs to the decision tree algorithm.

29. The system of claim 16, wherein the decision tree algorithm is a gradient boosted decision tree algorithm.

30. The system of claim 16, wherein the one or more predetermined thresholds comprise a first threshold and a second threshold, wherein the first threshold is higher than the second threshold, and wherein the one or more server processors are further programmed to:

automatically approve the evidence package in response to the final score being higher than the first threshold;

mark or tag the evidence package for further review in response to the final score being between the first threshold and the second threshold; and automatically reject the evidence package in response to the final score being below the second threshold.

* * * * *